US008738556B2

(12) United States Patent
Sadler

(10) Patent No.: US 8,738,556 B2
(45) Date of Patent: May 27, 2014

(54) COURSE DEVELOPMENT PROGRAM

(75) Inventor: Stephen Sadler, Clarkston, MI (US)

(73) Assignee: Scate Technologies, Inc., Orion, MI (US)

( * ) Notice: Subject to any disclaimer, the term of this patent is extended or adjusted under 35 U.S.C. 154(b) by 1199 days.

(21) Appl. No.: 12/150,876

(22) Filed: May 1, 2008

(65) Prior Publication Data

US 2009/0007235 A1  Jan. 1, 2009

Related U.S. Application Data

(63) Continuation-in-part of application No. PCT/US2006/042678, filed on Nov. 1, 2006.

(60) Provisional application No. 60/798,105, filed on May 5, 2006, provisional application No. 60/732,187, filed on Nov. 1, 2005.

(51) Int. Cl.
*G06F 17/00* (2006.01)
*G06N 5/02* (2006.01)

(52) U.S. Cl.
USPC ............................. 706/45; 703/26; 705/343

(58) Field of Classification Search
USPC ........................................................... 706/45
See application file for complete search history.

(56) References Cited

U.S. PATENT DOCUMENTS

2004/0210923 A1  10/2004  Hudgeons et al.
2004/0220893 A1*  11/2004  Spivack et al. .................. 706/46
2005/0251409 A1*  11/2005  Johnson et al. ................... 705/1

OTHER PUBLICATIONS http://web.archive.org/web/20041001042947/http://gethelp.library.upenn.edu/workshops/biomed/ppt/sound.html, Oct. 2004.
http://web.archive.org/web/20040815193606/http://gethelp.library.upenn.edu/workshops/biomed/ppt/video.html, Oct. 2004.

* cited by examiner

*Primary Examiner* — Jeffrey A Gaffin
*Assistant Examiner* — Kalpana Bharadwaj
(74) *Attorney, Agent, or Firm* — Preston Smirman; Smirman IP Law, PLLC

(57) ABSTRACT

The present invention is directed to a method of operating a knowledge capture program. The knowledge capture program has the steps of starting the knowledge capture program wherein a user can access content that is either existing content or creating new content. Once the content has been selected then a source subject matter can be selected and displayed, and then captured and incorporated into the content. The source subject matter can be edited and saved into the content. The content can then be retrieved and played in a desired mode of learning.

23 Claims, 72 Drawing Sheets

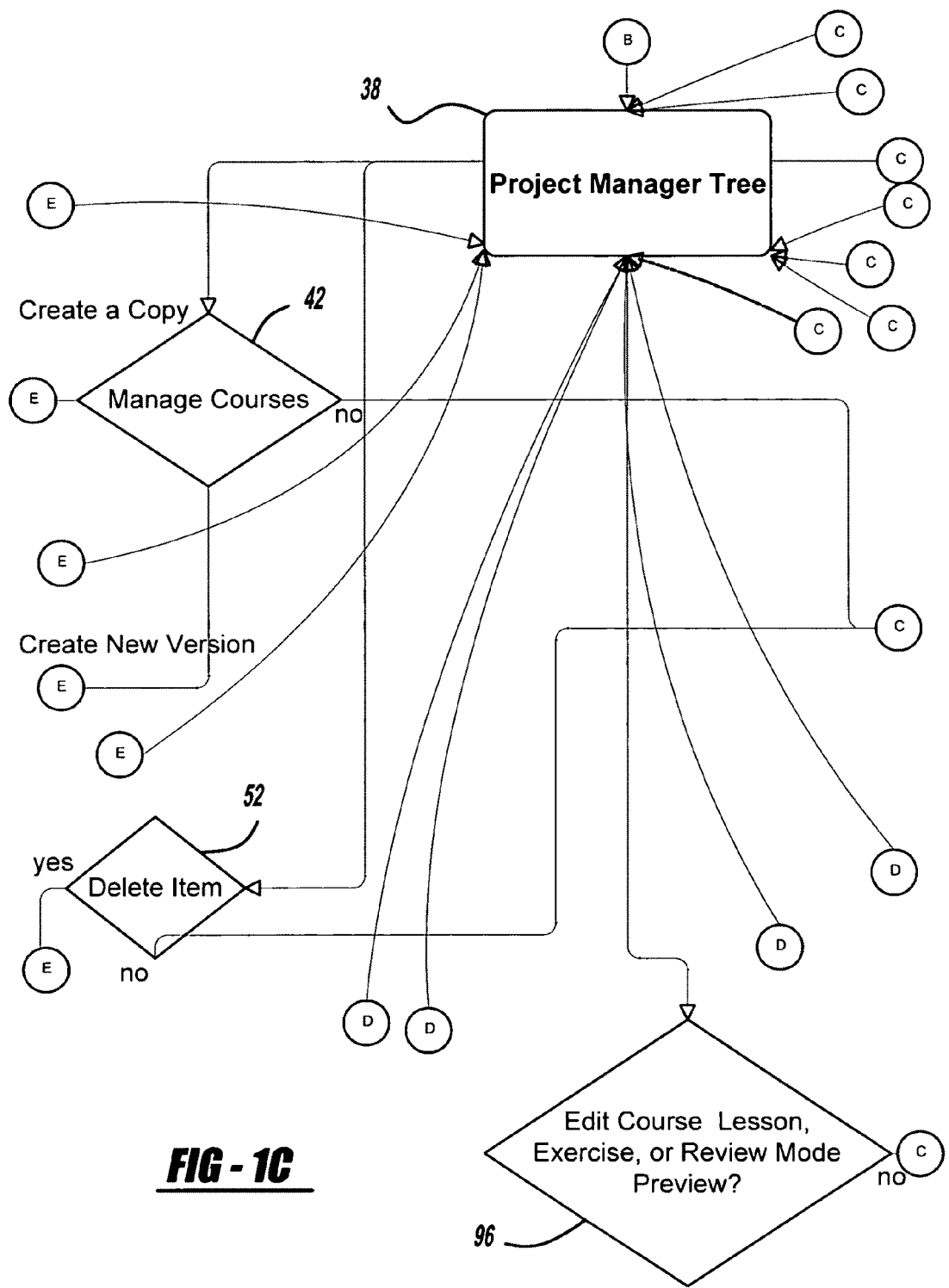

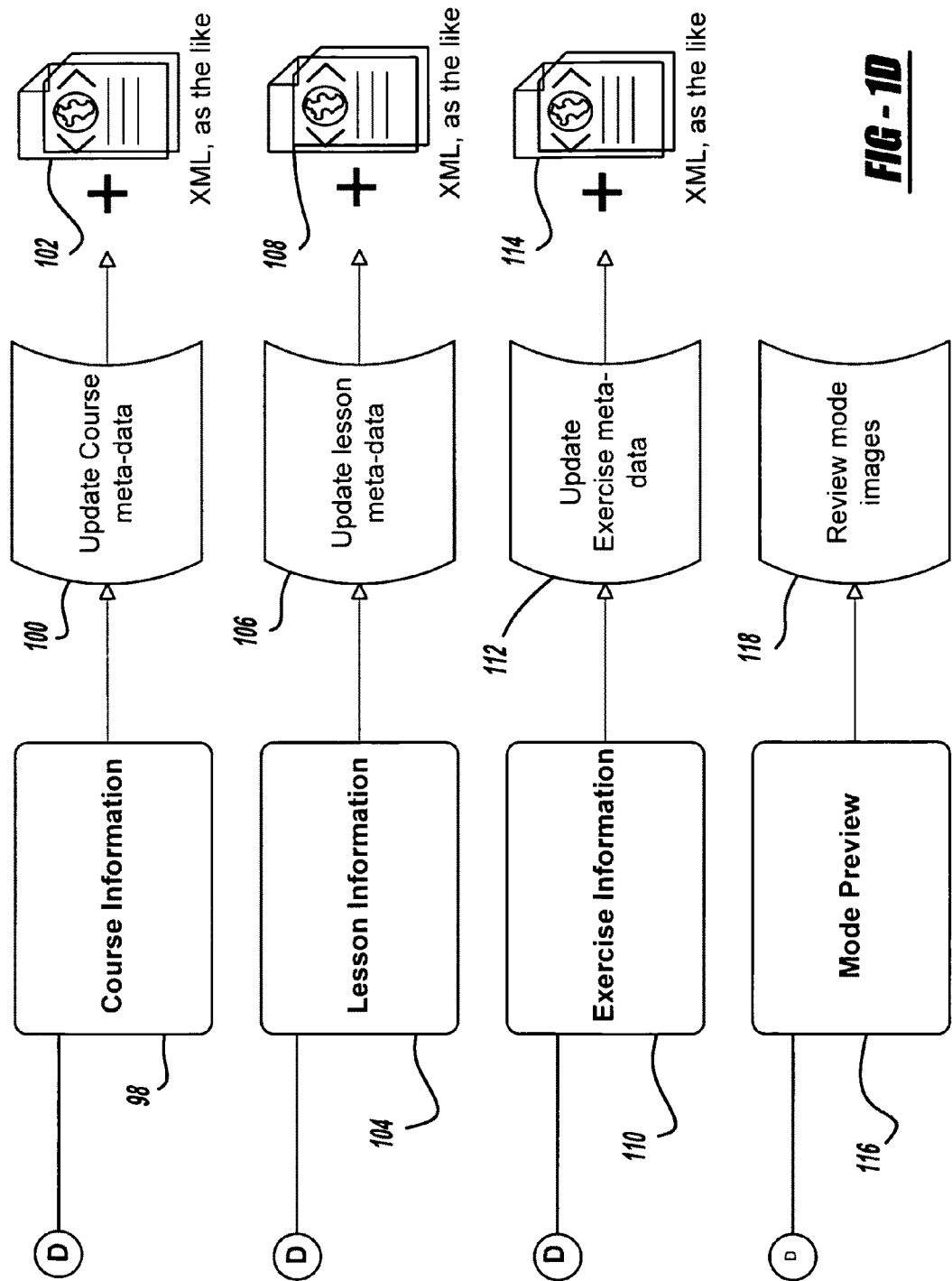

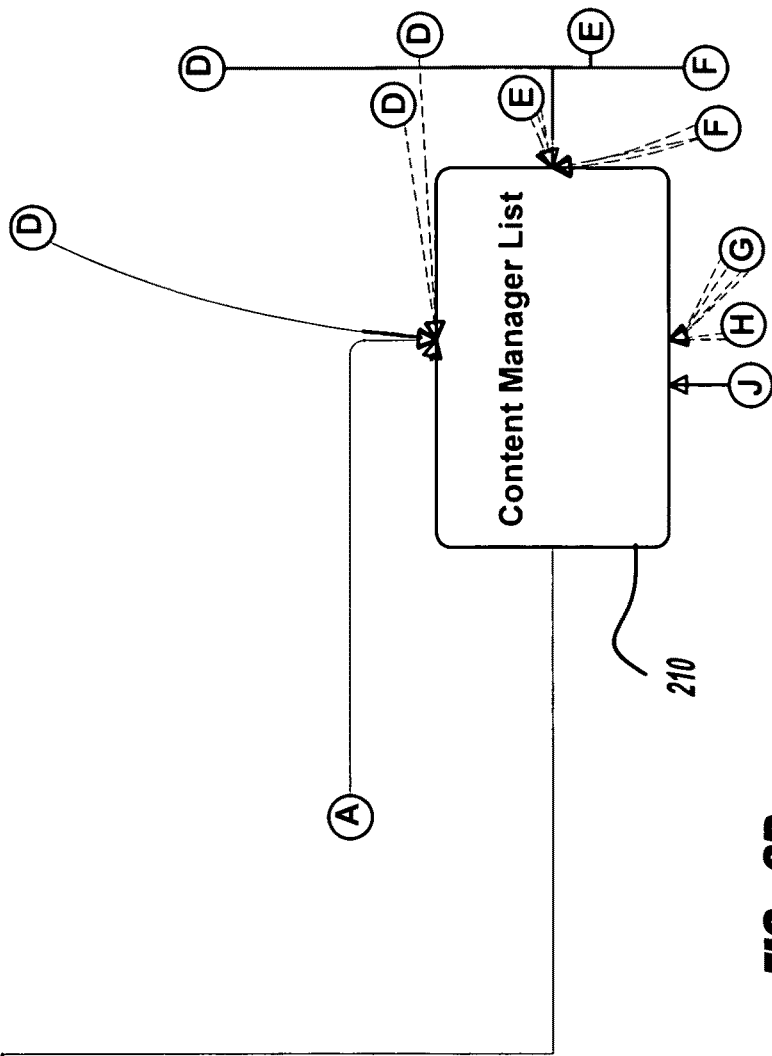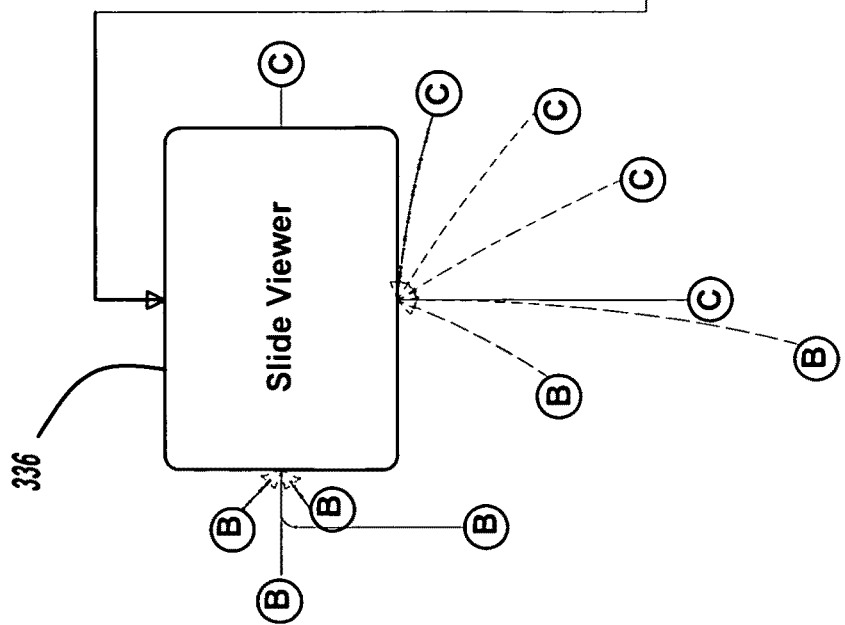
FIG-2B

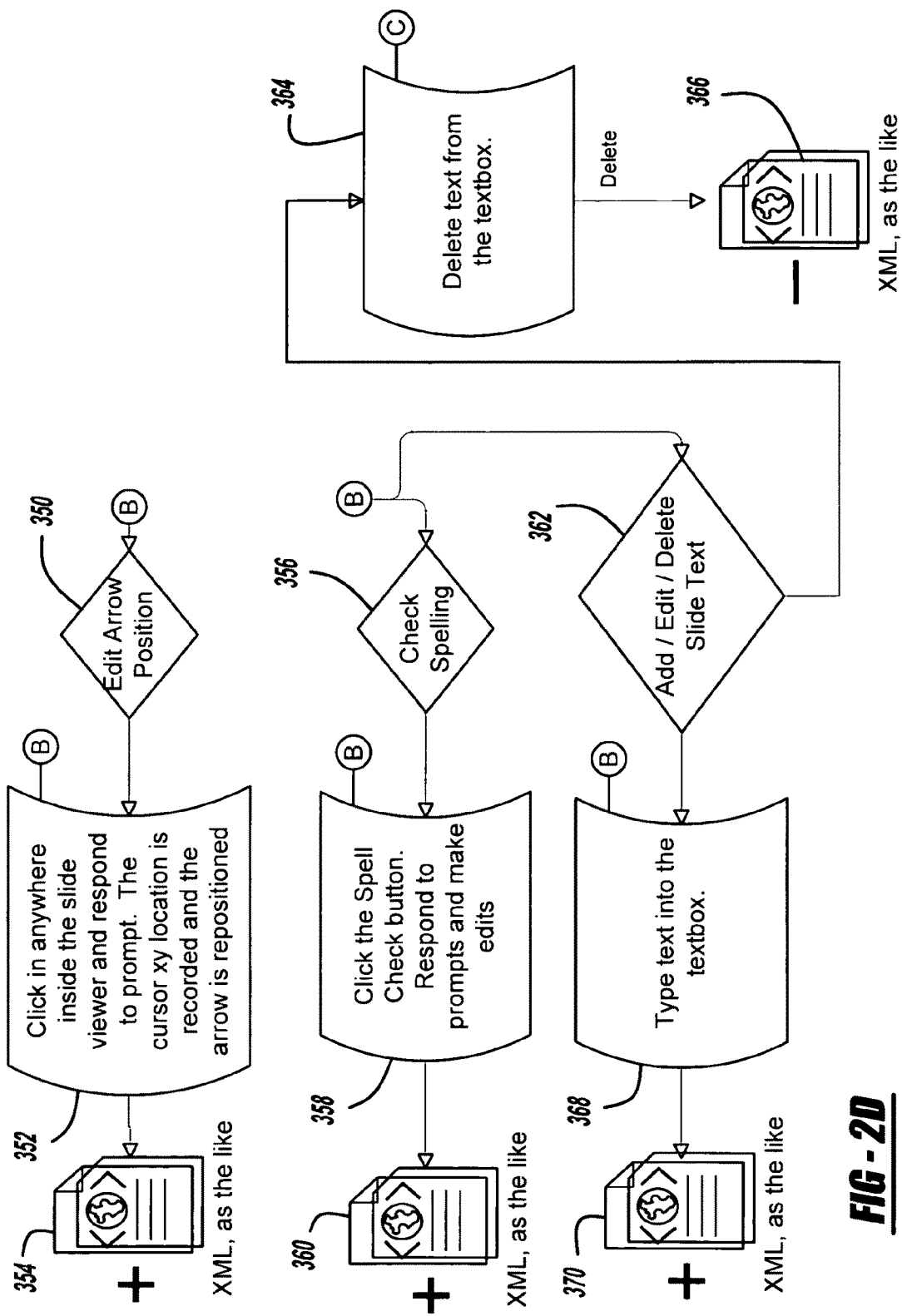

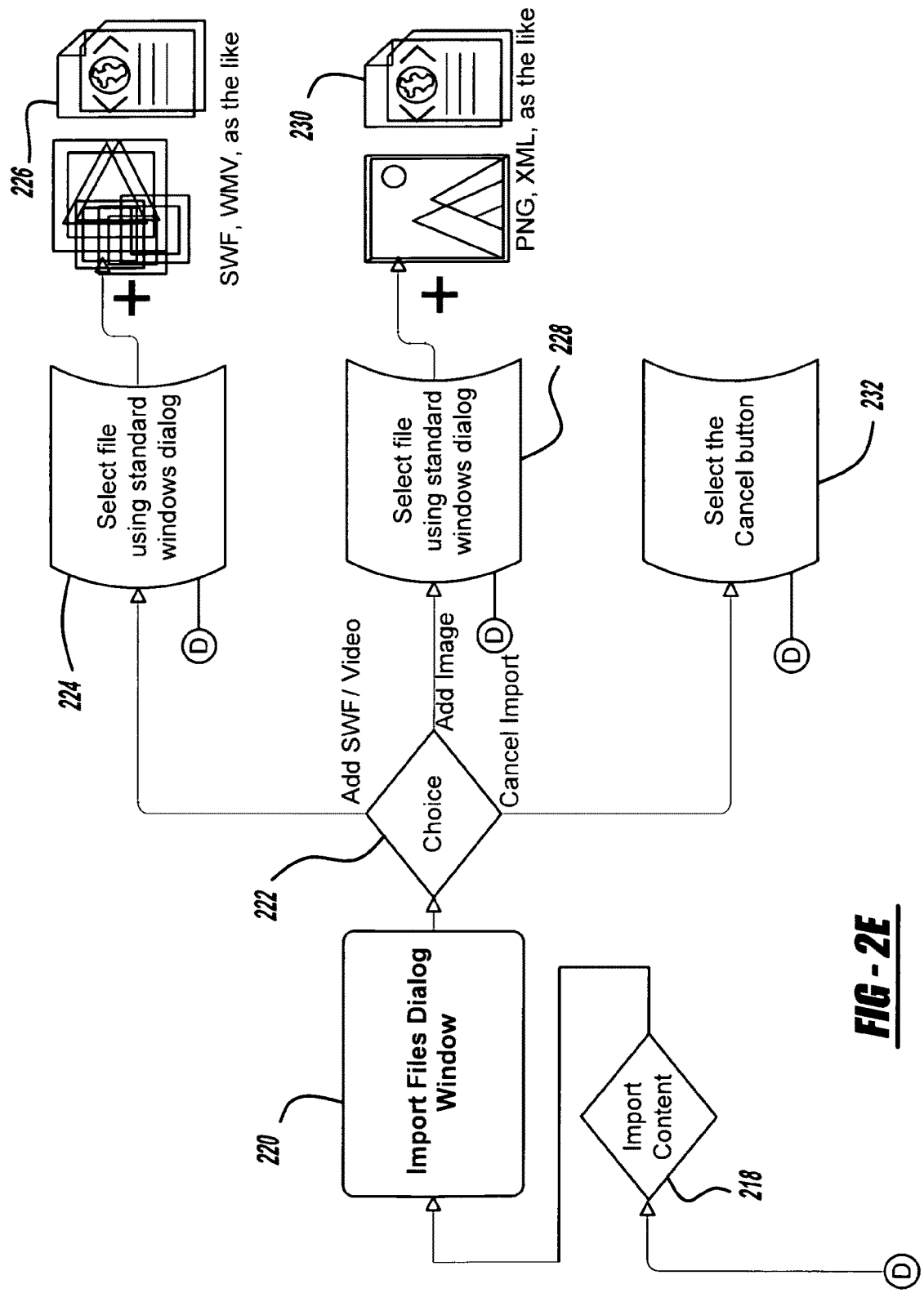

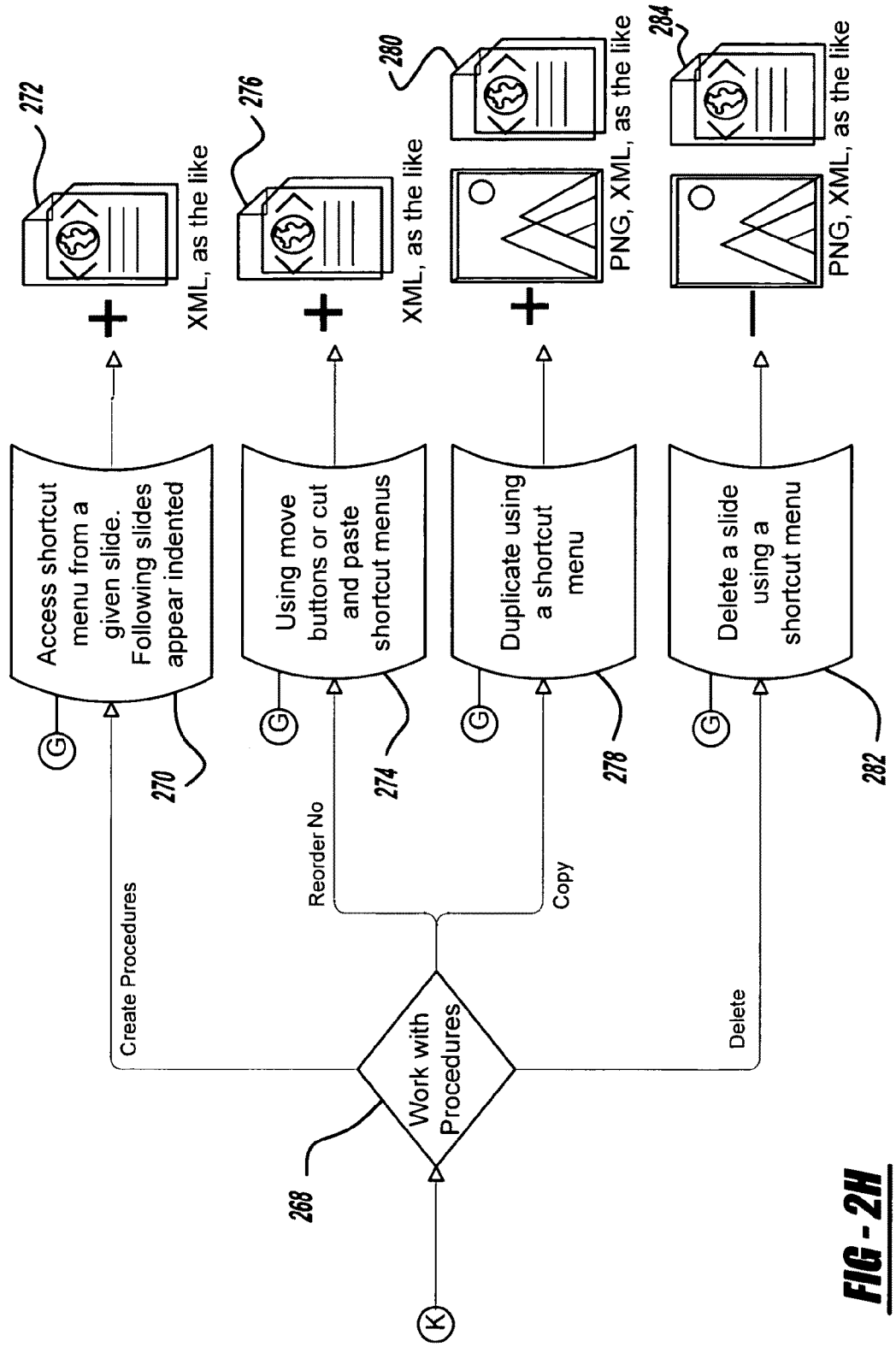

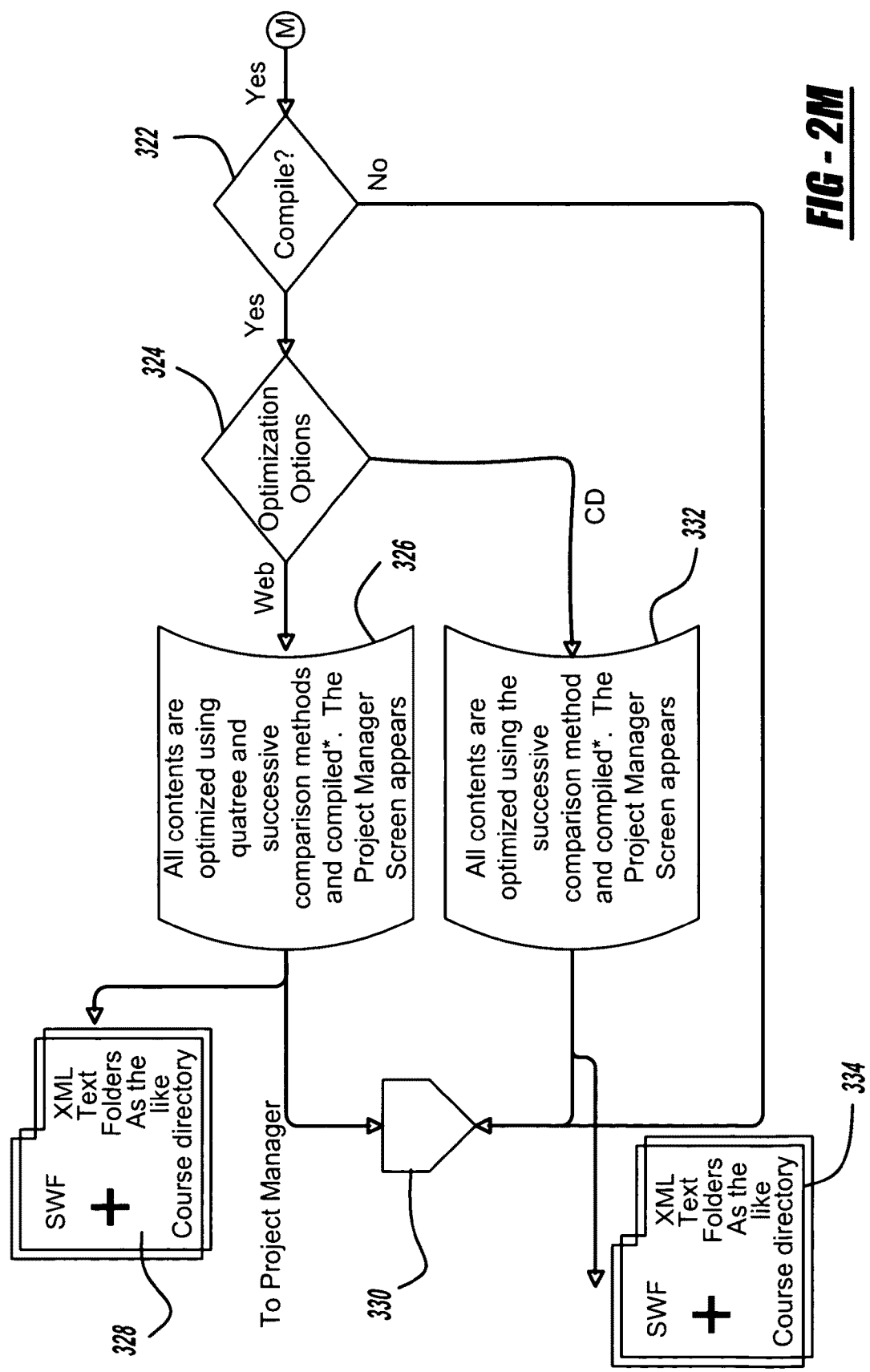

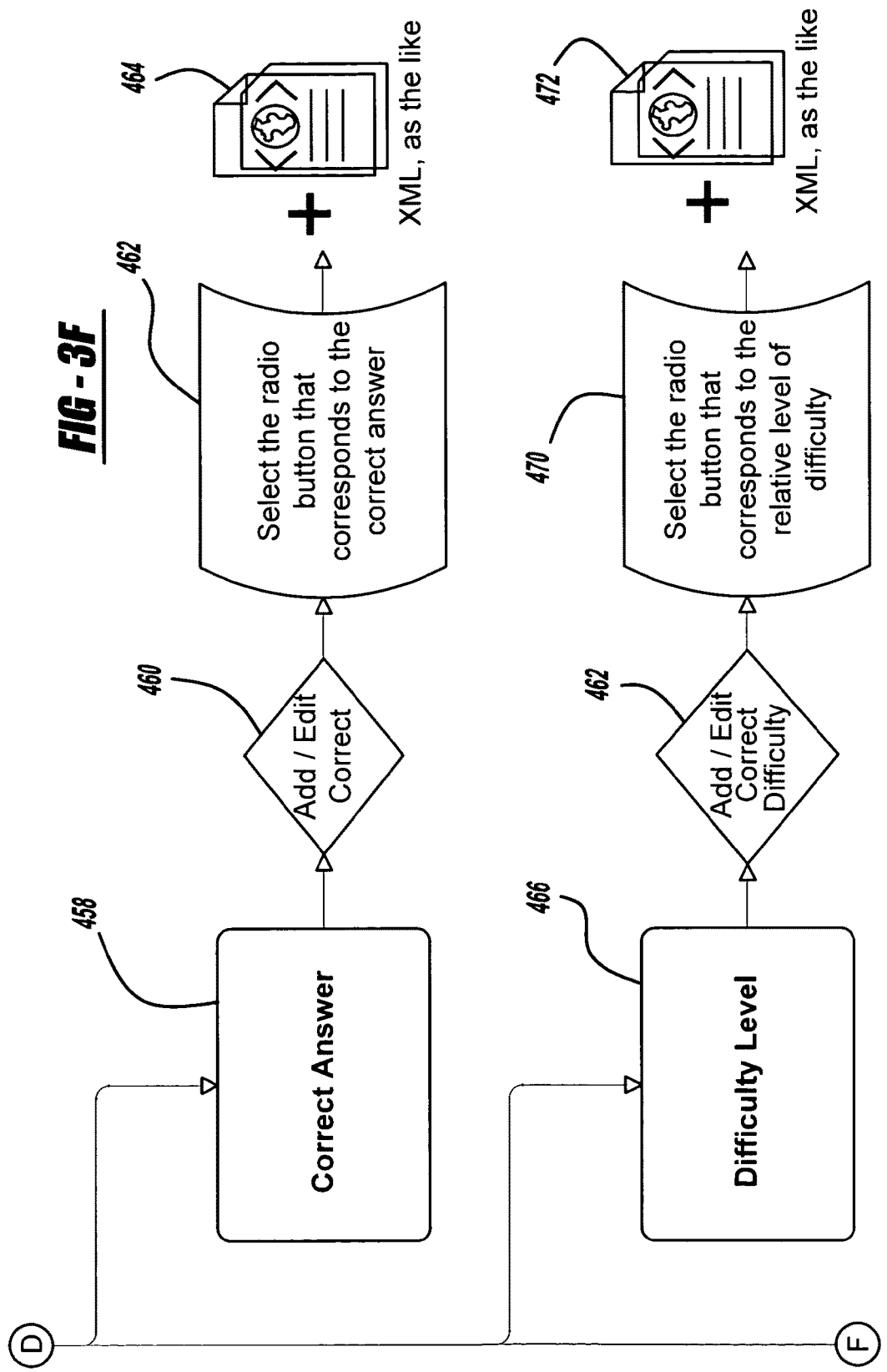

FIG-12

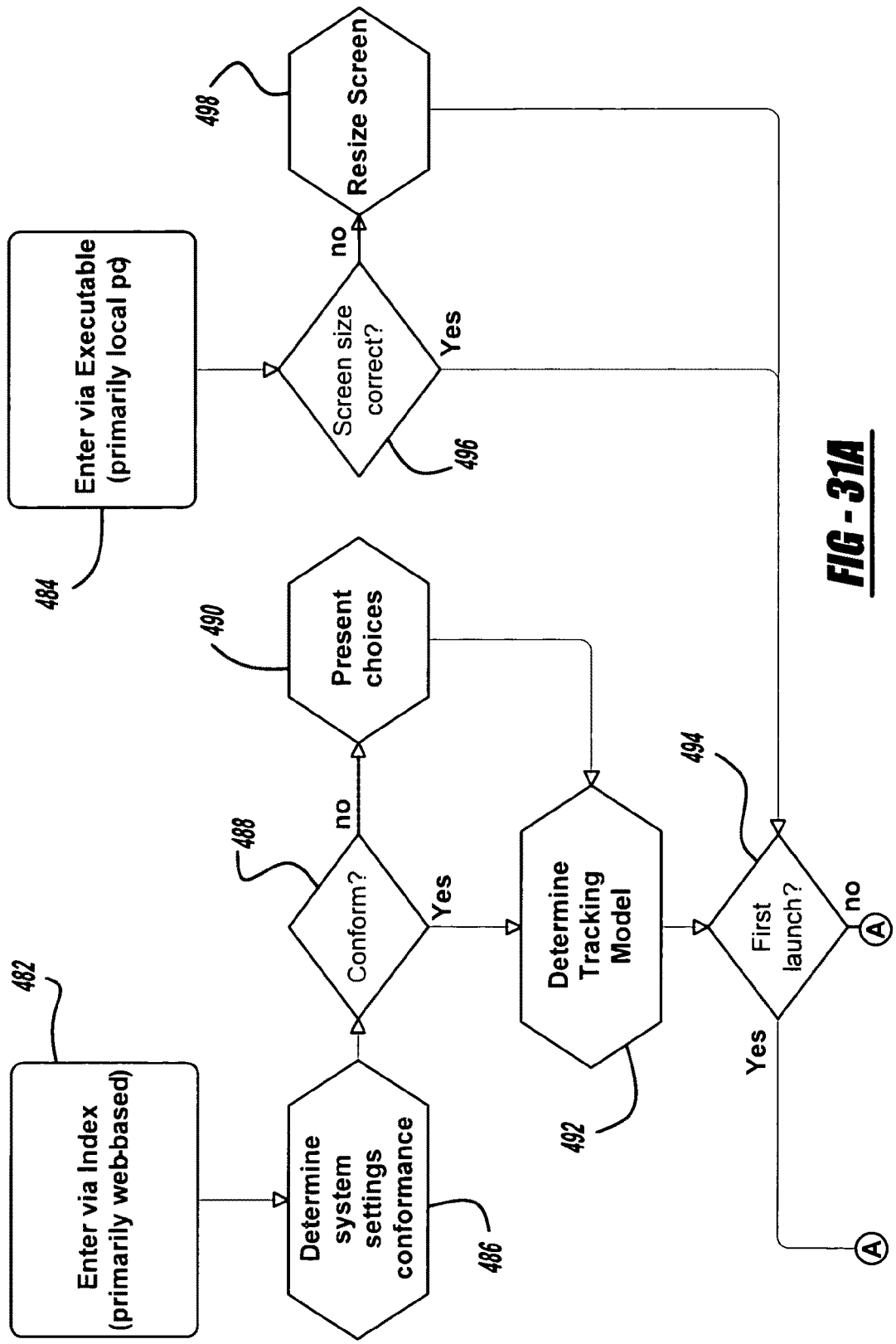

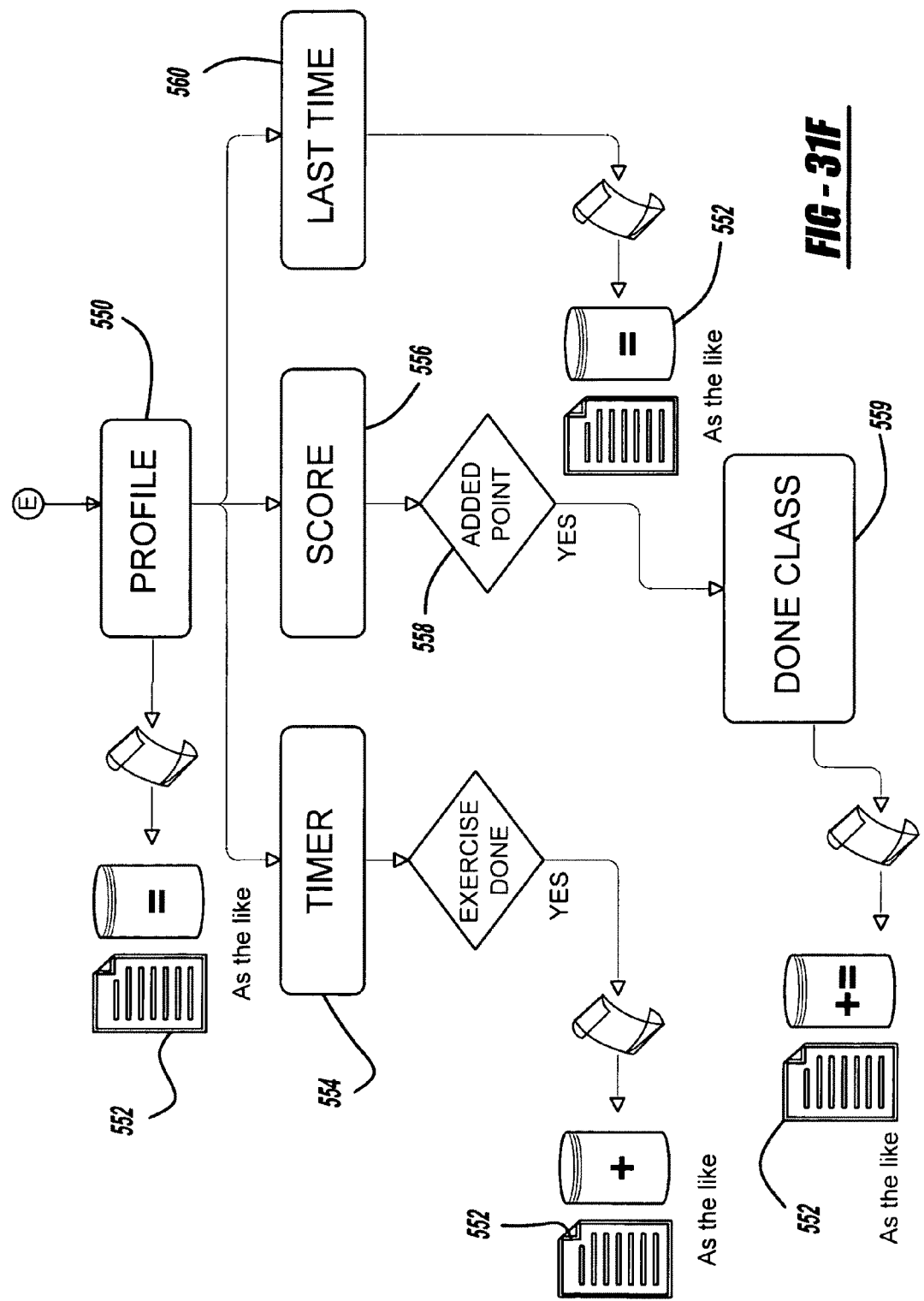

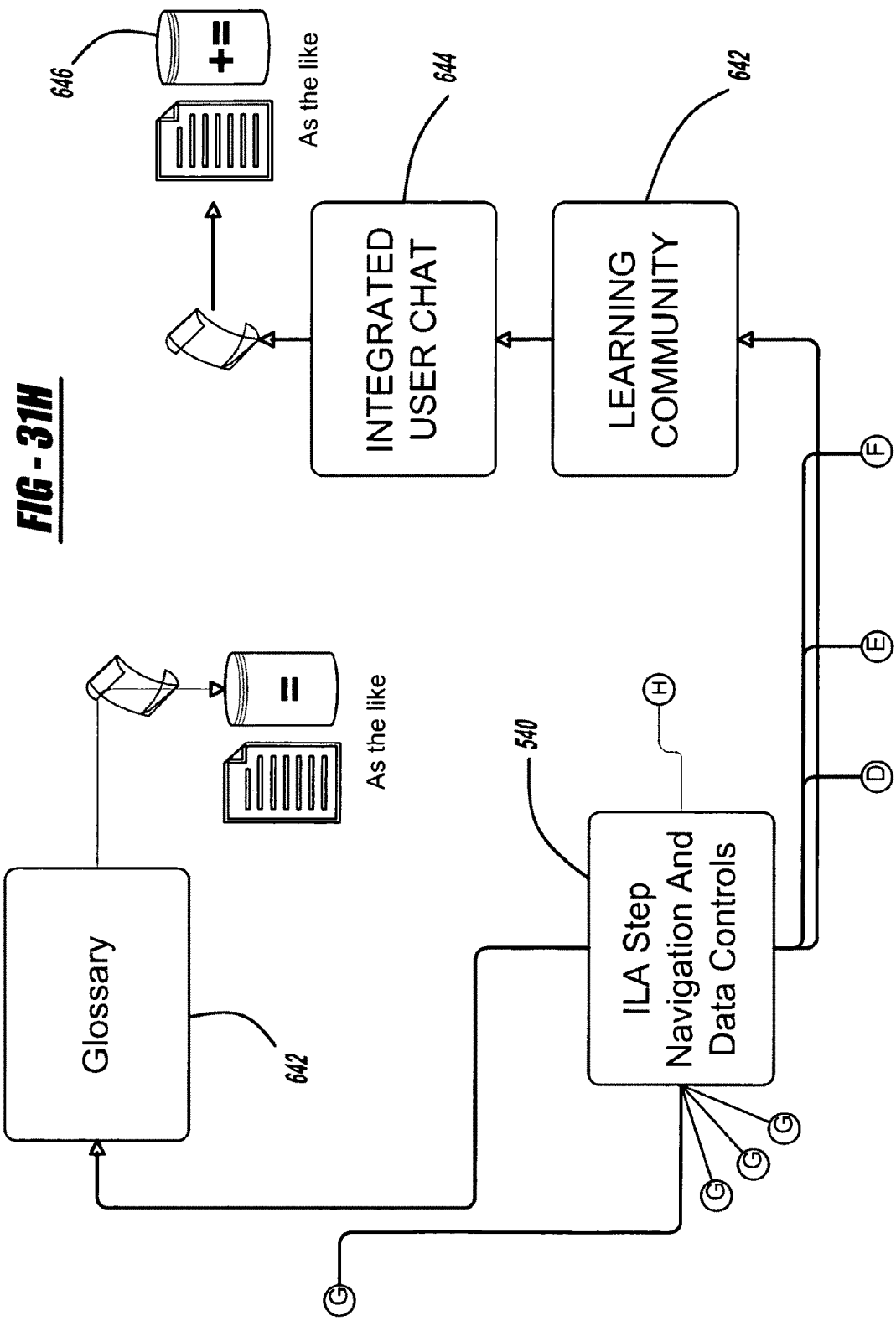

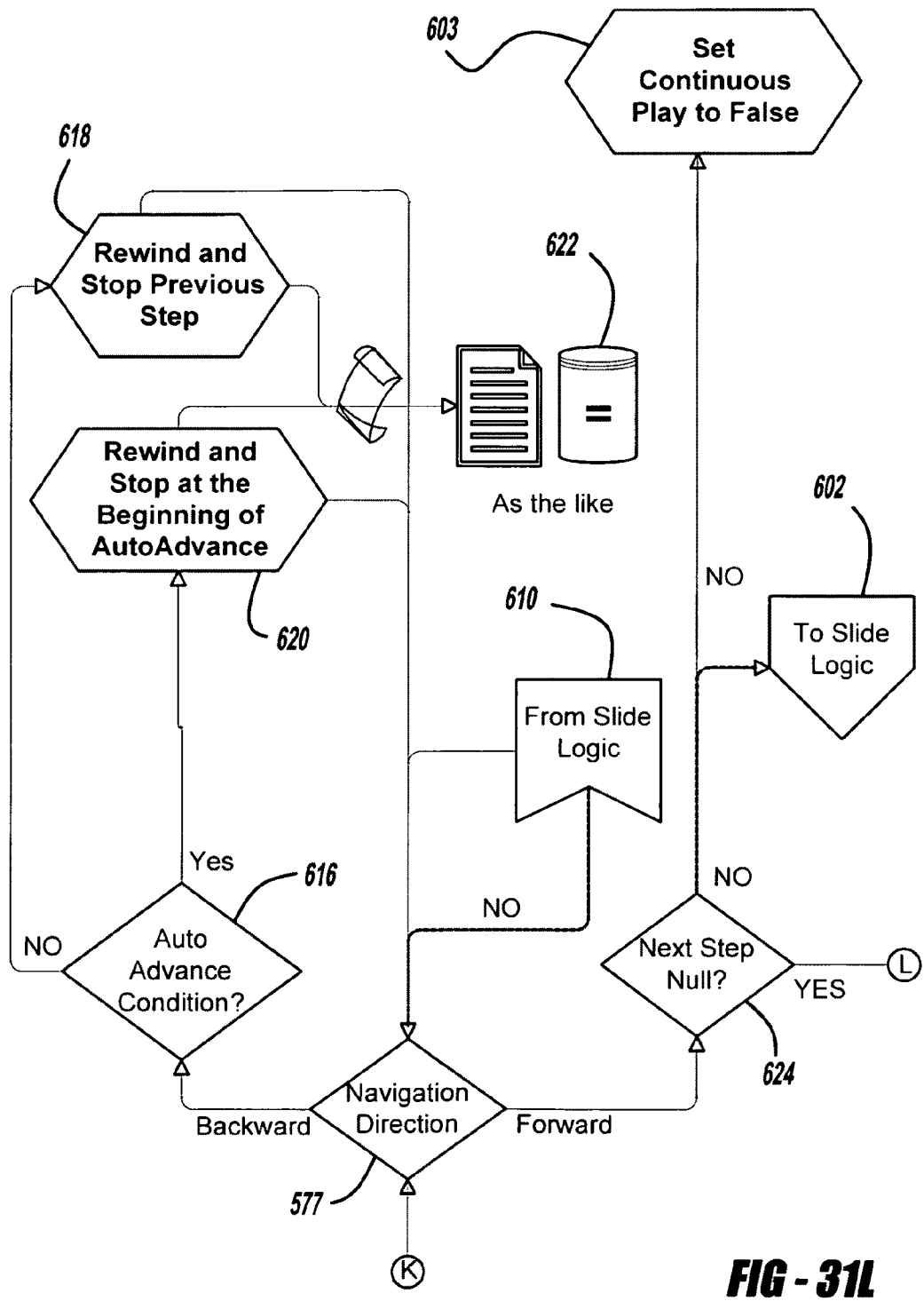

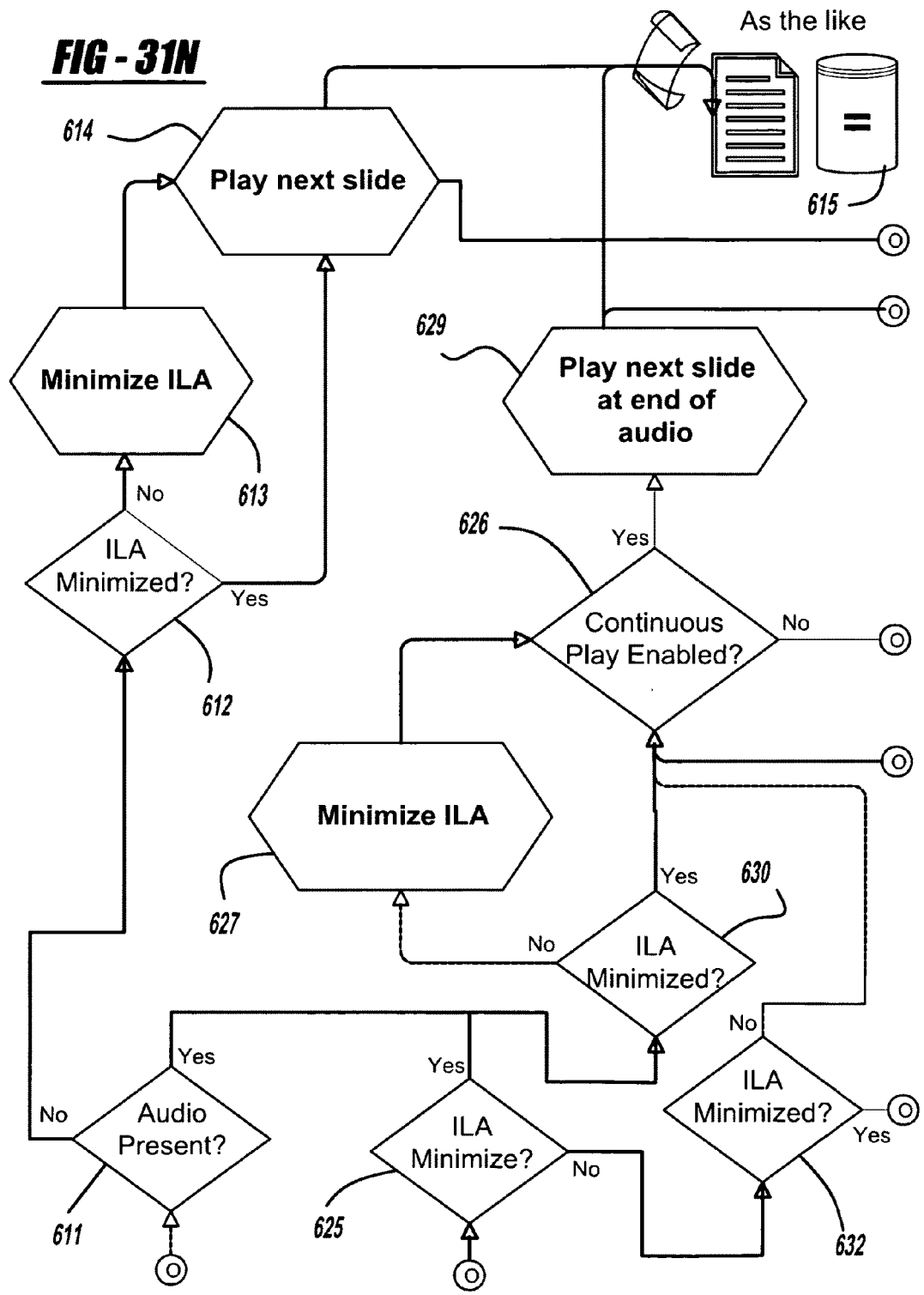

COURSE DEVELOPMENT PROGRAM

CROSS-REFERENCE TO RELATED APPLICATIONS

This application is a continuation-in-part of PCT Application No. US2006/042678 filed on Nov. 1, 2006, which claims priority to U.S. Patent Application No. 60/798,105 filed May 5, 2006 and U.S. Application No. 60/732,187 filed Nov. 1, 2005. The disclosures of the above applications are incorporated herein by reference.

FIELD OF THE INVENTION

This invention relates generally to software programs, and more particularly to data capture systems for use in conjunction with course development programs for training systems for various topics including software applications.

BACKGROUND OF THE INVENTION

Businesses are losing their knowledge base and intellectual property at an incredible rate due to corporate downsizing, early retirement, constant changing technologies, and globalization Accordingly, businesses need to capture, record and analyze all business processes, manufacturing processes and technical procedures in a step by step format that can be easily conveyed to employees, customers and supply chain, without the large expense of mass training.

Unfortunately, conventional data capture methods typically require the user, e.g., a user, to have rather extensive knowledge of software programming, especially Web-oriented markup languages such as but not limited to HTML and/or the like, or multimedia authoring programs such as but not limited to FLASH and/or the like. This is extremely problematic for users that do not possess this knowledge or are otherwise intimidated and/or frustrated by dealing with these types of course development tools.

Accordingly, there exists a need for data capture systems, especially those used in conjunction with course development programs, that allow a user to quickly and easily capture data, e.g., so as to develop a course, especially those that are used for training purposes, including but not limited to software applications.

SUMMARY OF THE INVENTION

The present invention is directed to a method of operating a knowledge capture program. The knowledge capture program has the steps of starting the knowledge capture program wherein a user can access content that is either existing content or creating new content. Once the content has been selected then a source subject matter can be selected and displayed, and then captured and incorporated into the content. The source subject matter can be edited and saved into the content. The content can then be retrieved and played in a desired mode of learning.

Additional advantages and features of the present invention will become apparent from the following description and appended claims, taken in conjunction with the accompanying drawings.

BRIEF DESCRIPTION OF THE DRAWINGS

The present invention will become more fully understood from the detailed description and the accompanying drawings, wherein:

FIGS. 1a-1g are schematic illustrations of a flowchart illustrating the primary processing steps of startup and manage project data routines of a course development system, in accordance with a first embodiment of the present invention;

FIGS. 2a-2m are schematic illustrations of a flowchart illustrating the primary processing steps of a content manager routine of a course development system, in accordance with a second embodiment of the present invention;

FIG. 3a-3g are schematic illustrations of a flowchart illustrating the primary processing steps of a quiz editor routine of a course development system, in accordance with a third embodiment of the present invention;

FIG. 12 is a view of a screen capture illustrating a lesson information screen, in accordance with a twelfth embodiment of the present invention;

DETAILED DESCRIPTION OF THE EMBODIMENTS

The following description of the preferred embodiment(s) is merely exemplary in nature and is in no way intended to limit the invention, its applications, or uses.

In accordance with the broad aspects of the present invention, there is provided a software application that enables rapid capture, documentation and interactive training of business processes and practices, thus transforming business processes into manageable Web-based learning, enables analysis, optimization and global communication of business processes, and conforms to quality systems document control and continuous improvement requirements.

More specifically, the present invention provides multiple modes of communication and learning, e.g., lecture, interactive, and quiz, guided instructions using an articulated arrow, rapid recording of any business process, easy to use content management, Web-based training modules, full audio voice-over, rapid download speeds, CD, Web-based or Internet delivery, simple text entry for step-by-step instruction, no programming or advanced computer skills required, stand-alone or learning management system integration, and import utilities for existing data (e.g., PowerPoint, images, video and/or the like).

Figure 32:
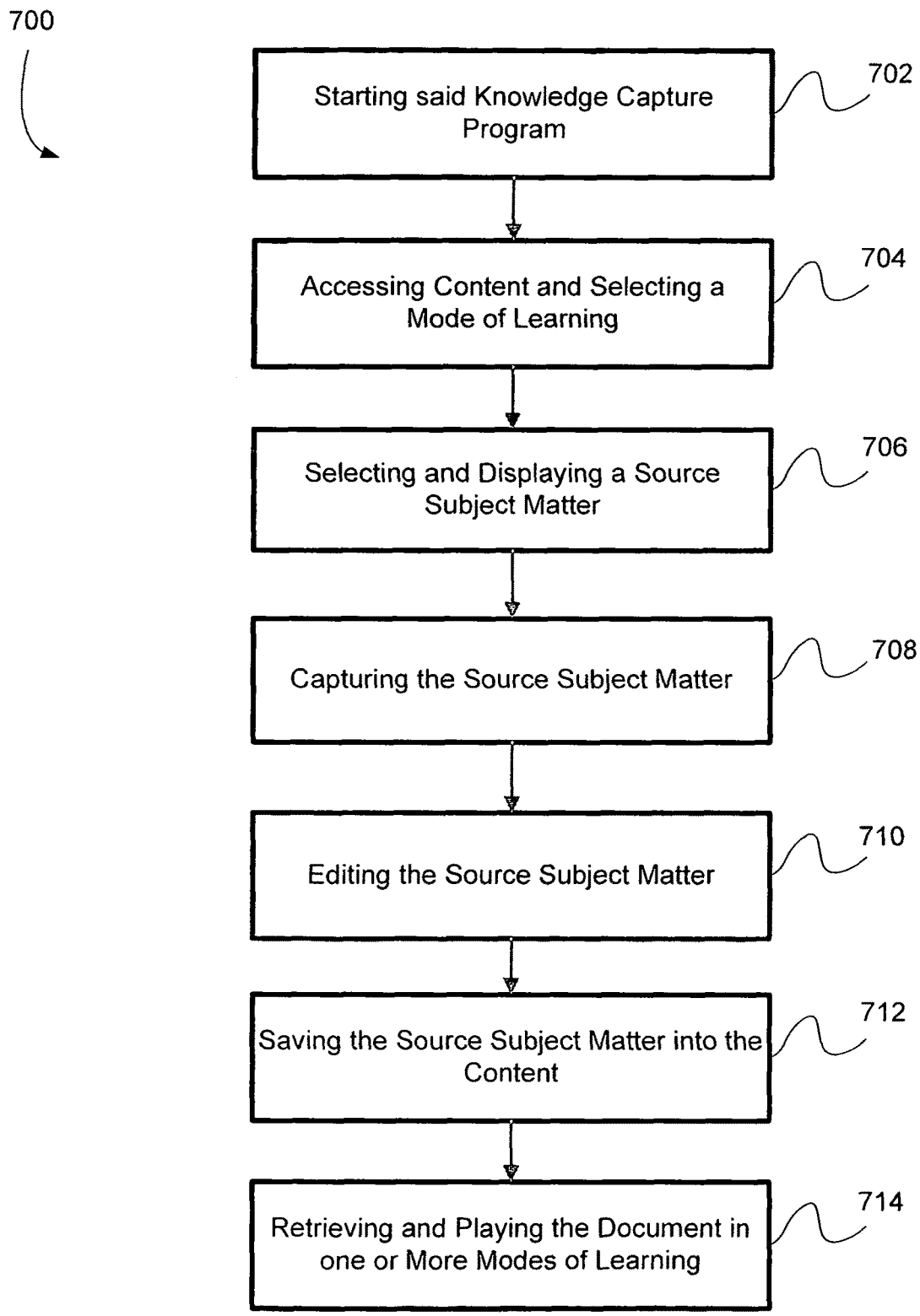
FIG. 32 is a schematic illustration of the knowledge capture program in a flow chart form.

Referring to FIG. 32 a general schematic overview of a knowledge capture program 700 is depicted. The first step 702 involves starting the knowledge capture program wherein an icon on the computer screen is provided for implementing an .exe file or the like that begins the knowledge capture program startup.

At the step 704 a user of the program enters what is known as a project manager where content can be accessed or created or an existing or previously saved content can be opened. Additionally, in the program manager a user can determine the mode of learning desired. The knowledge capture program provides several modes of learning which includes but are certainly not limited to a lecture mode, interactive mode or quiz mode.

At the step 706 the user can select and display a source of subject matter that is to be added to the content. The source of subject matter can be any type of information audio, visual or textual that can be displayed or accessed on a computer screen.

Once the source subject matter has been selected and displayed at a step 708 the source subject matter can be captured. One method of capture involves a point, shoot and action feature of the knowledge capture program which will be discussed in greater detail below. The point, shoot and action feature allows the user to quickly and easily capture source subject matter as well as add icons such as arrows to the source subject matter. If several arrows are added to the source subject matter the program also has logic within it that will automatically move the arrow between two points without any additional programming. Another method of capturing source subject matter involves importing previously captured source subject matter into the knowledge capture program and incorporating it into the content.

The knowledge capture program can also have a feature that allows a user to assign to other tasks for creating source subject matter that can be imported. For example, a user can assign to his or her co-workers a task that will involve creating content that shows how to perform a specific job duty. The saved content can be sent back to the user of the knowledge capture program where it can be imported and added to already existing content or saved into the program manager. Assigning a task can be carried out by providing others with a capture utility which will allow for the capture of source subject matter without necessarily requiring a full version of the knowledge capture program. For example, the capture utility can already previously be installed on another computer, can be downloaded, accessed through an internet based browser or provided as an active X control. However the particular method of providing a capture utility is not necessarily limited to these particular features.

At a step 710 the source subject matter can be edited by the user. The editing of the source subject matter includes adding audio, visual or audio-visual information that can be added through importation, user inputted data or some type of recording device such as a microphone. This includes adding text or other icons to the source subject matter. At a step 712 the user can save the source subject matter into the content, then at a step 714 a user can retrieve and play the content in one or more modes of learning which can be selected at the step 704. Built into the knowledge capture program are several protocols which include a course development protocol, content manager protocol and driver protocol. The course development protocol is a portion of the knowledge capture program involving steps 702 where in the program is started, step 704 where content is accessed and step 706 where source subject matter is displayed. The content manager protocol is the portion of the program that captures the source subject matter at step 708 and allows for editing the source subject matter 710 and saving the source subject matter 712 into the content. The driver protocol is the actual player that allows for the content to be retrieved and played in a selected mode of learning.

FIG. 1 and the screen shots set fourth in FIGS. 4-20 are a schematic illustration of a flowchart illustrating the primary processing steps of a course development system or course development protocol, in accordance with a first embodiment of the present invention;

In accordance with one aspect of the present invention, a course development program is provided, comprising: (1) a source of subject matter; (2) a subject matter delivery system operable to deliver the subject matter to a user; and (3) an interactive training system in operable association with the delivery system, wherein the interactive training system comprises multiple modes of subject matter presentation, wherein the modes are selectively chosen from the group consisting of lectures, exercises, examinations, and combinations thereof.

The source of the subject matter can include, without limitation, databases, electronic databases, data containment systems, and data selected from the group consisting of video files, audio files, animation files, database files, graphics files, text files, tabular files, and combinations thereof.

The subject matter delivery system can include, without limitation, computer servers, computer networks, data storage devices, optical mediums (CD, DVD, or the like), transmissions of the subject matter across a wide area network, transmissions of the subject matter across a local area network, transmissions of the subject matter from one data storage device to a second data storage device, and wireless transmissions of the subject matter.

The presentation of multiple modes of subject matter presentation can include, without limitation, text, video, audio, graphics, animation, and combinations thereof.

Referring to FIG. 1 and the screen shots set forth in FIGS. 4-20, there is shown a schematic illustration of a flowchart illustrating the primary processing steps of a course development system or course development protocol, in accordance with a first embodiment of the present invention.

The course development program of the present invention can be practiced in conjunction with the Internet, World Wide Web, intranets, extranets, electronic media (e.g., CD/DVD-based systems), or the like. By "course development," as that phrase is used herein, it is meant any method or outcome that can be used to create, modify or enable any educational, instructional and/or learning system. The subject matter that can be trained on is not limited, as it may include any topic including the physical, chemical and/or biological sciences, any type of engineering, including aeronautical, automotive, chemical, civil, computer, electrical, industrial, nuclear, or the like, as well as any other topic, including non-scientific topics.

In order to fully appreciate the benefits and features of the data capture system of the present invention, it is assumed that an individual practicing the present invention will have: access to a computer (and is conversant with the basic functions thereof; an Internet service provider ("ISP") (e.g., AOL, JUNO, or the like) with e-mail capability; a Web browser (e.g., INTERNET EXPLORER, NETSCAPE, or the like); any required plug-ins (e.g., FLASH, SHOCKWAVE, JAVA VIRTUAL MACHINE, or the like); and have the ability to navigate successfully to any given uniform resource locator ("URL").

In conjunction with the startup routine phase, the first step is for the user to activate (e.g., by causing the .exe file to execute the program) the course development program 10 of the present invention, e.g., by clicking on an icon or the like on a computer. By way of a non-limiting example, a user could navigate to the URL of the main Web Site that contains the course development program of the present invention (e.g., with the aid of a Web browser, such as INTERNET EXPLORER, NETSCAPE, or the like). By way of a non-limiting example, the URL http://www.scate.com can be designated as the main Web Site for the course development program of the present invention.

Once this course development program 10 has been activated, the user will then observe a screen containing a Project Dialog Window 12.

At this point, a logic gate 14 is reached wherein a decision is made whether to access a recent course or project, an existing course or project, or to create a new course or project. If the decision is made to access a recent course or project, then the user would select a course or project from the Projects list, for example, as shown at step 16. Then at a logic gate 24 the user is presented with the option of adjusting the resolution.

If the decision is made to create a new course or project, then the user would create a Create Project file in a desired client or network directory using standard Windows interface, for example, as shown in step 18. Once the user creates the project file and clicks the save button, it will be saved in an appropriate project directory 20 in any number of formats, including but not limited to SPCL, XML, text, and/or the like.

If the decision is made to open an existing course or project, then the user would use the Open Projects Dialog and select using a standard Windows interface, for example, as shown in step 22. At the logic gate 24 a decision is made whether the monitor resolution is to be set at 1024×768 pixels.

If the decision is made that the monitor resolution is not to be set at 1024×768 pixels, the user would encounter a Change Message box 26.

At this point, a logic gate 28 is reached wherein a decision is made whether the monitor resolution is to be changed.

If the decision is made that the monitor resolution is to be changed, then the user would adjust the computer screen resolution and the previous resolution would be recorded, for example, as shown in step 30. At that point, the user would be directed to the Project Manager Window 32, which is part of the manage project data phase.

If the decision is made that the monitor resolution is not to be changed, then the user would be directed to the Project Manager Window 32.

The Project Manager Window 32 can be in communication with an off-page reference source, e.g., the Content Manager, for example, as shown in step 33. Once at the Project Manager Window 32, a logic gate 34 is reached wherein a decision is made whether to open the Project Dialog Window 12, access the Help Window 36, or access the Project Manager Tree 38.

If the decision is made to open the Project Dialog Window 12, the user will be directed back to the startup routine area, as previously described.

If the decision is made to open the Help Window 36, the help window screen will be displayed.

At this point, a logic gate 40 is reached wherein a decision is made whether to use the help function.

If the decision is made not to use the help function, the user is directed back to the Project Manager Window 32.

If the decision is made to use the help function, the user is directed back to the Help Window 36.

If the decision is made to work on a current course or project, the user is directed to the Project Manager Tree 38. It is at this point that the actual course or project can be created and/or modified.

At this point, several logic gates are encountered by the user. One logic gate 42 is reached wherein a decision is made whether to manage courses.

If a decision is made to copy a course, the user could respond to a message box wherein the course is copied and saved under a new title, for example, as shown in step 44. Once the user copies and names the course file, it will be saved in an appropriate project directory 46 in any number of formats, including but not limited to SPCL, XML, text, and/or the like, and can include lecture, interactive exercise and/or quiz files. Once all of this accomplished, the user would be directed back to the Project Manager Tree 38.

If a decision is made to create a new version of a course, the user could respond to a message box wherein the course is copied and prefixed with an appropriate revision number, for example, as shown in step 48. Once the user copies and names the course file, it will be saved in an appropriate project directory 50 in any number of formats, including but not limited to SPCL, XML, text, and/or the like, and can include lecture, interactive exercise and/or quiz files. Once all of this accomplished, the user would be directed back to the Project Manager Tree 38.

Another logic gate 52 is reached wherein a decision is made whether to delete a course.

If a decision is made to delete a course, the user could delete the course along with all directories and assets, for example, as shown in step 54. Once the user deletes the course file, it will be removed from the appropriate project directory 56, including the associated lecture, interactive exercise and/or quiz files. Once all of this accomplished, the user would be directed back to the Project Manager Tree 38.

However, if the decision is made not to manage courses (see logic gate 42) or to delete a course (see logic gate 52), the user could use plus and minus widgets to expand and collapse various tree nodes and review meta-data, for example, as shown at step 58.

Another logic gate 60 is reached wherein a decision is made whether to copy an item.

If a decision is made to copy an item, the user could copy the item to the clipboard and may paste the item into a different context of the same hierarchical level, for example, as shown in step 62. Once the user copies the item, it will be saved in an appropriate project directory 64 in any number of formats, including but not limited to SPCL, XML, text, and/or the like, and can include lecture, interactive exercise and/or quiz files. Once all of this accomplished, the user would be directed back to the Project Manager Tree 38.

However, if the decision is made not to copy an item, the user could use plus and minus widgets to expand and collapse various tree nodes and review meta-data, for example, as shown at step 58.

Another logic gate 66 is reached wherein a decision is made whether to reorder an item.

If a decision is made to reorder an item, the user could reorder the item in relation to its peers in the tree, for example, as shown in step 68. Once the user reorders the item, it will be saved in an appropriate project directory 70 in any number of formats, including but not limited to SPCL, XML, text, and/or the like, and can include lecture, interactive exercise and/or quiz files. Once all of this accomplished, the user would be directed back to the Project Manager Tree 38.

However, if the decision is made not to reorder an item, the user could use plus and minus widgets to expand and collapse various tree nodes and review meta-data, for example, as shown at step 58.

Another logic gate 72 is reached wherein a decision is made whether to create a course.

If a decision is made to create a course, the user would be directed to a Course Details Windows 74. The user could then enter the course meta-data, for example, as shown in step 76. Once the user enters the course meta-data, it will be saved in an organization or source content container 78 in any number of formats, including but not limited to SPCL, XML, text, and/or the like, and can include lecture, interactive exercise and/or quiz files. Once all of this accomplished, the user would be directed back to the Project Manager Tree 38.

However, if the decision is made not to create a course, the user could use plus and minus widgets to expand and collapse various tree nodes and review meta-data, for example, as shown at step 58.

Another logic gate 80 is reached wherein a decision is made whether to create a lesson.

If a decision is made to create a lesson, the user would be directed to a Lesson Details Windows 82. The user could then enter the lesson meta-data, for example, as shown in step 84. Once the user enters the lesson meta-data, it will be saved in an organization or source content container 86 in any number of formats, including but not limited to SPCL, XML, text, and/or the like, and can include lecture, interactive exercise and/or quiz files. Once all of this accomplished, the user would be directed back to the Project Manager Tree 38.

However, if the decision is made not to create a lesson, the user could use plus and minus widgets to expand and collapse various tree nodes and review meta-data, for example, as shown at step 58.

Another logic gate 88 is reached wherein a decision is made whether to create an exercise.

If a decision is made to create an exercise, the user would be directed to an Exercise Details Windows 90. The user could then enter the exercise meta-data, for example, as shown in step 92. Once the user enters the exercise meta-data, it will be saved in an organization or source content container 94 in any number of formats, including but not limited to SPCL, XML, text, and/or the like, and can include lecture, interactive exercise and/or quiz files. Once all of this accomplished, the user would be directed back to the Project Manager Tree 38.

However, if the decision is made not to create an exercise, the user could use plus and minus widgets to expand and collapse various tree nodes and review meta-data, for example, as shown at step 58.

Another logic gate 96 is reached wherein a decision is made whether to edit a course, lesson, exercise, and/or review mode preview.

If a decision is made to edit a course, the user would be directed to a Course Information screen 98. The user could then update the course meta-data, for example, as shown in step 100. Once the user updates the course meta-data, it will be saved in an organization or source content container 102 in any number of formats, including but not limited to SPCL, XML, text, and/or the like, and can include lecture, interactive exercise and/or quiz files. Once all of this accomplished, the user would be directed back to the Project Manager Tree 38.

If a decision is made to edit a lesson, the user would be directed to a Lesson Information screen 104. The user could then update the lesson meta-data, for example, as shown in step 106. Once the user updates the lesson meta-data, it will be saved in an organization or source content container 108 in any number of formats, including but not limited to SPCL, XML, text, and/or the like, and can include lecture, interactive exercise and/or quiz files. Once all of this accomplished, the user would be directed back to the Project Manager Tree 38.

If a decision is made to edit an exercise, the user would be directed to an Exercise Information screen 110. The user could then update the exercise meta-data, for example, as shown in step 112. Once the user updates the exercise meta-data, it will be saved in an organization or source content container 114 in any number of formats, including but not limited to SPCL, XML, text, and/or the like, and can include lecture, interactive exercise and/or quiz files. Once all of this accomplished, the user would be directed back to the Project Manager Tree 38.

If a decision is made to review the mode preview, the user would be directed to a Mode Preview screen 116. The user could then review the mode images, for example, as shown in step 118. Once all of this accomplished, the user would be directed back to the Project Manager Tree 38.

However, if the decision is made not to edit a course, lesson, exercise, and/or review mode preview, the user could use plus and minus widgets to expand and collapse various tree nodes and review meta-data, for example, as shown at step 58.

Another logic gate 120 is reached wherein a decision is made whether to create mode content.

If a decision is made to create mode content with respect to lecture or interactive modes in the Content Manager, the user would be directed to an off page reference, e.g., the Content Manager, for example, as shown in step 122.

If a decision is made to create mode content with respect to a quiz mode in the Content Manager, the user would be directed to an off page reference, e.g., the Quiz Editor, for example, as shown in step 124.

However, if the decision is made not to create mode content, the user would be directed back to logic gate 96.

Referring to FIG. 2, there is shown a schematic illustration of a flowchart illustrating the primary processing steps of a content manager routine of a course development system, in accordance with a second embodiment of the present invention.

The user would navigate to the Content Manager Window 200, which is in communication with an off page reference, e.g., the Project Manager, for example, as shown in step 202.

A logic gate 204 is reached wherein a decision is made whether to open the Help Window or to work with the content. If the user opts to open the Help Window, the user is directed to the Help Window 206.

A logic gate 208 is reached wherein a decision is made whether to use the Help function.

If a decision is made to use the Help function, the user would be directed to the Help Window 206.

However, if the decision is made not to use the Help function, the user would be directed to the Content Manager Window 200.

If the decision is made to work with the content, then the user is directed to the Content Manager List 210.

A logic gate 218 is reached wherein a decision is made regarding the importation of content.

If a decision is made to import content, the user would be directed to the Import Files Dialog Window 220.

A logic gate 222 is reached wherein a decision is made whether to add SWF/Video, add images, and/or cancel the importation of content.

If the decision is made to add SWF/Video files, the user would select the file using standard Windows dialog, for example, as shown in step 224. Once the user imports the files, it will be saved in an organization or source content container 226 in any number of formats, including but not limited to SWF, WMV, XML, and/or the like, and can include lecture, interactive exercise and/or quiz files. Once all of this accomplished, the user would be directed back to the Content Manager List 210.

If the decision is made to add image files, the user would select the file using standard Windows dialog, for example, as shown in step 228. Once the user imports the files, it will be saved in an organization or source content container 230 in any number of formats, including but not limited to PNG, XML, and/or the like, and can include lecture, interactive exercise and/or quiz files. Once all of this accomplished, the user would be directed back to the Content Manager List 210.

If the decision is made to cancel the content importation, the user would select the Cancel button, for example, as shown in step 232. Once the user hits the Cancel button, the user would be directed back to the Content Manager List 210.

A logic gate 234 is reached wherein a decision is made whether to work with the Glossary.

If the decision is made to work with the Glossary, the user would be directed to the Glossary Dialog Window 236.

A logic gate 238 is reached wherein a decision is made whether to add/edit the Glossary, delete an entry from the Glossary, and/or close the Glossary.

If a decision is made to add/edit the Glossary, the user could enter terms and definitions in a standard data grid, for example, as shown in step 240. Once the user adds/edits the Glossary, it will be saved in an organization or source content container 242 in any number of formats, including but not limited to XML and/or the like, and can include lecture, interactive exercise and/or quiz files. Once all of this accomplished, the user would be directed back to the Content Manager List 210.

If a decision is made to delete an entry from the Glossary, the user could then delete the entry from the grid using a shortcut menu, for example, as shown in step 244. Once the user deletes entry, it will be deleted from an organization or source content container 246. Once all of this accomplished, the user would be directed back to the Content Manager List 210.

If a decision is made to close the Glossary, the user could select the Control Manager button, for example, as shown in step 248. Once all of this accomplished, the user would be directed back to the Content Manager List 210.

A logic gate 250 is reached wherein a decision is made whether to work with Audio.

If the decision is made to work with Audio, the user would be directed to the Capture Sound Dialog Window 252.

A logic gate 254 is reached wherein a decision is made whether to choose the capture device, record audio, playback audio, and/or delete audio.

If a decision is made to choose a capture device, the user could select a recording device installed on the computer, for example, as shown in step 256. Once the user chooses the recording device, the user would be directed back to the Content Manager List 210.

If a decision is made to record audio, the user could speak into a recording device or imported audio attached to the computer, for example, as shown in step 258. Once the user records the audio, it will be saved as a WAV, MP3 and/or the like file, for example, as shown in step 260. Once all of this accomplished, the user would be directed back to the Content Manager List 210.

If a decision is made to playback audio, the user could control playback using Windows Media controls, for example, as shown in step 262. Once all of this accomplished, the user would be directed back to the Content Manager List 210.

If a decision is made to delete audio, the user could delete the slide's audio source file, for example, as shown in step 264. Once the user deletes the audio file, the WAV, MP3 and/or the like file will be deleted, for example, as shown in step 266. Once all of this accomplished, the user would be directed back to the Content Manager List 210.

A logic gate 268 is reached wherein a decision is made whether to create procedures, reorder procedures, copy procedures, and/or delete procedures.

If a decision is made to create procedures, the user could access a shortcut menu from a given slide, for example, as shown in step 270. Once the user creates the procedures, it will be saved in an organization or source content container 272 in any number of formats, including but not limited to XML and/or the like, and can include lecture, interactive exercise and/or quiz files. Once the user creates the procedures, the user would be directed back to the Content Manager List 210.

If a decision is made to reorder procedures, the user could use or more buttons or cut and paste shortcut menus, for example, as shown in step 274. Once the user reorders the procedures, it will be saved in an organization or source content container 276 in any number of formats, including but not limited to XML and/or the like, and can include lecture, interactive exercise and/or quiz files. Once all of this accomplished, the user would be directed back to the Content Manager List 210.

If a decision is made to copy procedures, the user could duplicate procedures using a shortcut menu, for example, as shown in step 278. Once the user copies the procedures, it will be saved in an organization or source content container 280 in any number of formats, including but not limited to PNG, XML and/or the like, and can include lecture, interactive exercise and/or quiz files. Once all of this accomplished, the user would be directed back to the Content Manager List 210.

If a decision is made to delete procedures, the user could delete a slide using a shortcut menu, for example, as shown in step 282. Once the user deletes the procedures, the PNG, XML and/or the like file will be deleted, for example, as shown in step 284. Once all of this accomplished, the user would be directed back to the Content Manager List 210.

A logic gate 286 is reached wherein a decision is made whether to capture slides, reorder slides, copy slides, and/or delete slides.

If a decision is made to capture slides, the user could begin the capture process, for example, as shown in step 288. The user could then point the mouse (i.e., GUI) pointer at the desired item of interest, for example, as shown in step 288a. The user would the shoot or otherwise record the slide, for example, as shown in step 288b. Once the user captures the slide, it will be saved in an organization or source content container 290 in any number of formats, including but not limited to PNG, XML and/or the like, and can include lecture, interactive exercise and/or quiz files. The user could then perform the action, i.e., but not limited to click, type, review and/or the like, for example, as shown in step 288c.

A logic gate 288d is reached wherein a decision is made whether there are more slides.

If a decision is made that there are more slides, the user would be directed back to step 288.

If a decision is made to reorder the slides, the user could use move buttons or cut and paste shortcut menus, for example, as shown in step 292. Once the user reorders the procedures, it will be saved in an organization or source content container 294 in any number of formats, including but not limited to XML and/or the like, and can include lecture, interactive exercise and/or quiz files. Once all of this accomplished, the user would be directed back to the Content Manager List 210.

If a decision is made to copy slides, the user could duplicate slides using a shortcut menu, for example, as shown in step 296. Once the user copies the procedures, it will be saved in an organization or source content container 298 in any number of formats, including but not limited to PNG, XML and/or the like, and can include lecture, interactive exercise and/or quiz files. Once all of this accomplished, the user would be directed back to the Content Manager List 210.

If a decision is made to delete slides, the user could delete a slide using a shortcut menu, for example, as shown in step 300. Once the user deletes the procedures, the PNG, XML and/or the like file will be deleted, for example, as shown in step 302. Once all of this accomplished, the user would be directed back to the Content Manager List 210.

A logic gate 304 is reached wherein a decision is made whether to run the preview player.

If a decision is made to run the preview player, the contents are compiled and launched in the stand-alone player, for example, as shown in step 306.

A logic gate 308 is reached wherein a decision is made regarding the publish mode.

Another logic gate 310 is then reached wherein a decision is made regarding optimization options.

If a decision is made to Web optimize, all of the contents are optimized using quatree and successive comparison methods and compiled then saved to an output directory, for example, as shown in step 312. Once the user Web compiles, it will be saved in an organization or source content container 314 in any number of formats, including but not limited to SWF, WMV, XML, and/or the like, and can include lecture, interactive exercise and/or quiz files.

If a decision is made to CD optimize, all of the contents are optimized using the successive comparison method and compiled then saved to an output directory, for example, as shown in step 316. Once the user CD compiles, it will be saved in an organization or source content container 318 in any number of formats, including but not limited to SWF, WMV, XML, and/or the like, and can include lecture, interactive exercise and/or quiz files.

A logic gate 320 is reached wherein a decision is made whether to return to the Project Manager.

Another logic gate 322 is then reached wherein a decision is made regarding whether to compile.

If a decision is made to compile, still another logic gate 324 is then reached wherein a decision is made regarding optimization options.

If the decision is made to Web optimize, all of the contents are optimized using quatree and successive comparison methods and compiled then saved to an output directory, for example, as shown in step 326. Once the contents are Web optimized, they will be saved in an organization or source content container 328 in any number of formats, including but not limited to SWF, WMV, XML, and/or the like, and can include lecture, interactive exercise and/or quiz files. Additionally, an off-page reference, e.g., the Project Manager, for example, as shown in step 330.

If the decision is made to CD optimize, all of the contents are optimized using the successive comparison method and compiled then saved to an output directory, for example, as shown in step 332. Once the contents are CD optimized, they will be saved in an organization or source content container 334 in any number of formats, including but not limited to SWF, WMV, XML, and/or the like, and can include lecture, interactive exercise and/or quiz files.

If the decision is made not to compile, the user would be directed to the off-page reference, e.g., the Project Manager, for example, as shown in step 330.

In accordance with another aspect of the present invention, from the Content Manager List 210, the user can access the Slide Viewer screen 336.

A logic gate 338 is reached wherein a decision is made regarding whether to select a pass.

If the decision is made to select a pass, the Select the Pass checkbox is used to indicate automatic progression, for example, as shown in step 340. Once this is accomplished, the selection will be saved in an organization or source content container 342 in any number of formats, including but not limited to XML, and/or the like, and can include lecture, interactive exercise and/or quiz files. Once all of this accomplished, the user would be directed back to the Slide Viewer 336.

A logic gate 344 is reached wherein a decision is made regarding whether to zoom in or out.

If the decision is made to zoom in, the user could select the zoom in button, for example, as shown in step 346. If the decision is made to zoom out, the user could select the zoom out button, for example, as shown in step 348. Once all of this accomplished, the user would be directed back to the Slide Viewer 336.

A logic gate 350 is reached wherein a decision is made regarding whether to edit the arrow position.

If the decision is made to edit the arrow position, the user could click in anywhere inside the slide viewer and respond to the prompt wherein the cursor xy location is recorded and the arrow is repositioned, for example, as shown in step 352. Once this is accomplished, the selection will be saved in an organization or source content container 354 in any number of formats, including but not limited to XML, and/or the like, and can include lecture, interactive exercise and/or quiz files. Once all of this accomplished, the user would be directed back to the Slide Viewer 336.

A logic gate 356 is reached wherein a decision is made regarding whether to spell check.

If the decision is made to spell check, the user could click the Spell Check button and respond to the prompt and make the appropriate edits, for example, as shown in step 358. Once this is accomplished, the selection will be saved in an organization or source content container 360 in any number of formats, including but not limited to XML, and/or the like, and can include lecture, interactive exercise and/or quiz files. Once all of this accomplished, the user would be directed back to the Slide Viewer 336.

A logic gate 362 is reached wherein a decision is made regarding whether to add/edit/and/or delete slide text.

If the decision is made to delete slide text, the user could delete the text from the textbox, for example, as shown in step 364. Once the user deletes the text, the XML and/or the like file will be deleted, for example, as shown in step 366. Once all of this accomplished, the user would be directed back to the Slide Viewer 336.

If the decision is made to add and/or edit slide text, the user could add and/or edit the text into the textbox, for example, as shown in step 368. Once the user adds and/or edits the text, the selection will be saved in an organization or source content container 370 in any number of formats, including but not limited to XML, and/or the like, and can include lecture, interactive exercise and/or quiz files. Once all of this accomplished, the user would be directed back to the Slide Viewer 336.

Referring to FIG. 3, there is shown a schematic illustration of a flowchart illustrating the primary processing steps of a quiz editor routine of a course development system, in accordance with a third embodiment of the present invention.

The user would navigate to the Quiz Editor Window 400, which is in communication with an off page reference, e.g., the Project Manager, for example, as shown in step 402.

A logic gate 404 is reached wherein a decision is made whether to open the Help Window.

If a decision is made to open the Help Window, the user would be directed to the Help Window 406.

However, if the decision is made not to open the Help Window 406, the user would be directed to the Quiz Editor Window 400.

A logic gate 408 is reached wherein a decision is made whether to use the Help function.

If a decision is made to use the Help function, the user would be directed to the Help Window 406.

However, if the decision is made not to use the Help function, the user would be directed to the Quiz Editor Window 400.

A logic gate 410 is reached wherein a decision is made whether to add/edit question items or to return to the Project Manager.

If a decision is made to return to the Project Manager, the user would be directed to an off-page reference, e.g., the Project Manager, for example, as shown in step 412.

If a decision is made to add/edit questions, the user would be directed to the Question screen 414.

A logic gate 416 is reached wherein a decision is made regarding whether to add images and/or text to the question.

If the decision is made to add images to the question, the user could click the ellipsis button and select an image from a standard Windows interface, for example, as shown in step 418. Once this is accomplished, the selection will be saved in an organization or source content container 420 in any number of formats, including but not limited to PNG, XML, and/or the like, and can include lecture, interactive exercise and/or quiz files.

If the decision is made to add text to the question, the user could click in the box and enter the text, for example, as shown in step 422. Once this is accomplished, the selection will be saved in an organization or source content container 424 in any number of formats, including but not limited to XML, and/or the like, and can include lecture, interactive exercise and/or quiz files.

A logic gate 426 is reached wherein a decision is made regarding whether to delete images and/or text from the question.

If the decision is made to delete images from the question, the user could click the delete button at which point the image will disappear, for example, as shown in step 428. Once this is accomplished, the PNG, XML and/or the like file will be deleted from an organization or source content container 430.

If the decision is made to delete text from the question, the user could select and delete the text, for example, as shown in step 432. Once this is accomplished, the XML and/or the like file will be deleted from an organization or source content container 434.

The user could then navigate to the Answer screen 436.

A logic gate 438 is reached wherein a decision is made regarding whether to add images and/or text to the answer.

If the decision is made to add images to the answer, the user could click the ellipsis button and select an image from a standard Windows interface, for example, as shown in step 440. Once this is accomplished, the selection will be saved in an organization or source content container 442 in any number of formats, including but not limited to PNG, XML, and/or the like, and can include lecture, interactive exercise and/or quiz files.

If the decision is made to add text to the answer, the user could click in the box and enter the text, for example, as shown in step 444. Once this is accomplished, the selection will be saved in an organization or source content container 446 in any number of formats, including but not limited to XML, and/or the like, and can include lecture, interactive exercise and/or quiz files.

A logic gate 448 is reached wherein a decision is made regarding whether to delete images and/or text from the answer.

If the decision is made to delete images from the answer, the user could click the delete button at which point the image will disappear, for example, as shown in step 450. Once this is accomplished, the PNG, XML and/or the like file will be deleted from an organization or source content container 452.

If the decision is made to delete text from the answer, the user could select and delete the text, for example, as shown in step 454. Once this is accomplished, the XML and/or the like file will be deleted from an organization or source content container 456.

The user could then navigate to the Correct Answer screen 458.

A logic gate 460 is reached wherein a decision is made regarding whether to add/edit the correct answer.

If the decision is made to add/edit the correct answer, the user could select the radio button that corresponds to the correct answer, for example, as shown in step 462. Once this is accomplished, the selection will be saved in an organization or source content container 464 in any number of formats, including but not limited to XML, and/or the like, and can include lecture, interactive exercise and/or quiz files.

The user could then navigate to the Difficulty Level screen 466.

A logic gate 468 is reached wherein a decision is made regarding whether to add/edit the difficulty level.

If the decision is made to add/edit the difficulty level, the user could select the radio button that corresponds to the relative level of difficulty, for example, as shown in step 470. Once this is accomplished, the selection will be saved in an organization or source content container 472 in any number of formats, including but not limited to XML, and/or the like, and can include lecture, interactive exercise and/or quiz files.

The user could then navigate to the Exhibit screen 474.

A logic gate 476 is reached wherein a decision is made regarding whether to add/edit the exhibit.

If the decision is made to add/edit the exhibit, the user could click the ellipsis button and select an image from a standard Windows interface, for example, as shown in step 478. Once this is accomplished, the selection will be saved in an organization or source content container 480 in any number of formats, including but not limited to PNG, XML, and/or the like, and can include lecture, interactive exercise and/or quiz files.

Referring to FIGS. 4-20, there are generally shown several screen captures that include the main screens that a user would encounter as he/she creates and/or modifies a course in conjunction with the course development program of the present invention. FIGS. 4-20 illustrate some of the concepts described with reference to FIG. 1.

Figure 4:
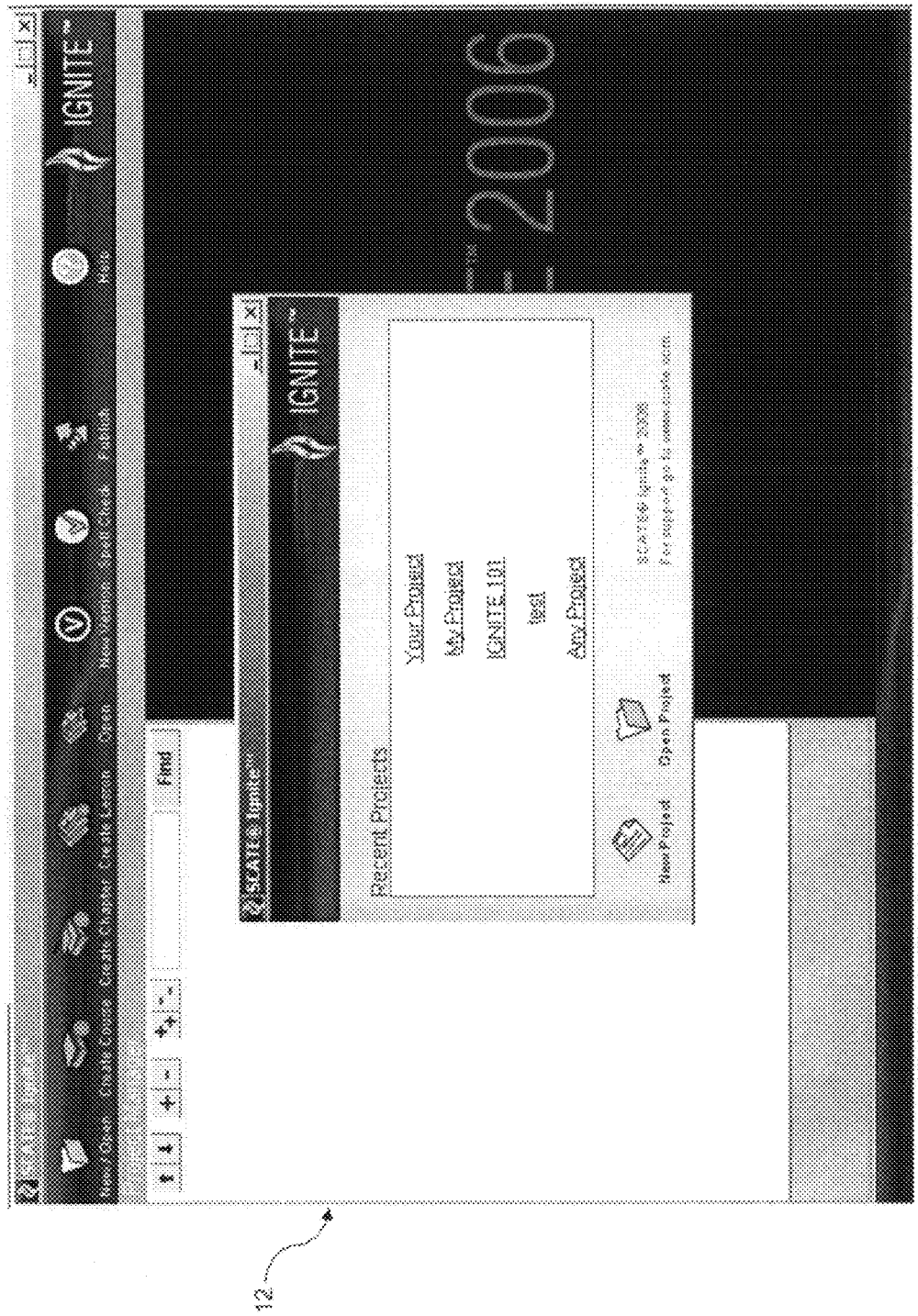
FIG. 4 is a view of a screen capture illustrating a project manager window with a dialog window on top screen, in accordance with a fourth embodiment of the present invention.

Referring to FIG. 4, there is shown a view of a screen capture illustrating an "ignite project manager window with a dialog window on top" screen, in accordance with a fourth embodiment of the present invention. By way of a non-limiting example, the user can either access a previously created course (e.g., the course entitled "PatentDocumentation") by clicking on the "Open Project" button or begin to create a new course by clicking on the "New Project" button. Navigational keys (i.e., +, −, ++, −−) are provided at the bottom of the "Project Manager" box.

Figure 5:
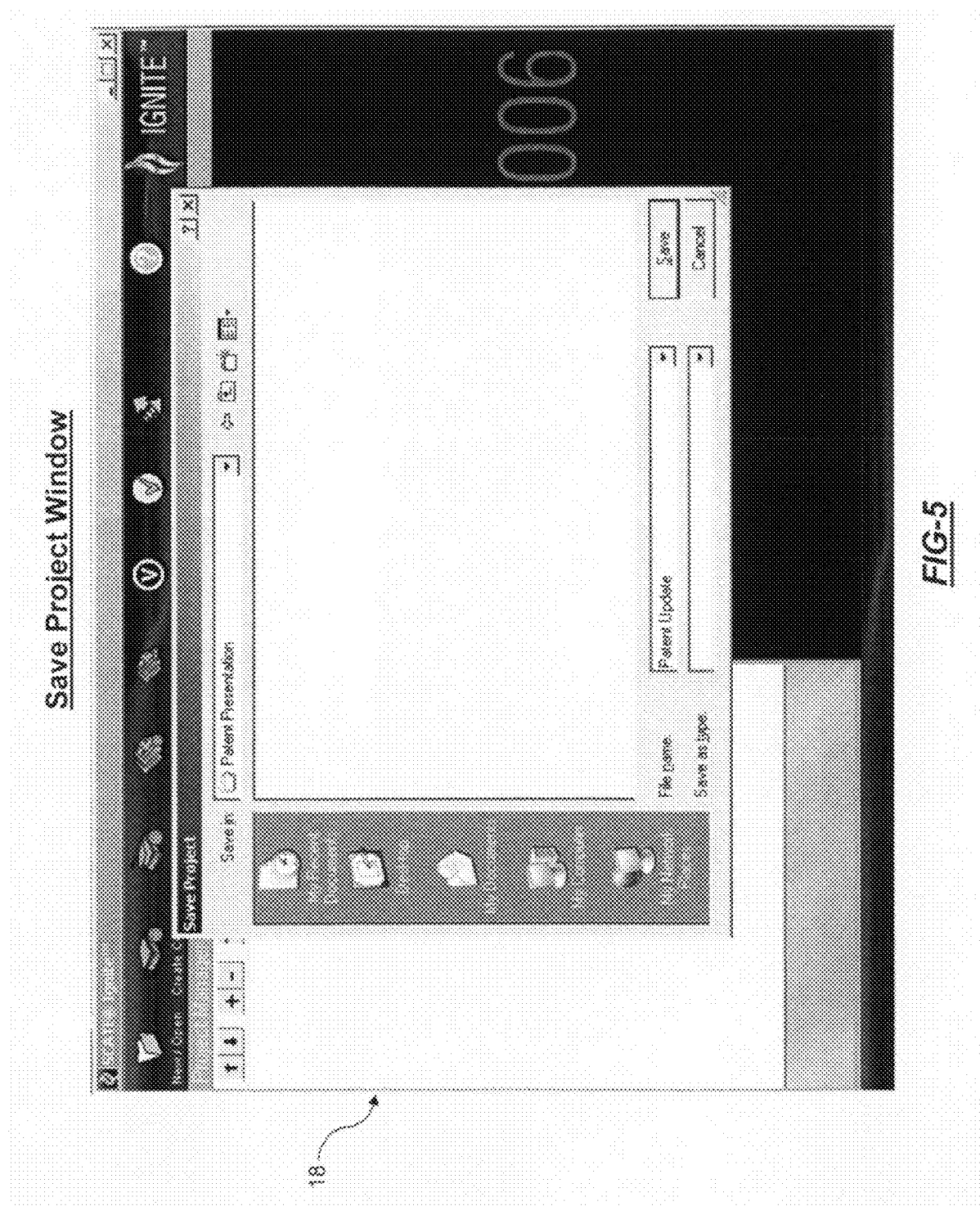
FIG. 5 is a view of a screen capture illustrating a save project window screen, in accordance with a fifth embodiment of the present invention.

Referring to FIG. 5, there is shown a view of a screen capture illustrating a "save project window" screen, in accordance with a fifth embodiment of the present invention. By way of a non-limiting example, the user can decide in what directory to save the new course and what to name the new course by clicking on the appropriate directory and typing in the new course name in the file name field.

Figure 6:
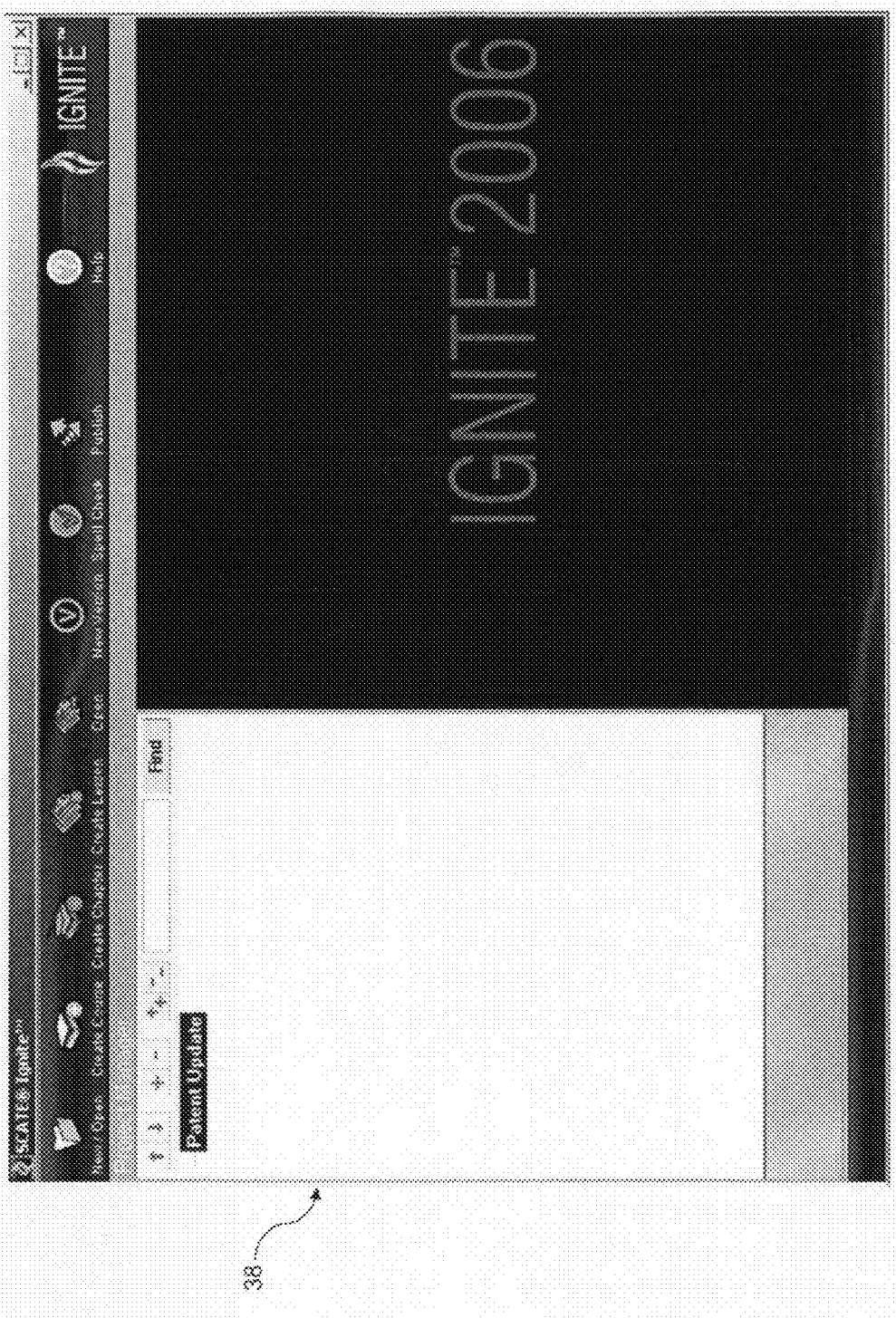
FIG. 6 is a view of a screen capture illustrating a project manager tree with empty project screen, in accordance with a sixth embodiment of the present invention.

Referring to FIG. 6, there is shown a view of a screen capture illustrating a "project manager tree with empty project" screen, in accordance with a sixth embodiment of the present invention. By way of a non-limiting example, the user can view which particular course he/she is presently working on by looking at the "Project Manager" box, as well as view what the course looks like by looking at the "Info Viewer" box.

Figure 7:
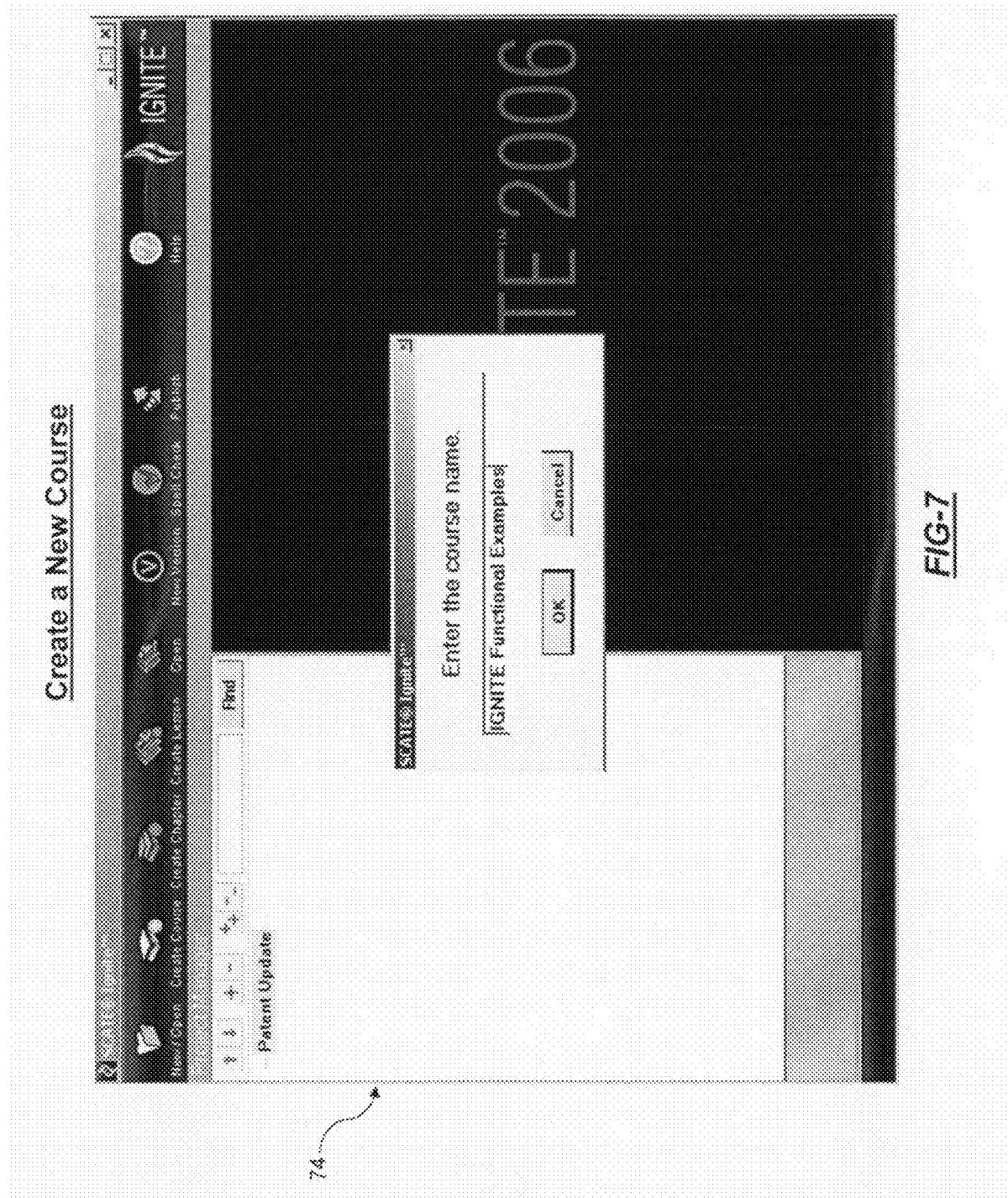
FIG. 7 is a view of a screen capture illustrating a create a new course screen, in accordance with a seventh embodiment of the present invention.

Referring to FIG. 7, there is shown a view of a screen capture illustrating a "create a new course" screen, in accordance with a seventh embodiment of the present invention. By way of a non-limiting example, the user can click the create course icon (e.g., the second icon (i.e., the stacked books) from the left on the top menu bar) at which time an "Enter The Details Of The Course" box opens up. The user can then enter information about the course such as but not limited to: (1) title; (2) description; (3) goal; (4) prerequisites; (5) category; (6) difficulty; and (7) resolution. Once entered, the user could click the "Save" button.

Figure 8:
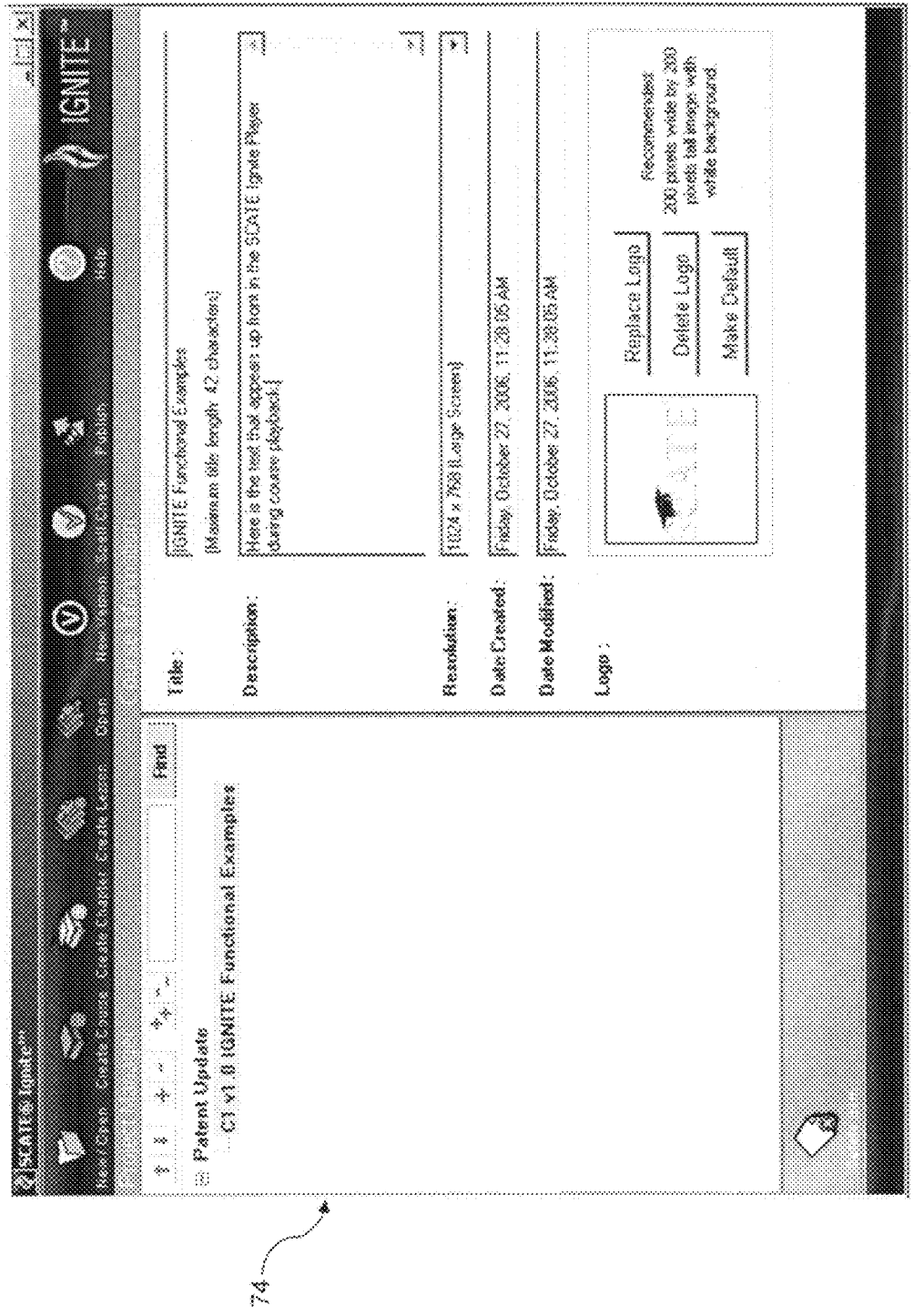
FIG. 8 is a view of a screen capture illustrating a course information view of my course screen, in accordance with an eighth embodiment of the present invention.

Referring to FIG. 8, there is shown a view of a screen capture illustrating a "course information view of my course" screen, in accordance with an eighth embodiment of the present invention. By way of a non-limiting example, information previously entered is then displayed in the "Course Information" box. Additionally, the course title is displayed in the "Project Manager" box. The navigational keys can be used to toggle between the directory levels of the "Project Manager" box.

Figure 9:
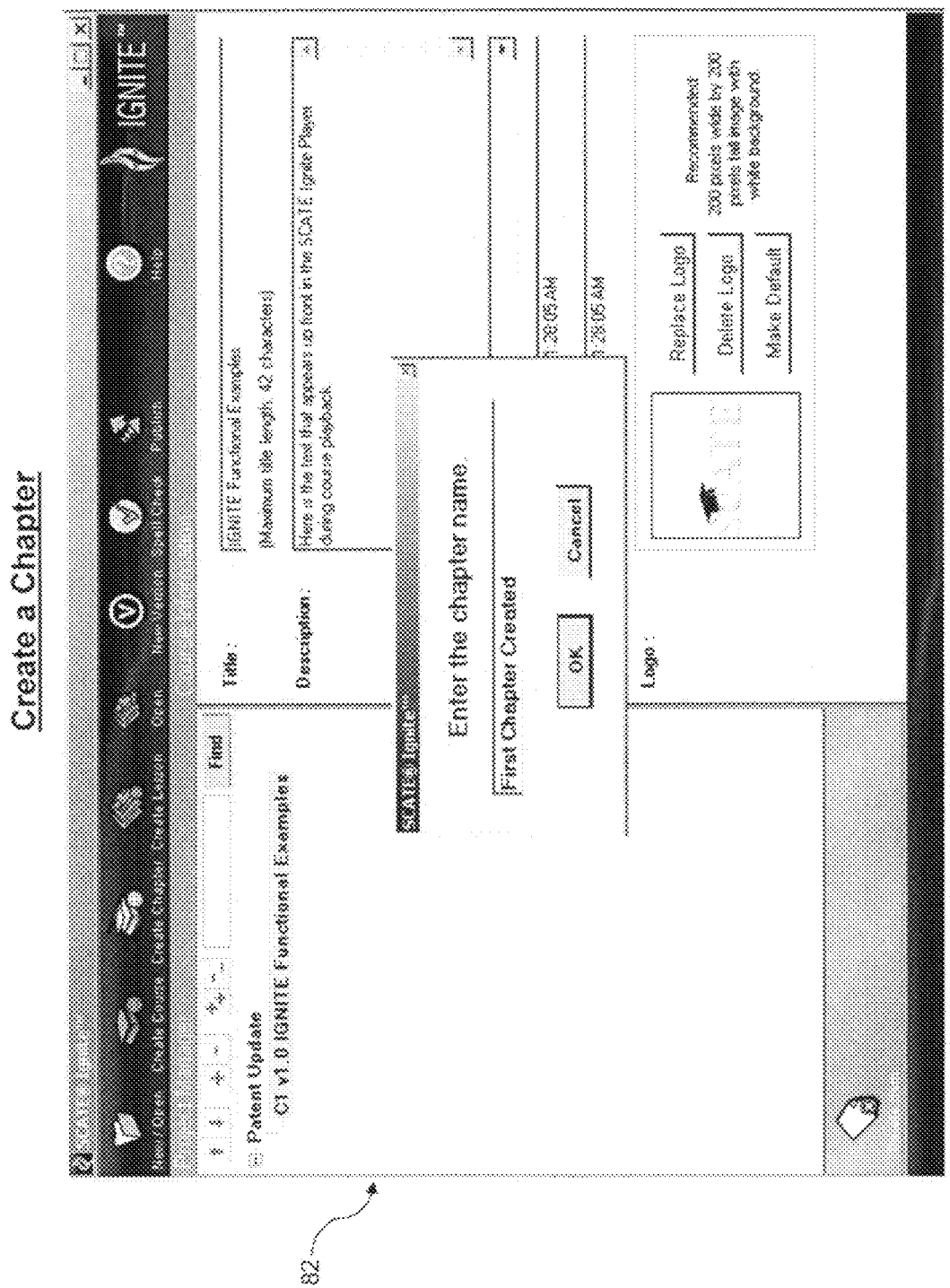
FIG. 9 is a view of a screen capture illustrating a create a chapter screen, in accordance with a ninth embodiment of the present invention.

Referring to FIG. 9, there is shown a view of a screen capture illustrating a "create a chapter" screen, in accordance with a ninth embodiment of the present invention. By way of a non-limiting example, the user can click the create chapter icon (e.g., the third icon (i.e., the open book) from the left on the top menu bar) at which time a "Enter chapter name" box opens up. The user can then enter information about the lesson such as but not limited to: (1) title; and (2) description. Once entered, the user could click the "Save" button.

Figure 10:
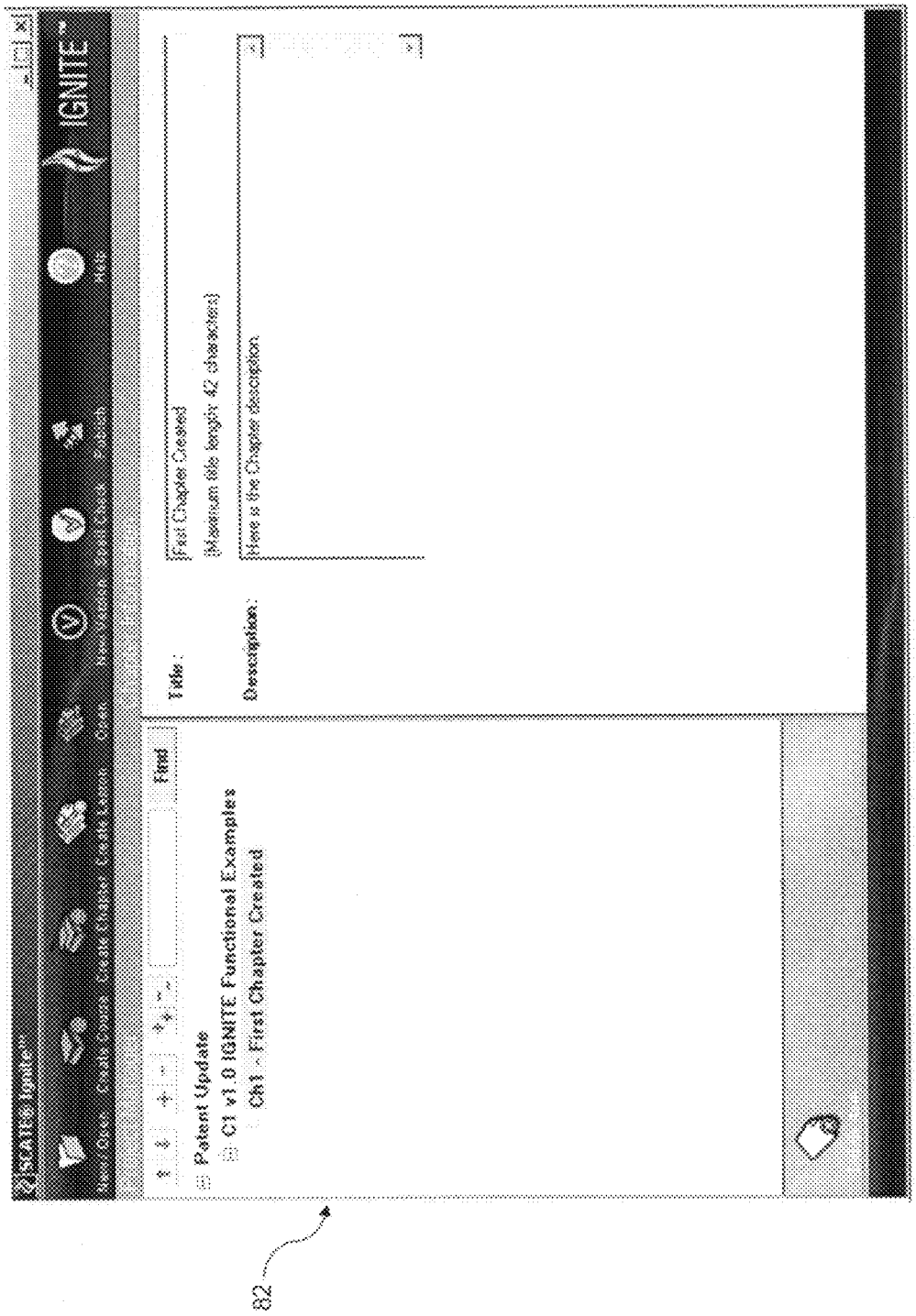
FIG. 10 is a view of a screen capture illustrating a chapter information view screen, in accordance with a tenth embodiment of the present invention.

Referring to FIG. 10, there is shown a view of a screen capture illustrating a "chapter information view" screen, in accordance with a tenth embodiment of the present invention. By way of a non-limiting example, information previously entered is then displayed in the "Chapter Information" box. Additionally, the lesson title is displayed in the "Project Manager" box. The navigational keys can be used to toggle between the directory levels of the "Project Manager" box.

Figure 11:
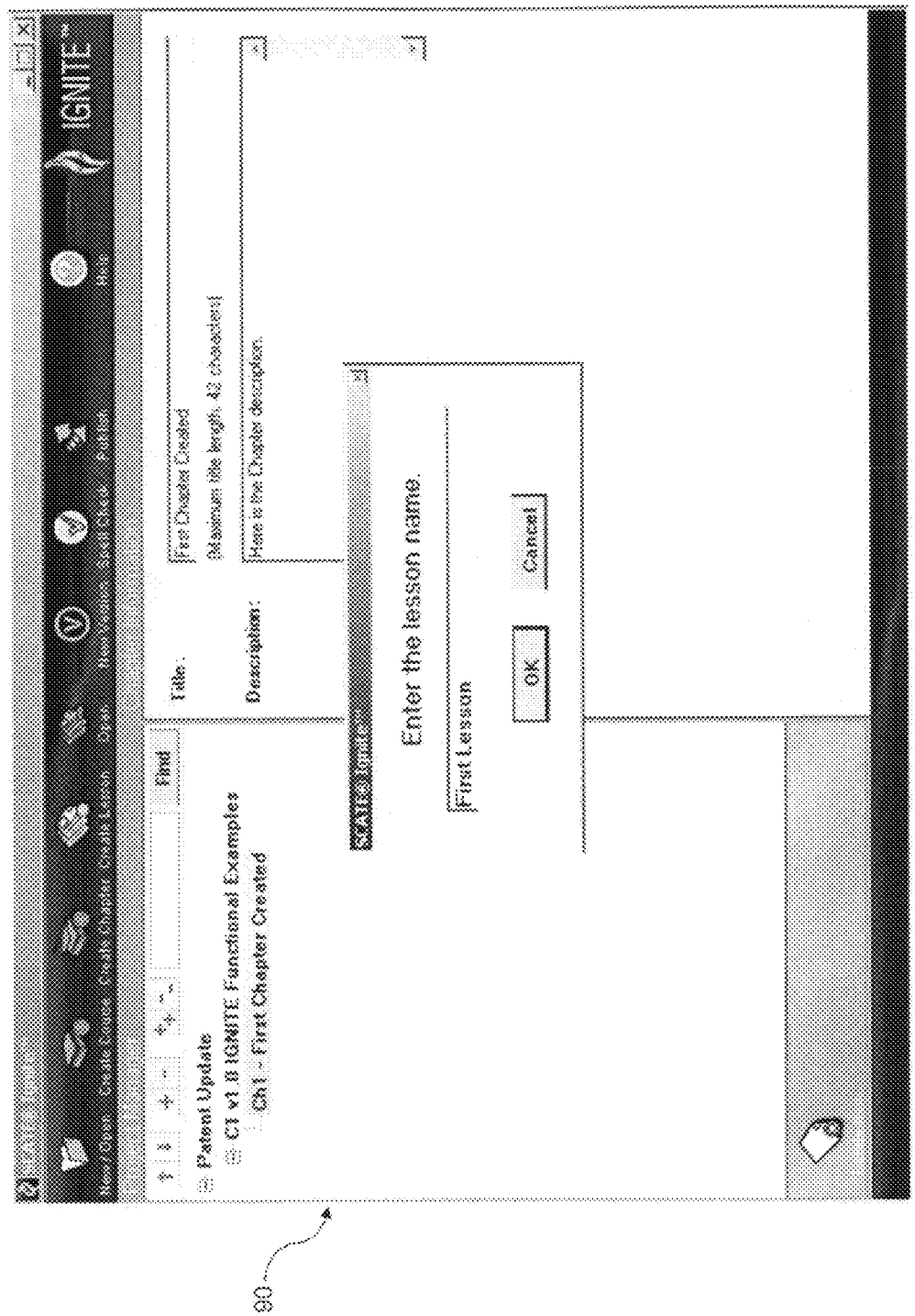
FIG. 11 is a view of a screen capture illustrating a create a lesson screen, in accordance with an eleventh embodiment of the present invention.

Referring to FIG. 11, there is shown a view of a screen capture illustrating a "create a lesson" screen, in accordance with an eleventh embodiment of the present invention. By way of a non-limiting example, the user can click the create a lesson icon (e.g., the fourth icon (i.e., the written pages) from the left on the top menu bar) at which time an "Enter The Lesson Name" box opens up. The user can then enter information about the lesson such as but not limited to: (1) title; and (2) description. Once entered, the user could click the "Save" button.

Figure 12:
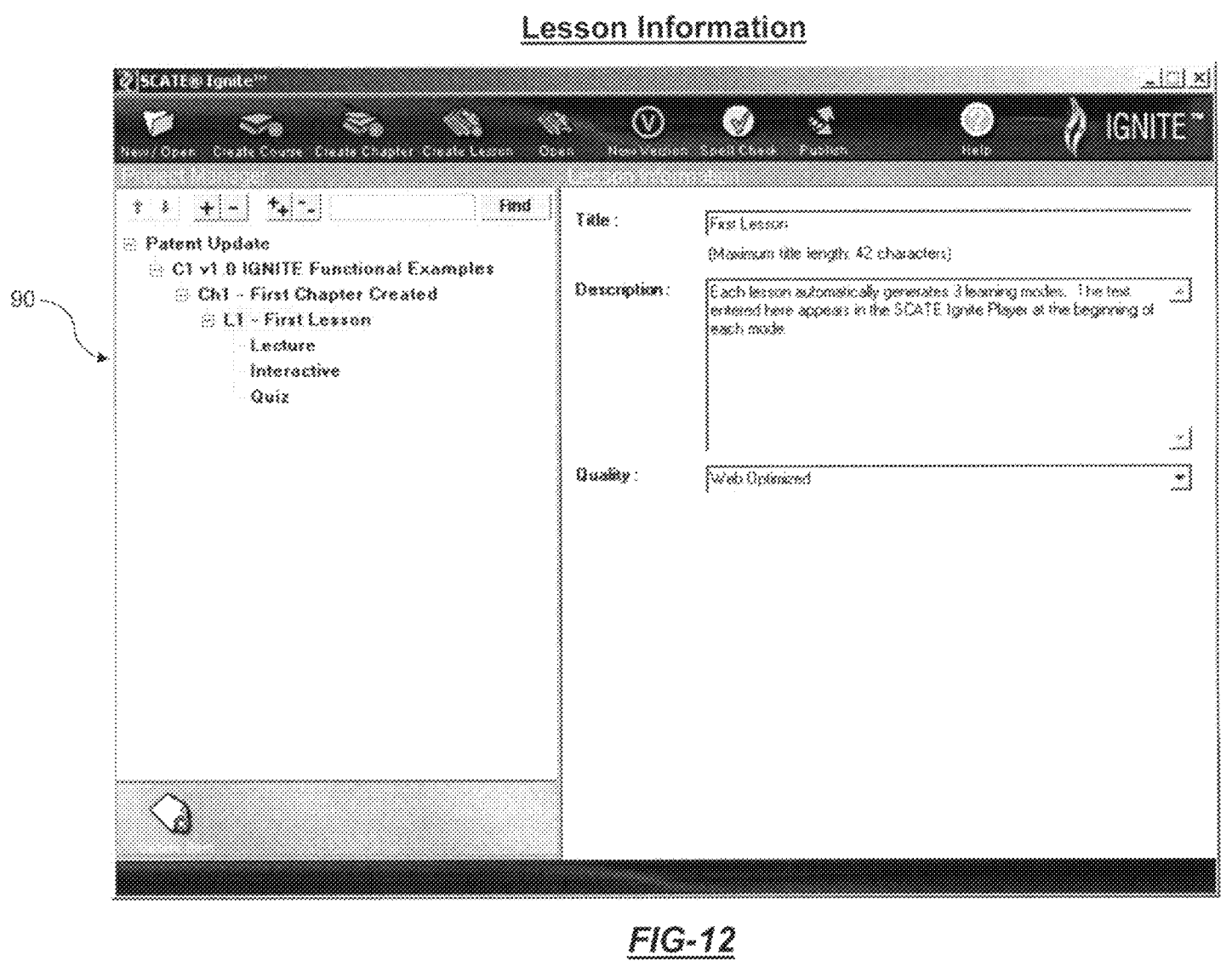

Referring to FIG. 12, there is shown a view of a screen capture illustrating an "lesson information" screen, in accordance with a twelfth embodiment of the present invention. By way of a non-limiting example, information previously entered is then displayed in the "lesson Information" box. Additionally, the exercise title is displayed in the "Project Manager" box. The navigational keys can be used to toggle between the directory levels of the "Project Manager" box.

Figure 13:
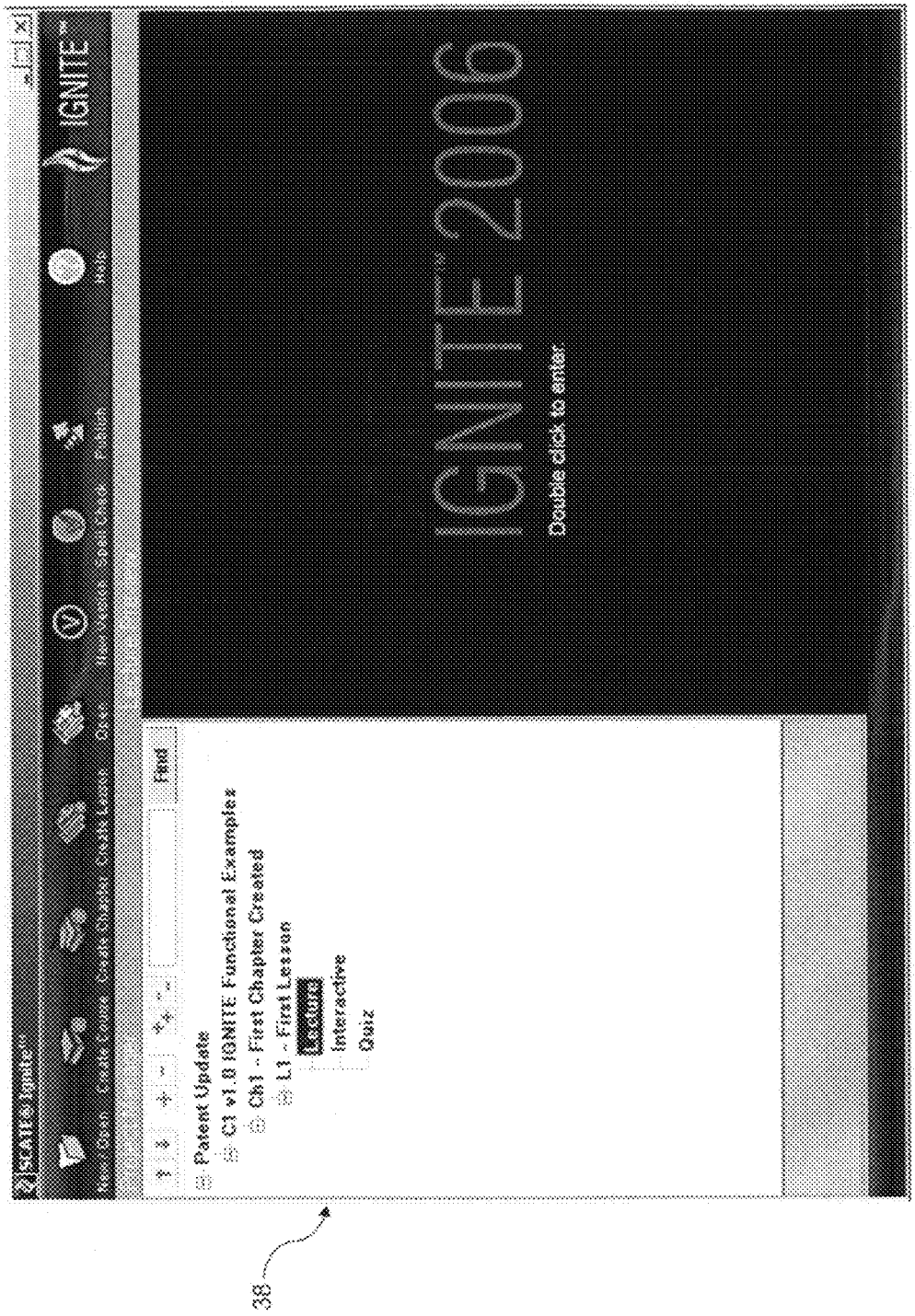
FIG. 13 is a view of a screen capture illustrating a three modes displayed in tree below lecture screen, in accordance with a thirteenth embodiment of the present invention.

Referring to FIG. 13, there is shown a view of a screen capture illustrating a "three modes displayed in tree below lesson" screen, in accordance with a thirteenth embodiment of the present invention. The user can then create a lecture module, an interactive module and/or a quiz module, depending on the particular wishes of the user. In this view, the first slide of the lecture module is displayed. Alternatively, the user could click on the Interactive and/or Quiz modules instead of the Lecture module, e.g., via the navigational keys.

Figure 14:
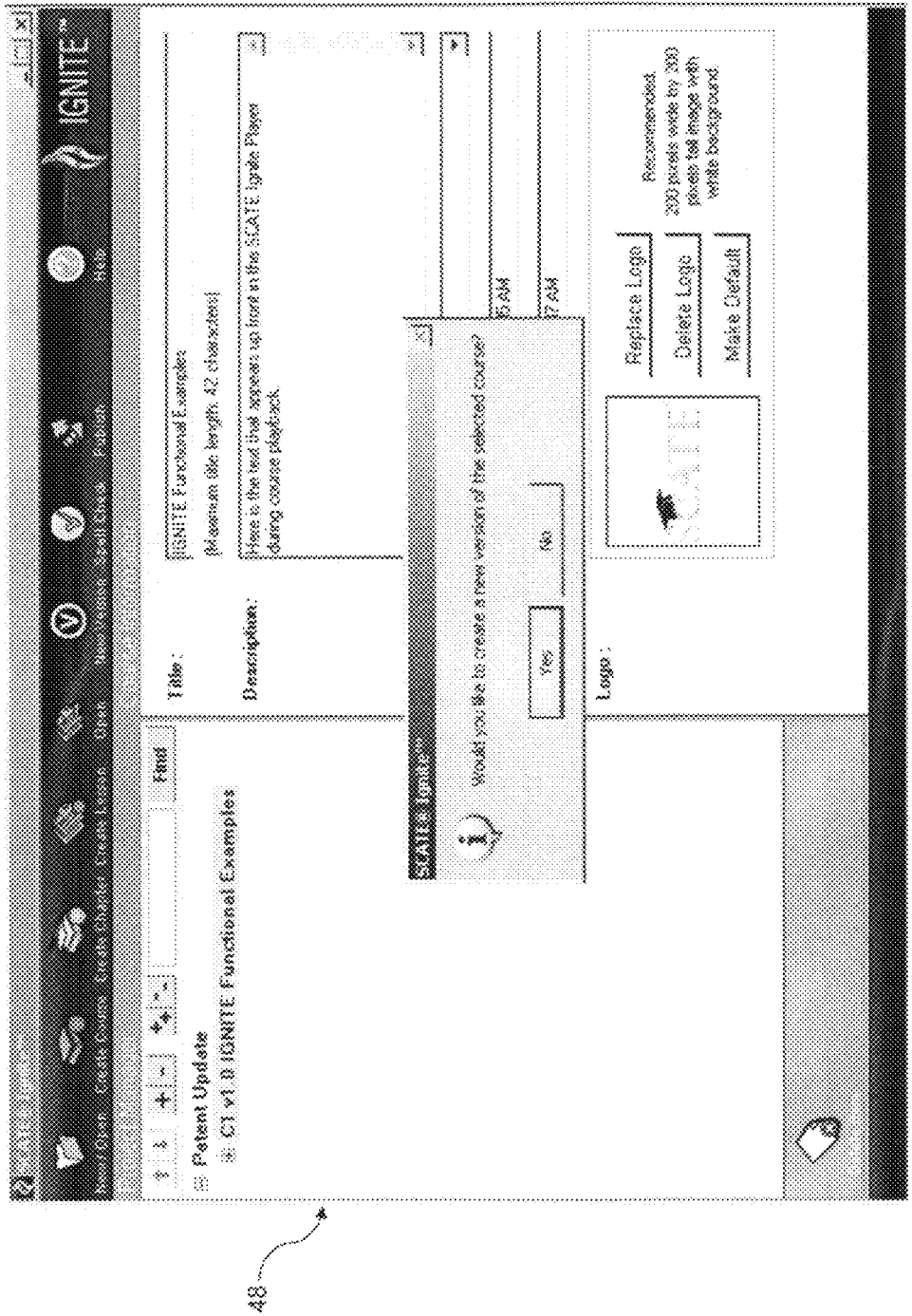
FIG. 14 is a view of a screen capture illustrating a create a new version screen, in accordance with a fourteenth embodiment of the present invention.

Referring to FIG. 14, there is shown a view of a screen capture illustrating a "create a new version of the course" screen, in accordance with a fourteenth embodiment of the present invention. By way of a non-limiting example, the user can click the version icon (e.g., the second icon (i.e., the blank sheet) from the right on the top menu bar) at which time a "Would you like to create a new version of the selected course" box opens up. The user can then either click the Yes or the No button. If the Yes option was chosen, the user can then enter information about the new version such as but not limited to: (1) title; (2) description; (3) goal; (4) prerequisites; (5) category; (6) difficulty; and (7) resolution. Once entered, the user could click the "Update" button.

Figure 15:
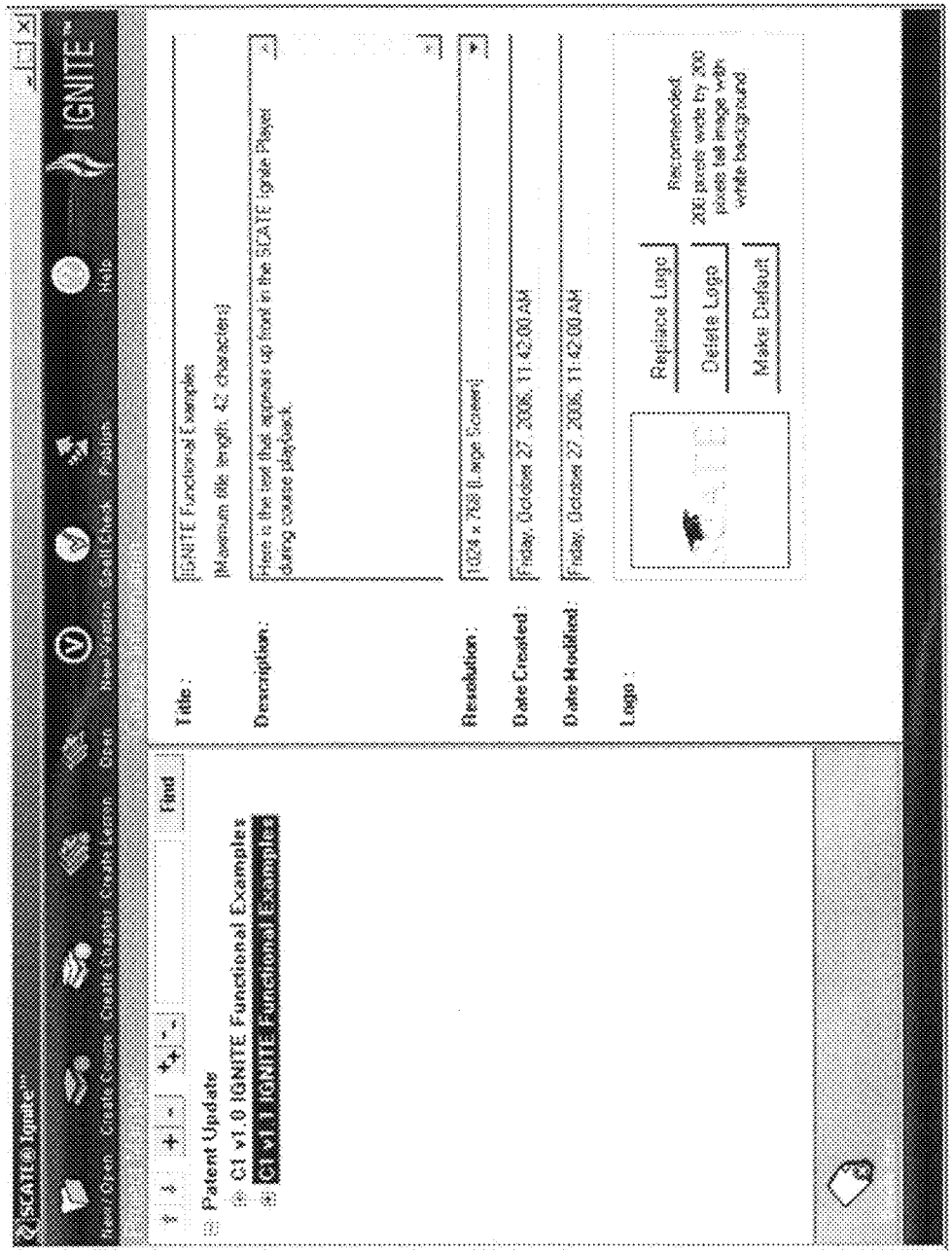
FIG. 15 is a view of a screen capture illustrating a new version screen, in accordance with a fifteenth embodiment of the present invention.

Referring to FIG. 15, there is shown a view of a screen capture illustrating a "new version" screen, in accordance with a fifteenth embodiment of the present invention. By way of a non-limiting example, information previously entered is then displayed in the "Course Information" box. Additionally, the new course version is displayed in the "Project Manager" box. The navigational keys can be used to toggle between the directory levels of the "Project Manager" box.

Figure 16:
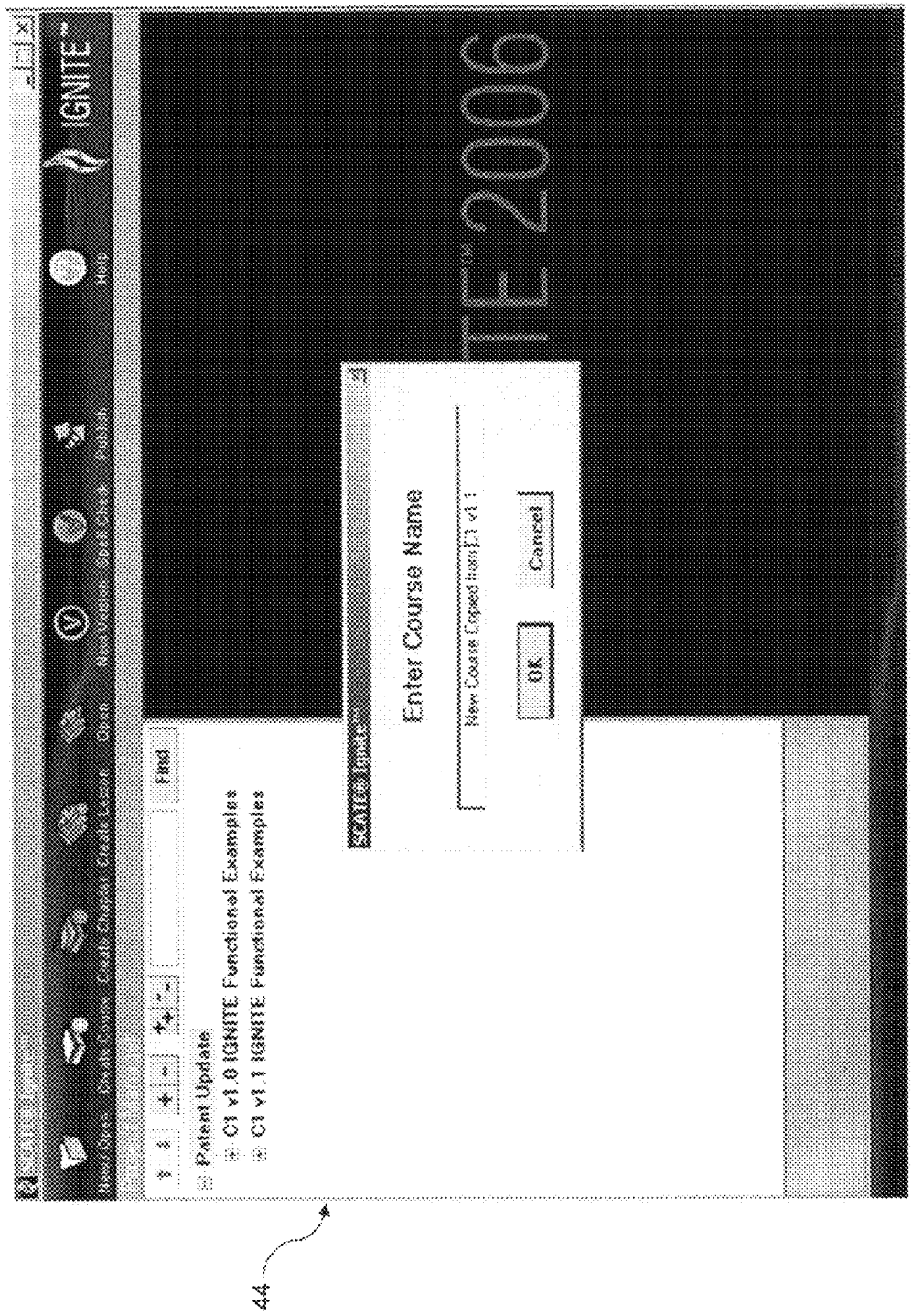
FIG. 16 is a view of a screen capture illustrating a create a copy screen, in accordance with a sixteenth embodiment of the present invention.

Referring to FIG. 16, there is shown a view of a screen capture illustrating a "create a copy of the course" screen, in accordance with a sixteenth embodiment of the present invention. By way of a non-limiting example, the user can click the new version (e.g., the sixth icon (i.e., the blank sheet) from the right on the top menu bar) at which time an "Enter Course Name" box opens up. The user can then type in the name of the course to be copied and click the OK button. If the OK button was clicked, the user can then enter information about the new copy of the course such as but not limited to: (1) title; (2) description; (3) goal; (4) prerequisites; (5) category; (6) difficulty; and (7) resolution. Once entered, the user could click the "Update" button. This function is useful, for example, if the user wants to create another version of the course but does not want to bother to input all of the common course material again.

Figure 17:
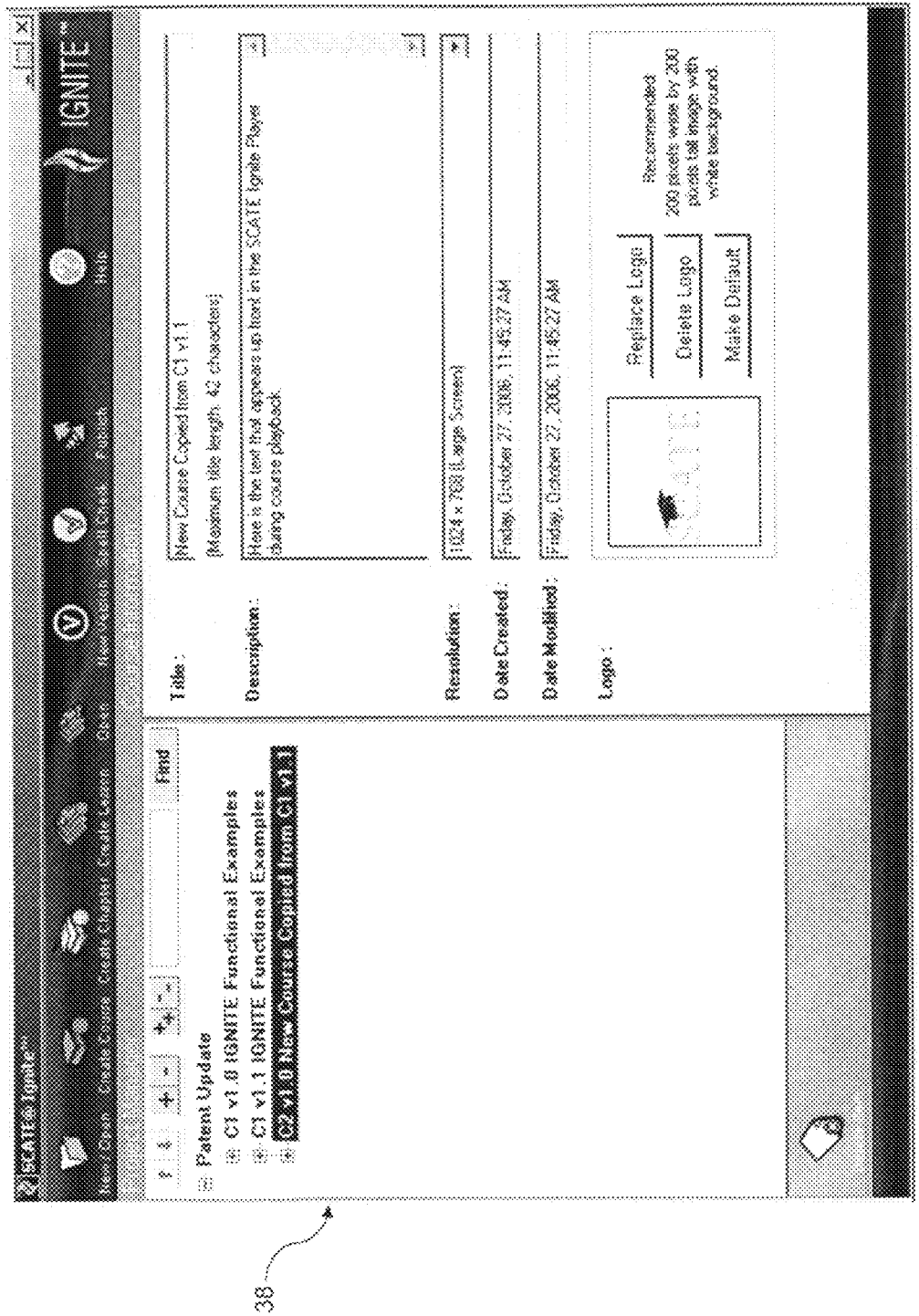
FIG. 17 is a view of a screen capture illustrating a new copy screen, in accordance with an seventeenth embodiment of the present invention.

Referring to FIG. 17, there is shown a view of a screen capture illustrating a "new version" screen, in accordance with a seventeenth embodiment of the present invention. By way of a non-limiting example, information previously entered is then displayed in the "Course Information" box. Additionally, the copied course file name is displayed in the "Project Manager" box. The navigational keys can be used to toggle between the directory levels of the "Project Manager" box.

Figure 18:
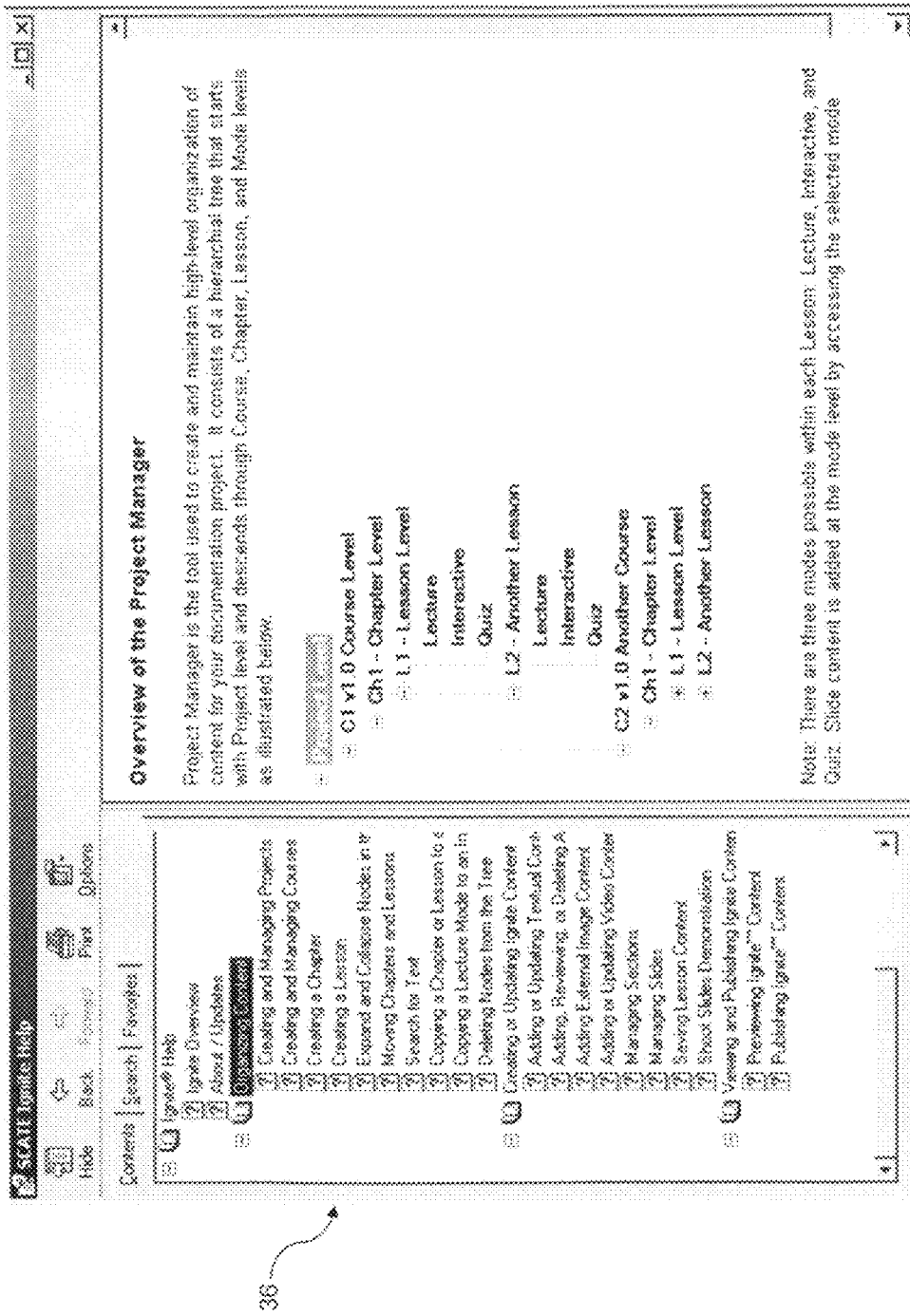
FIG. 18 is a view of a screen capture illustrating a help window screen, in accordance with an eighteenth embodiment of the present invention.

Referring to FIG. 18, there is shown a view of a screen capture illustrating a "help window" screen, in accordance with an eighteenth embodiment of the present invention. By way of a non-limiting example, the user can click the help icon (e.g., the question mark icon (i.e., the "?" symbol) the first from the right on the top menu bar) at which time a "Help" box opens up. The "Help" box includes a Contents and Index tab section on the left side of the box and a text portion on the right side of the box. Individual help topics can be accessed by the user.

Figure 19:
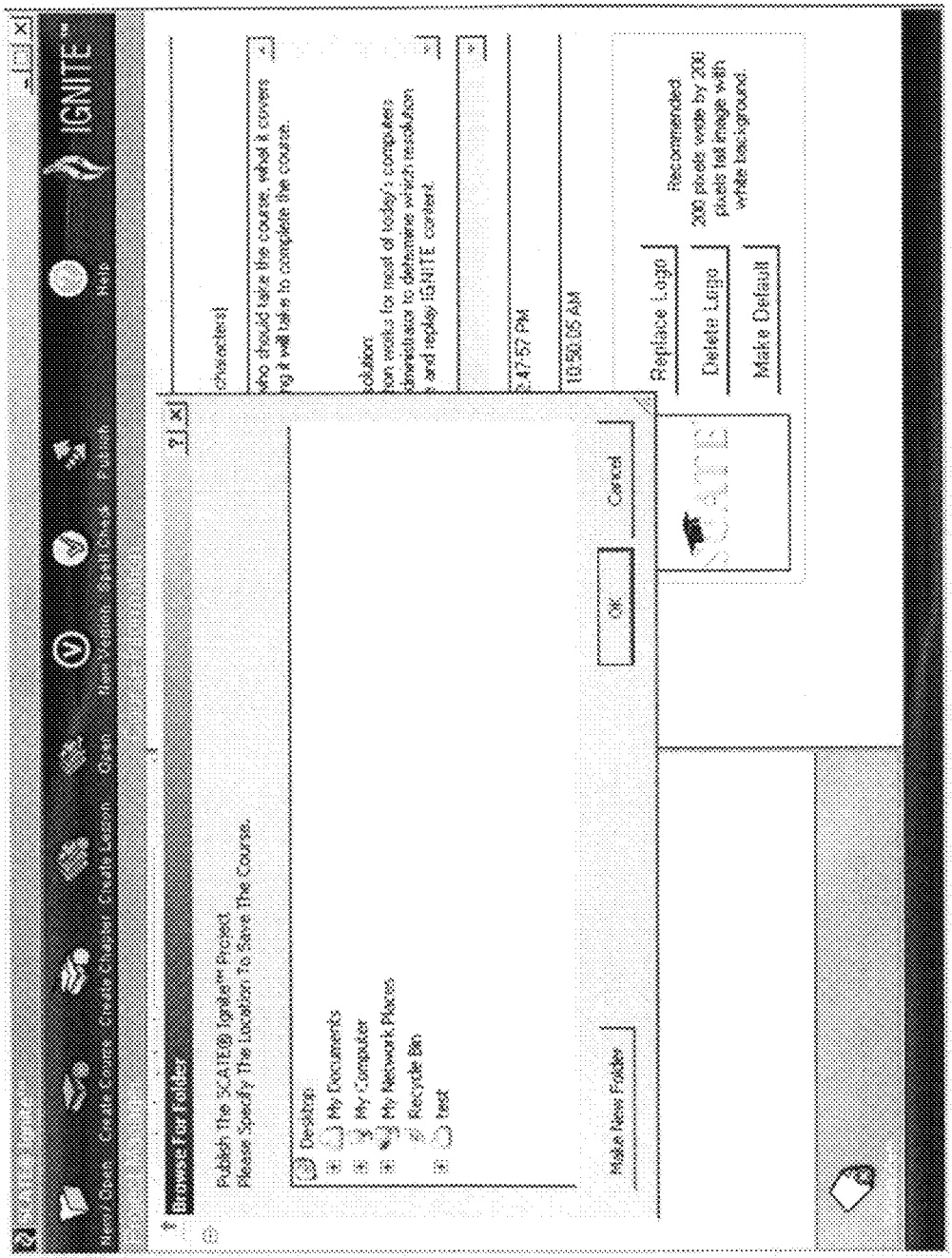
FIG. 19 is a view of a screen capture illustrating a publish stand-alone presentation step one screen, in accordance with a nineteenth embodiment of the present invention.

Referring to FIG. 19, there is shown a view of a screen capture illustrating a "publish stand-alone presentation step 1" screen, in accordance with a nineteenth embodiment of the present invention. By way of a non-limiting example, the user can click the publish icon at which time a "Browse For Folder" box opens up. The user could then specify the location in the directory where to save the created course. Once specified, the user could click the "OK" button.

Figure 20:
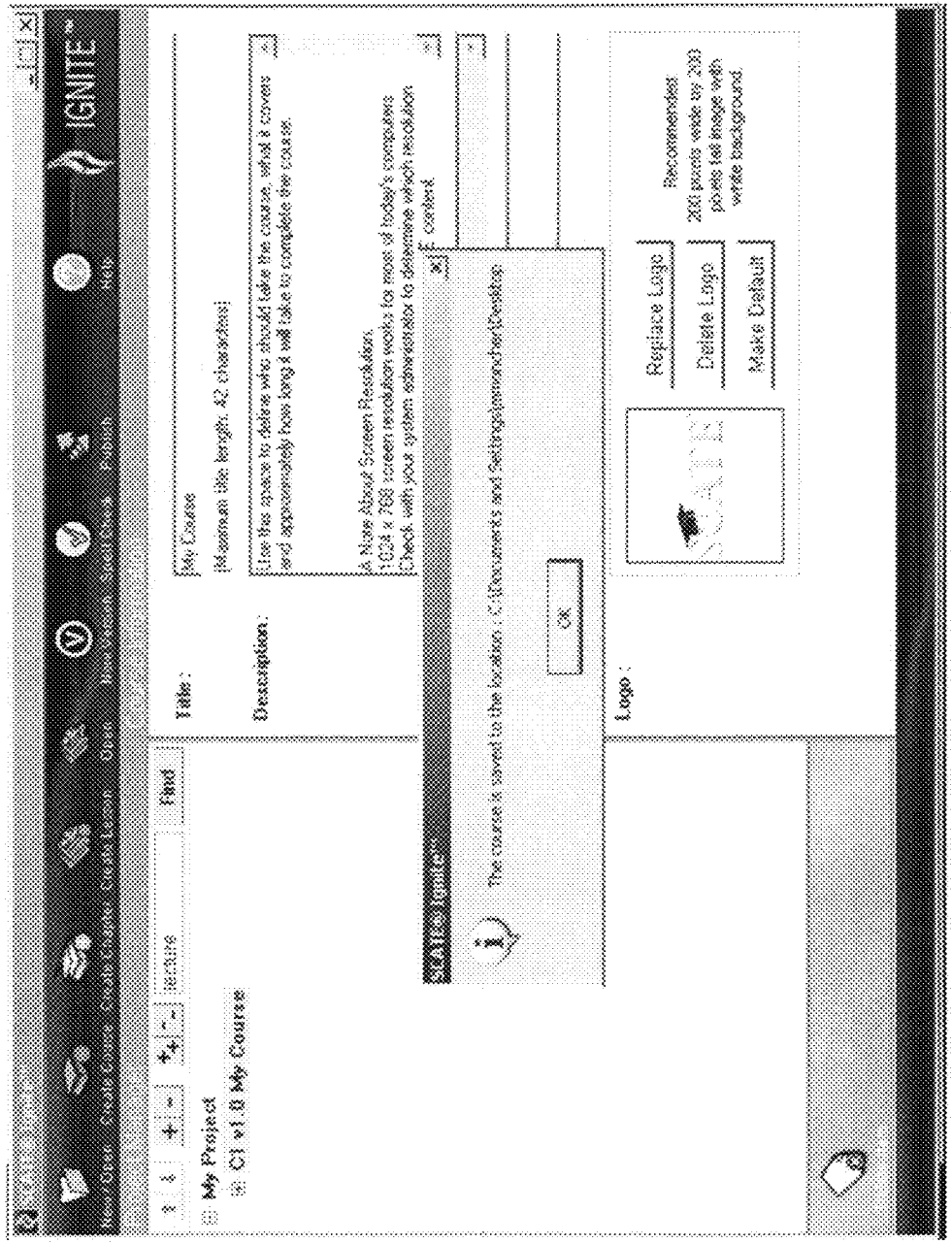
FIG. 20 is a view of a screen capture illustrating a publish stand-alone presentation step two screen, in accordance with a twentieth embodiment of the present invention.

Referring to FIG. 20, there is shown a view of a screen capture illustrating a "publish stand-alone movie presentation step 2" screen, in accordance with a twentieth embodiment of the present invention. By way of a non-limiting example, a status box would then be displayed stating where the created course has been saved. The user could click the "OK" button to remove the status box.

Referring to FIGS. 21-28, there are generally shown several screen captures that include the main screens that a user would encounter as he/she creates and/or modifies a course in conjunction with the course development program of the present invention. FIGS. 21-28 illustrate some of the concepts described with reference to FIG. 2.

Figure 21:
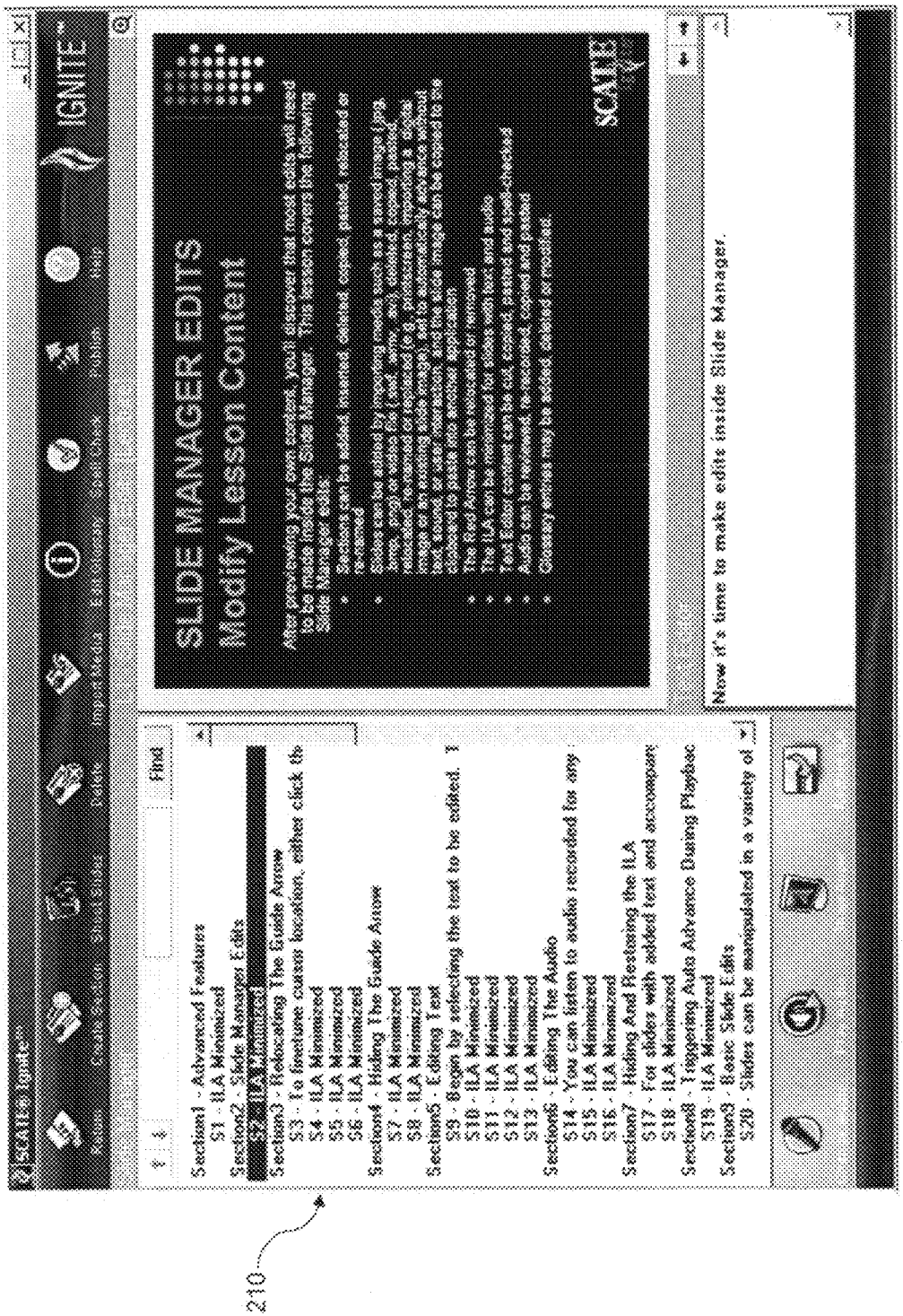
FIG. 21 is a view of a screen capture illustrating a content manager window, in accordance with a twenty-first embodiment of the present invention.

Referring to FIG. 21, there is shown a view of a screen capture illustrating an "ignite slide manager window" also known as the content manager window, in accordance with a twenty-first embodiment of the present invention. By way of a non-limiting example, there is displayed a slide manager window and a slide manager edits window. The user could then specify the course, or specific portion thereof, to be opened with the corresponding slide displayed by the slide manager edits window.

Figure 21A:
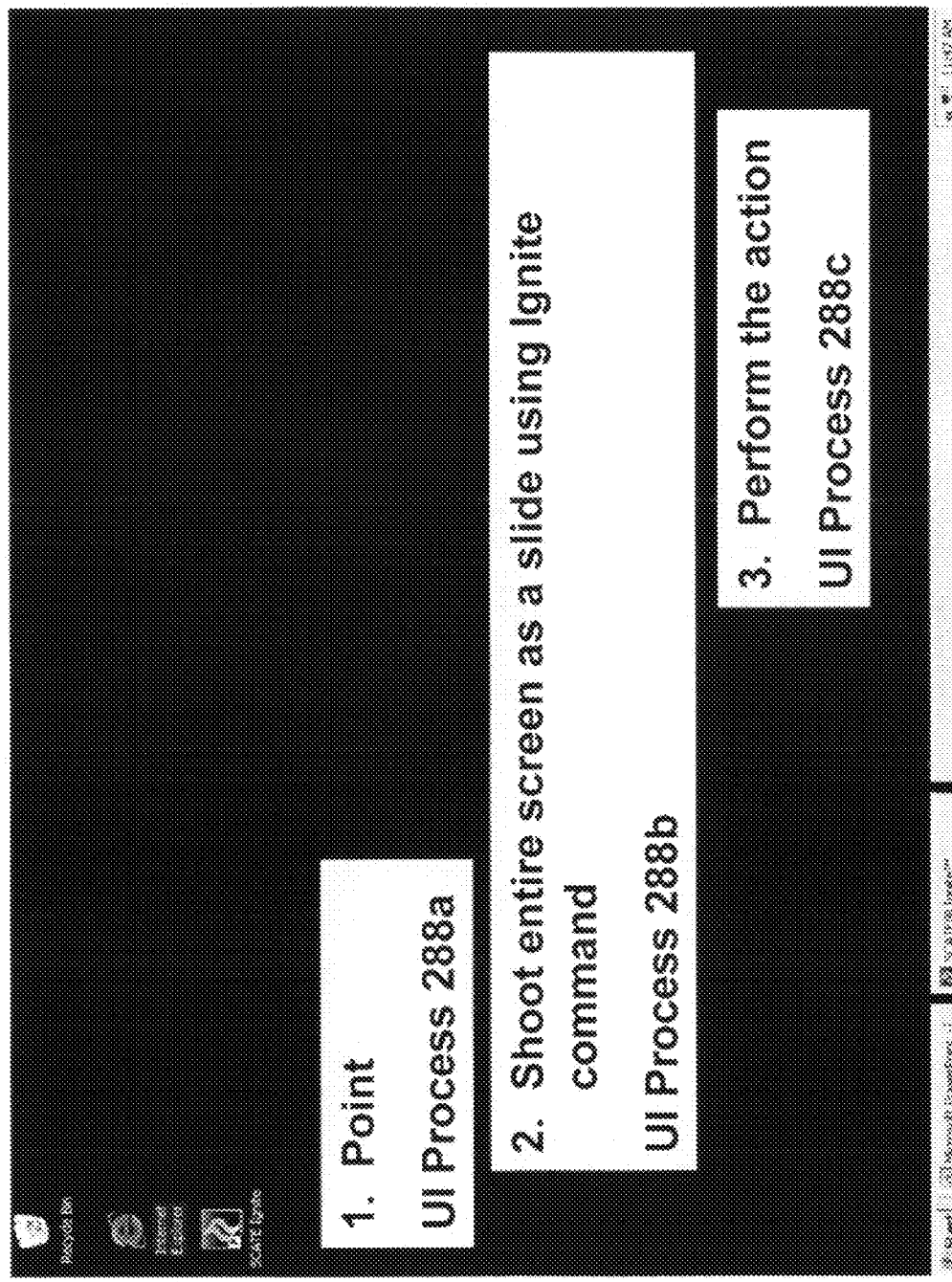
FIG. 21a is a view of a screen capture illustrating a minimized point, shoot, and action sequence, in accordance with a twenty-second embodiment of the present invention.

Referring to FIG. 21a, there is shown a view of a screen capture illustrating a minimized point, shoot, and action sequence, in accordance with a twenty-second embodiment of the present invention. By way of a non-limiting example, the user can point to a particular portion of the computer screen, shoot the entire contents of the computer screen as a slide using an appropriate command, and perform the desired action, e.g., via a menu.

Figure 22:
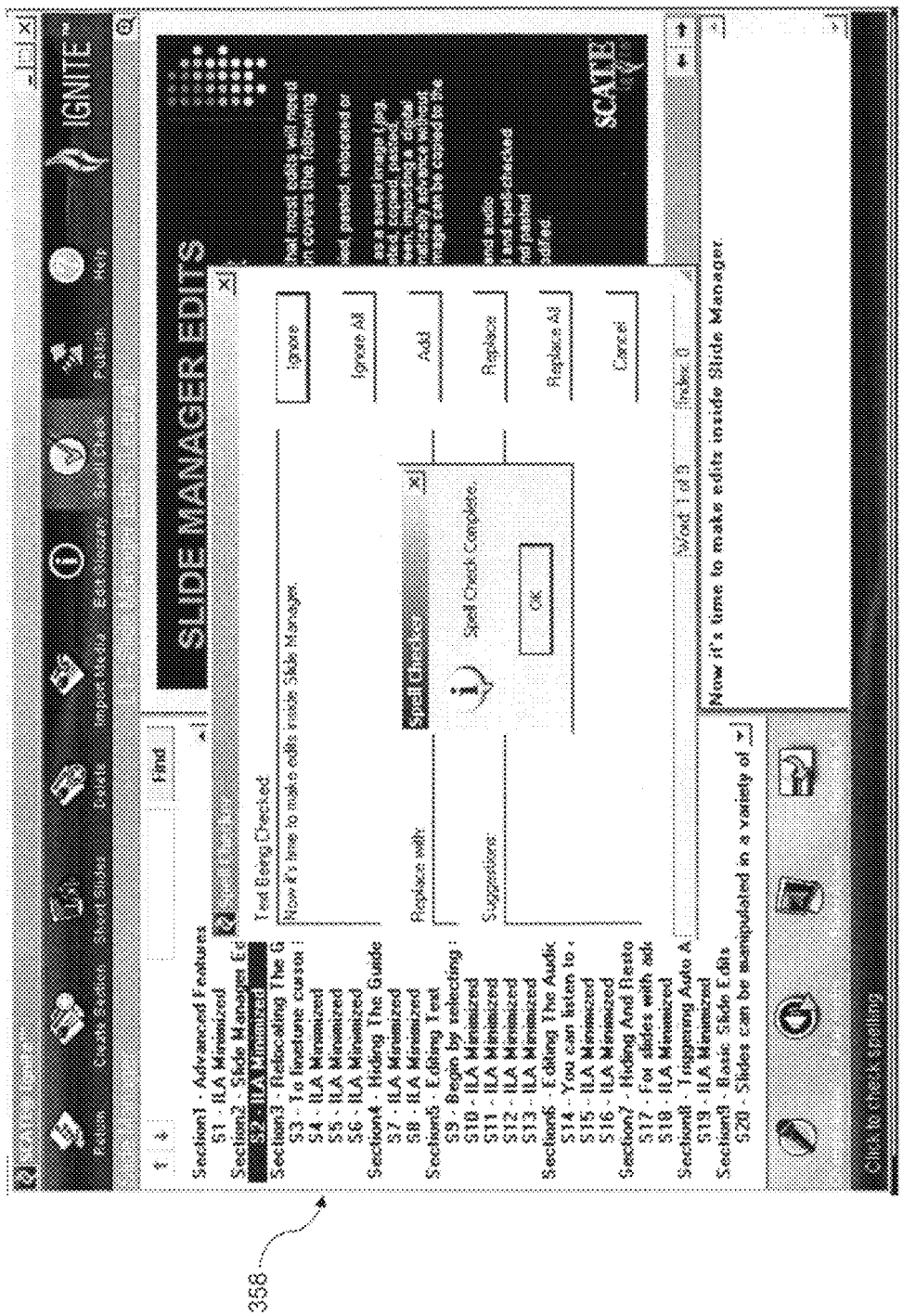
FIG. 22 is a view of a screen capture illustrating a spell checker window, in accordance with a twenty-third embodiment of the present invention.

Referring to FIG. 22, there is shown a view of a screen capture illustrating a "spell checker" window, in accordance with a twenty-third embodiment of the present invention. By way of a non-limiting example, the user can spell check any word contained in the course content.

Figure 23:
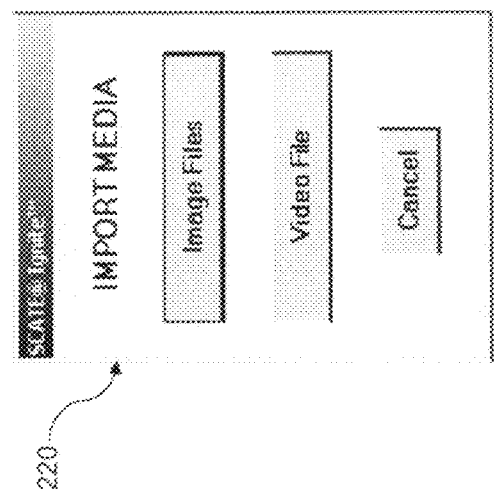
FIG. 23 is a view of a screen capture illustrating an import files dialog window, in accordance with a twenty-fourth embodiment of the present invention.

Referring to FIG. 23, there is shown a view of a screen capture illustrating an "import files dialog" window, in accordance with a twenty-fourth embodiment of the present invention. By way of a non-limiting example, the user can choose which types of files (e.g., image, sound and/or the like) to import into the course contents by clicking on the appropriate button.

Figure 24:
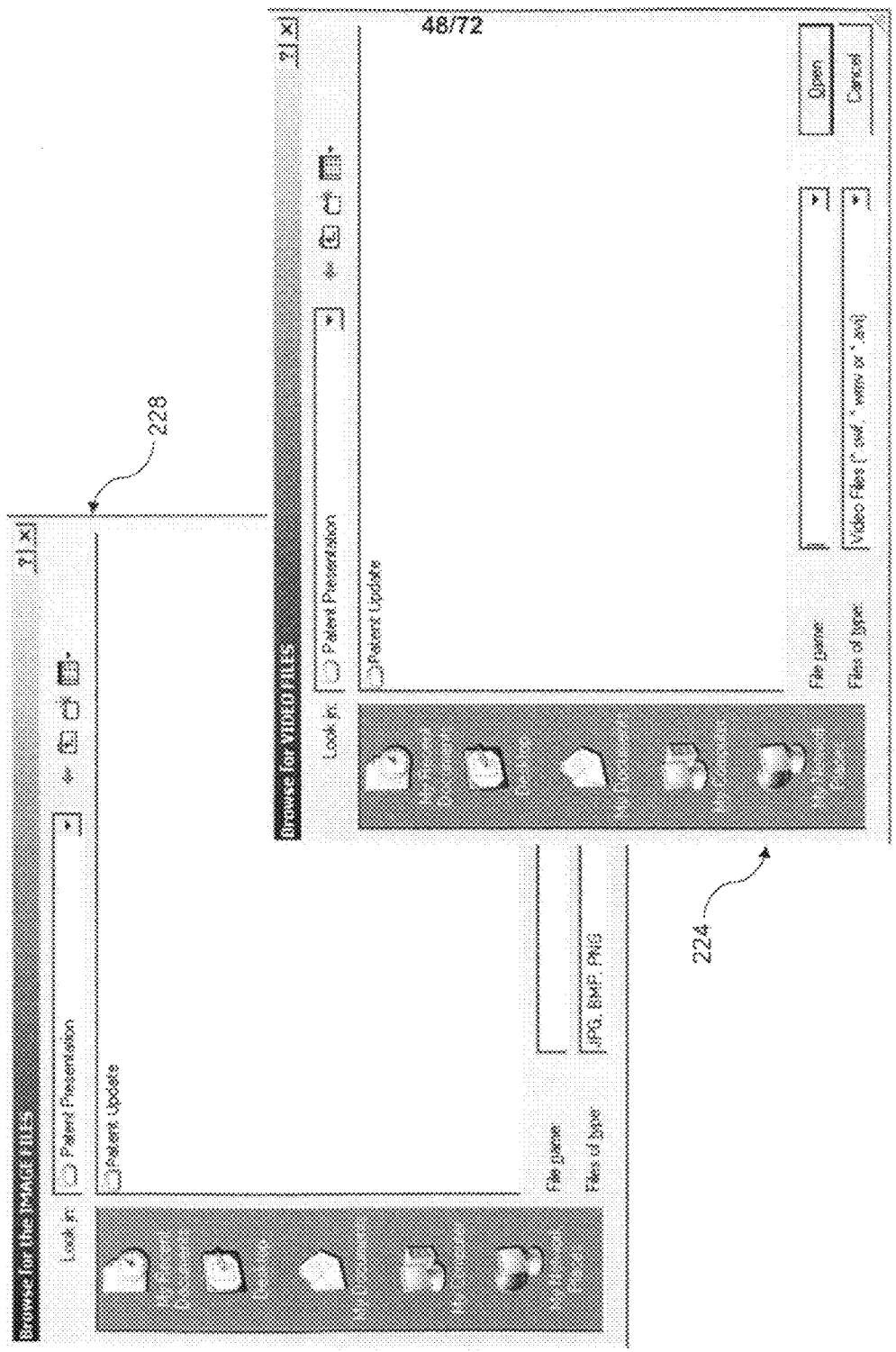
FIG. 24 is a view of a screen capture illustrating a browse for files window, in accordance with a twenty-fifth embodiment of the present invention.

Referring to FIG. 24, there is shown a view of a screen capture illustrating a "browse for media files" window, in accordance with a twenty-fifth embodiment of the present invention. By way of a non-limiting example, the user can browse for files to be imported into the course contents.

Figure 25:
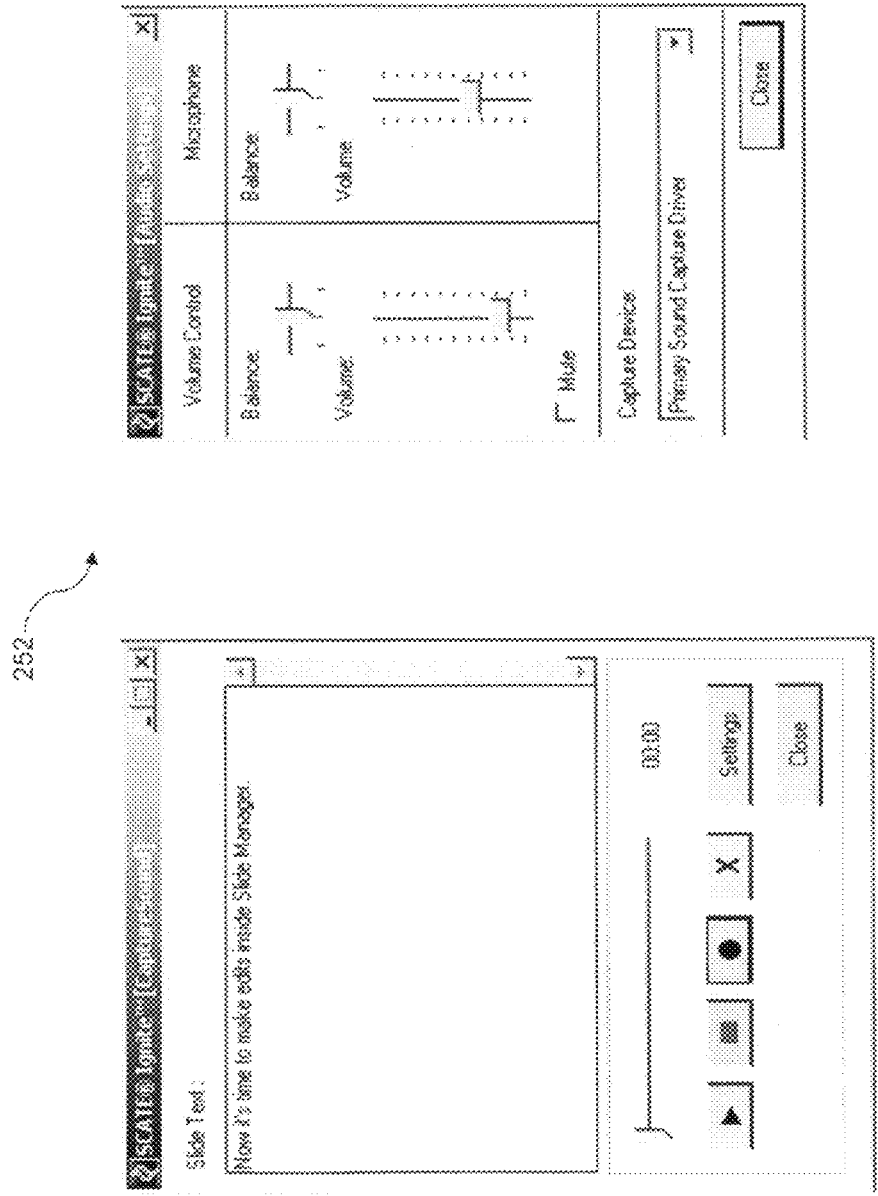
FIG. 25 is a view of a screen capture illustrating capture sound windows, in accordance with a twenty-sixth embodiment of the present invention.
Figure 26:
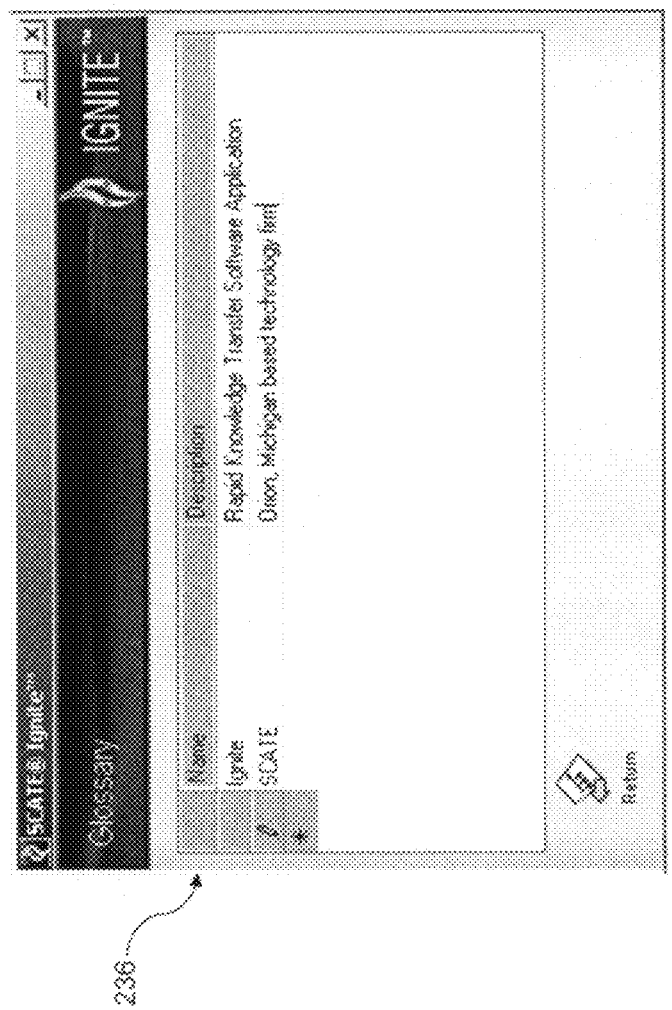

Referring to FIG. 25, there is shown a view of a screen capture illustrating "capture sound" windows, in accordance with a twenty-sixth embodiment of the present invention. By way of a non-limiting example, the user can record a sound file (e.g., the box on the left) and the user can hear the recorded sound file with an appropriate sound file player (e.g., the box on the right).

Figure 1A:
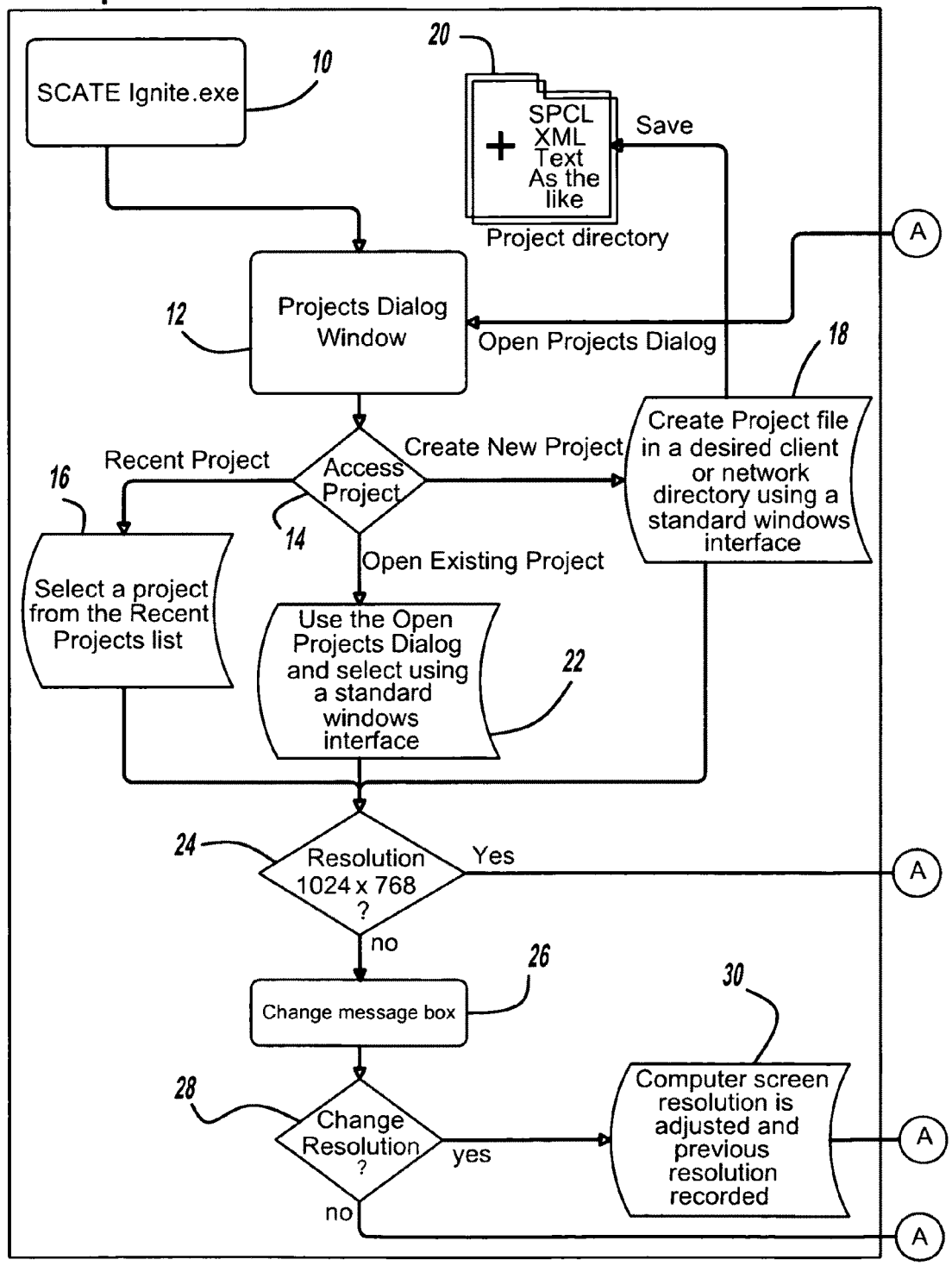
Figure 1B:
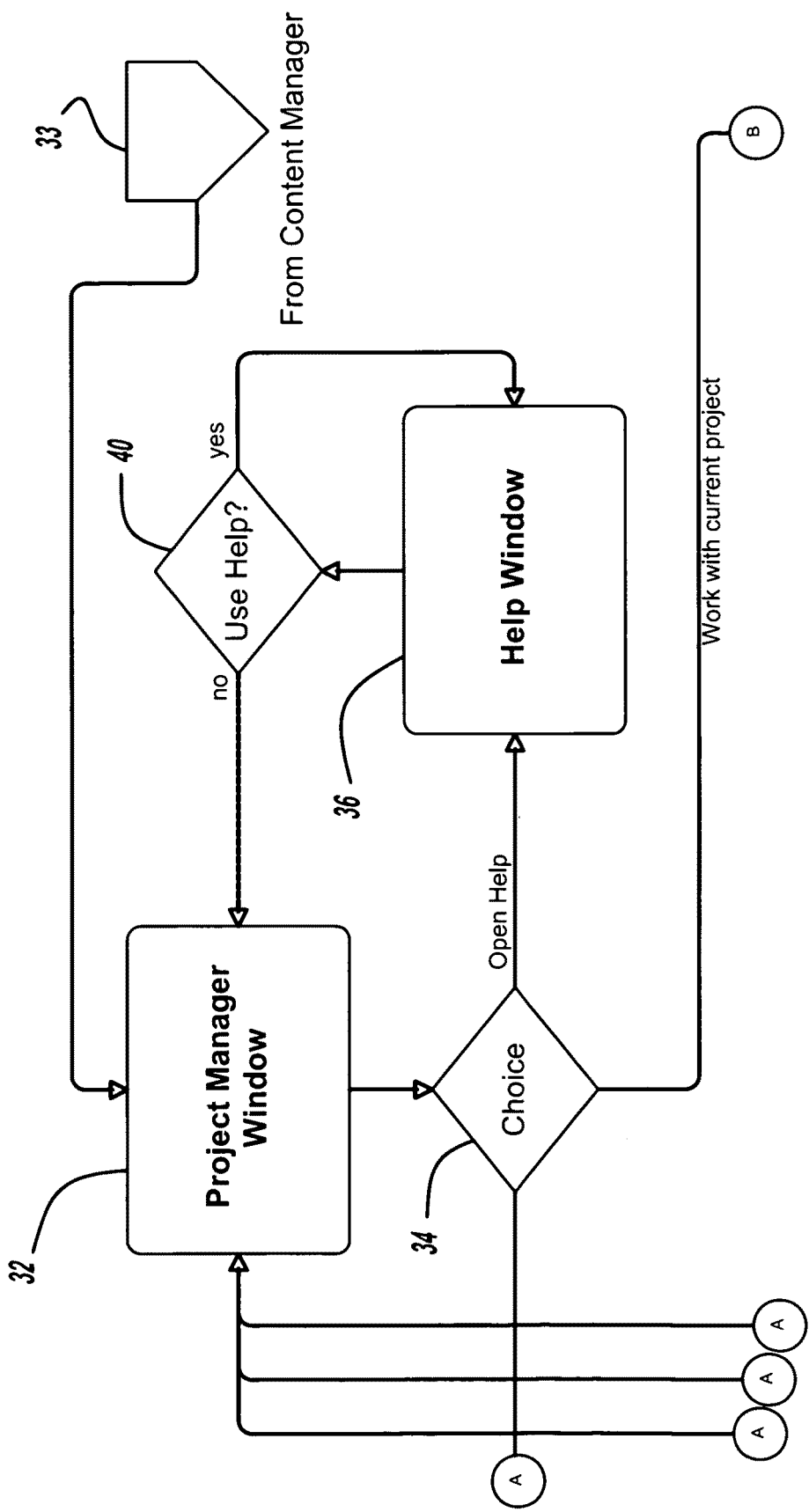
Figure 1E:
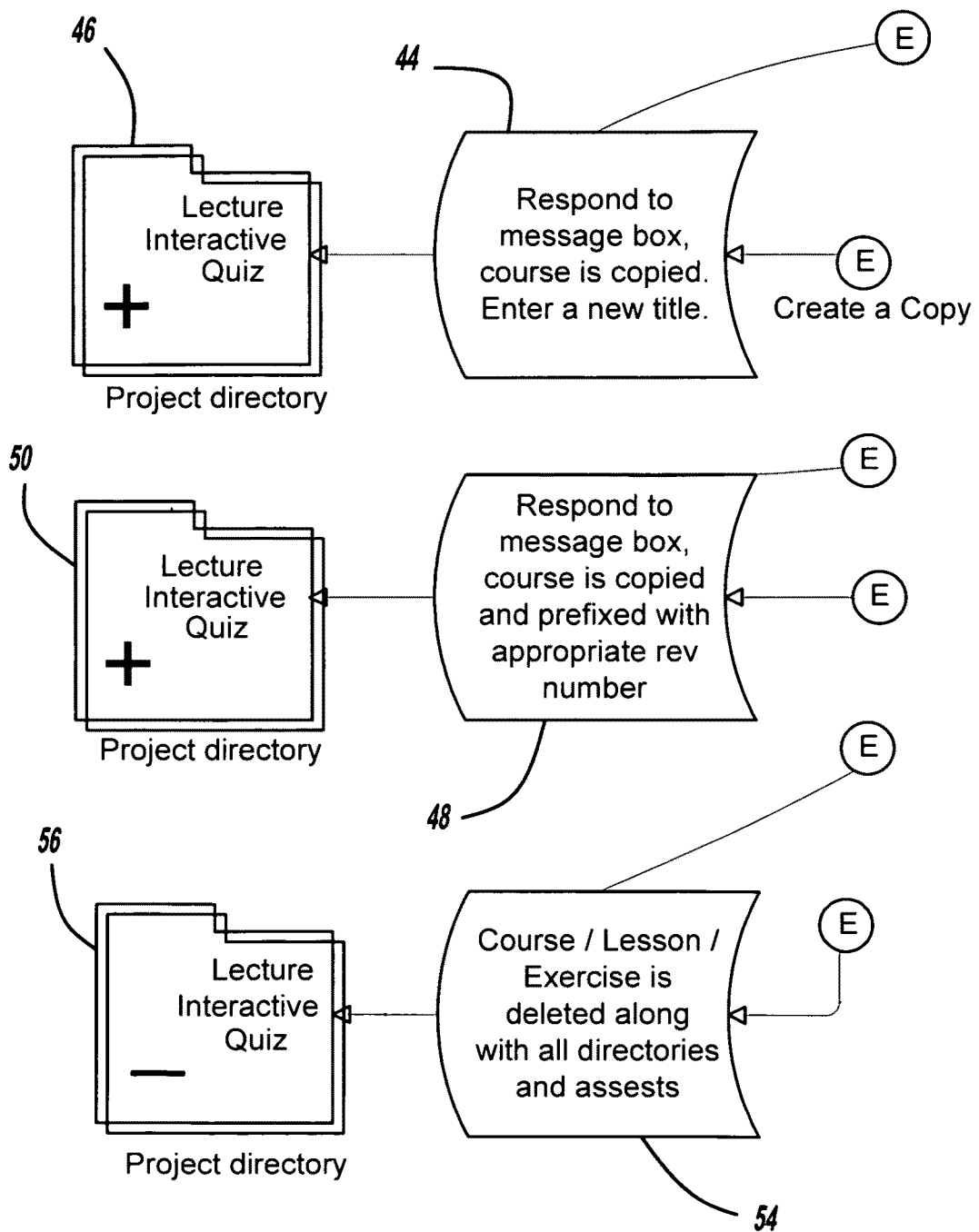
Figure 1F:
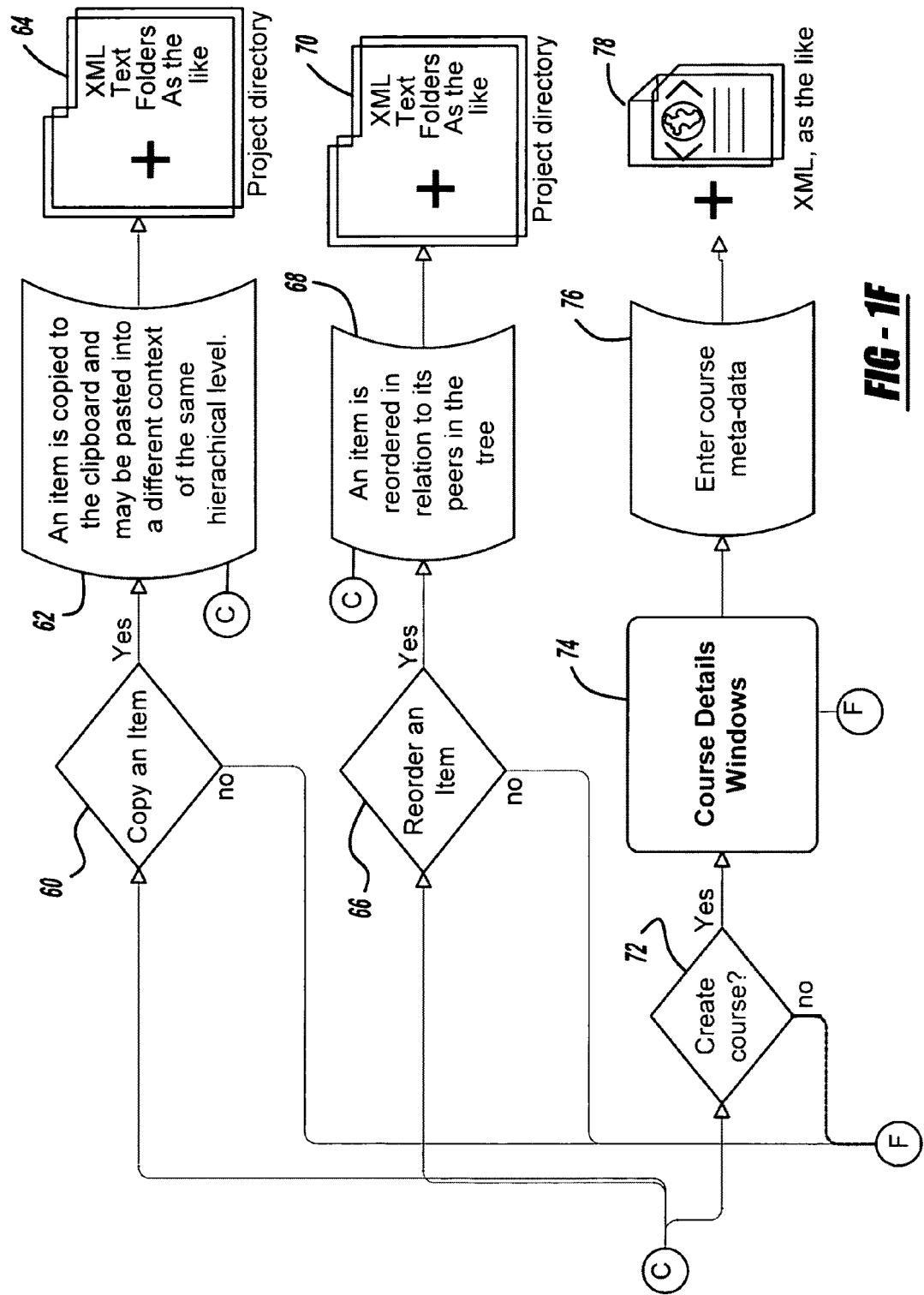
Figure 1G:
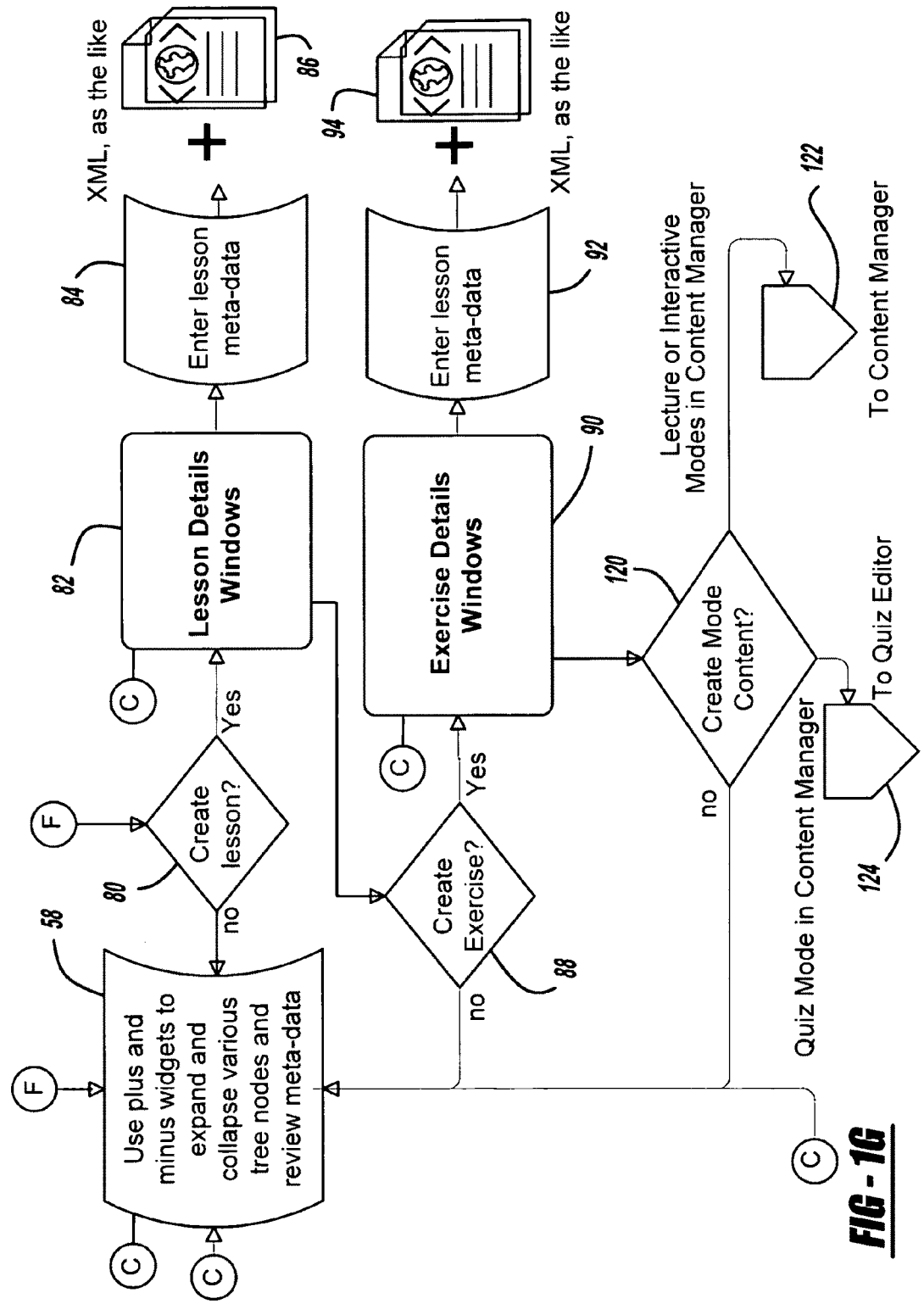
Figure 2A:
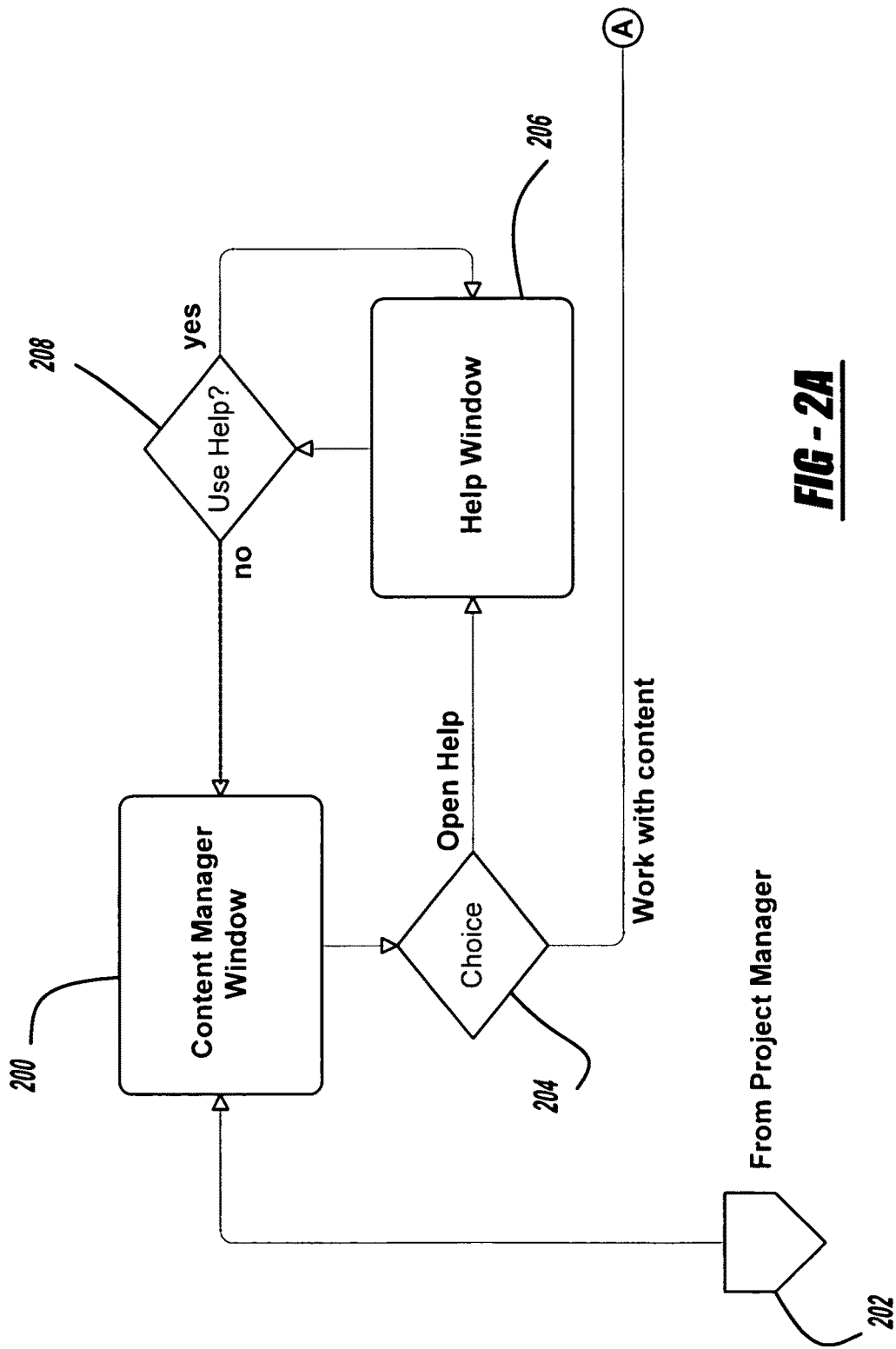
Figure 2C:
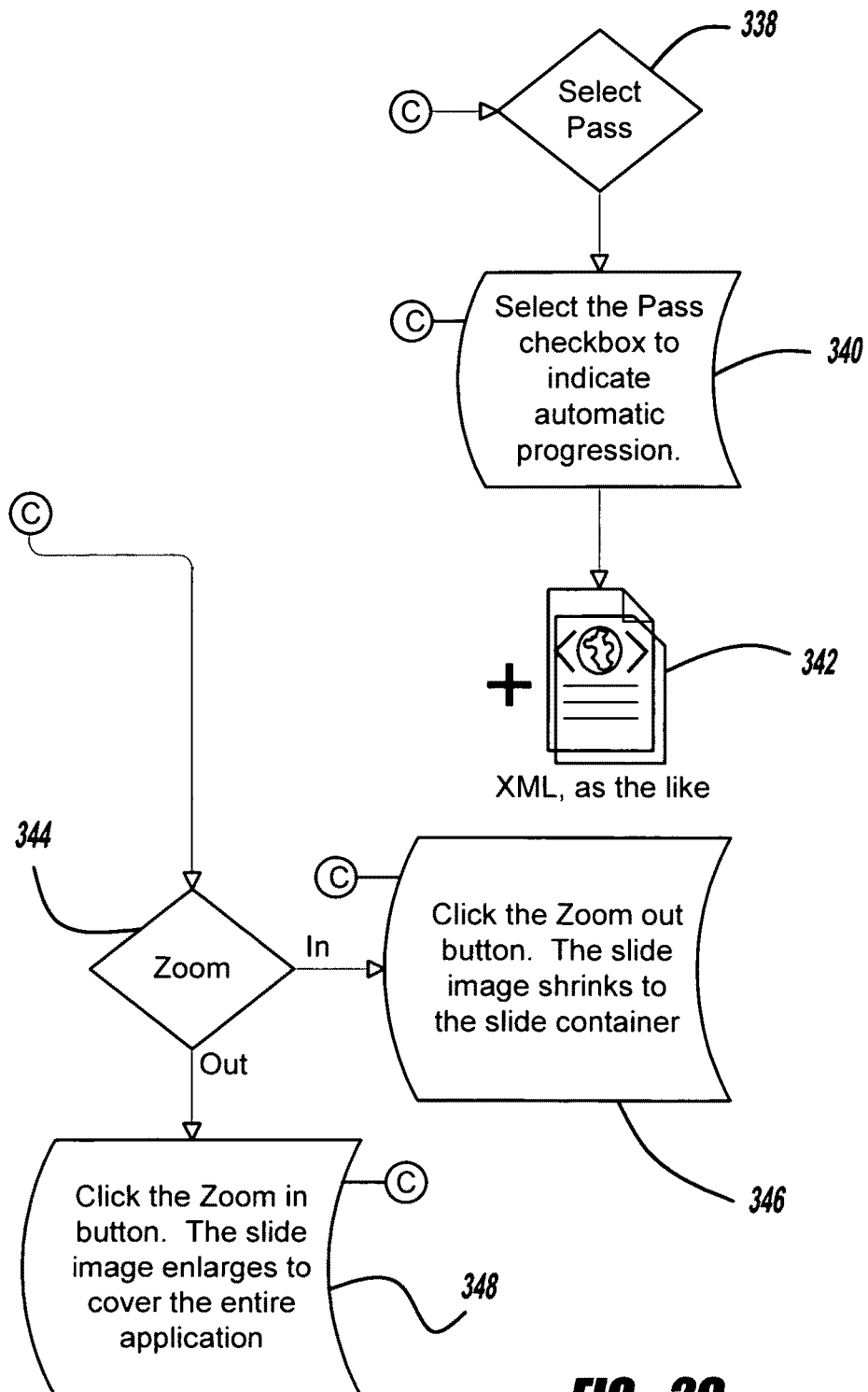
Figure 2F:
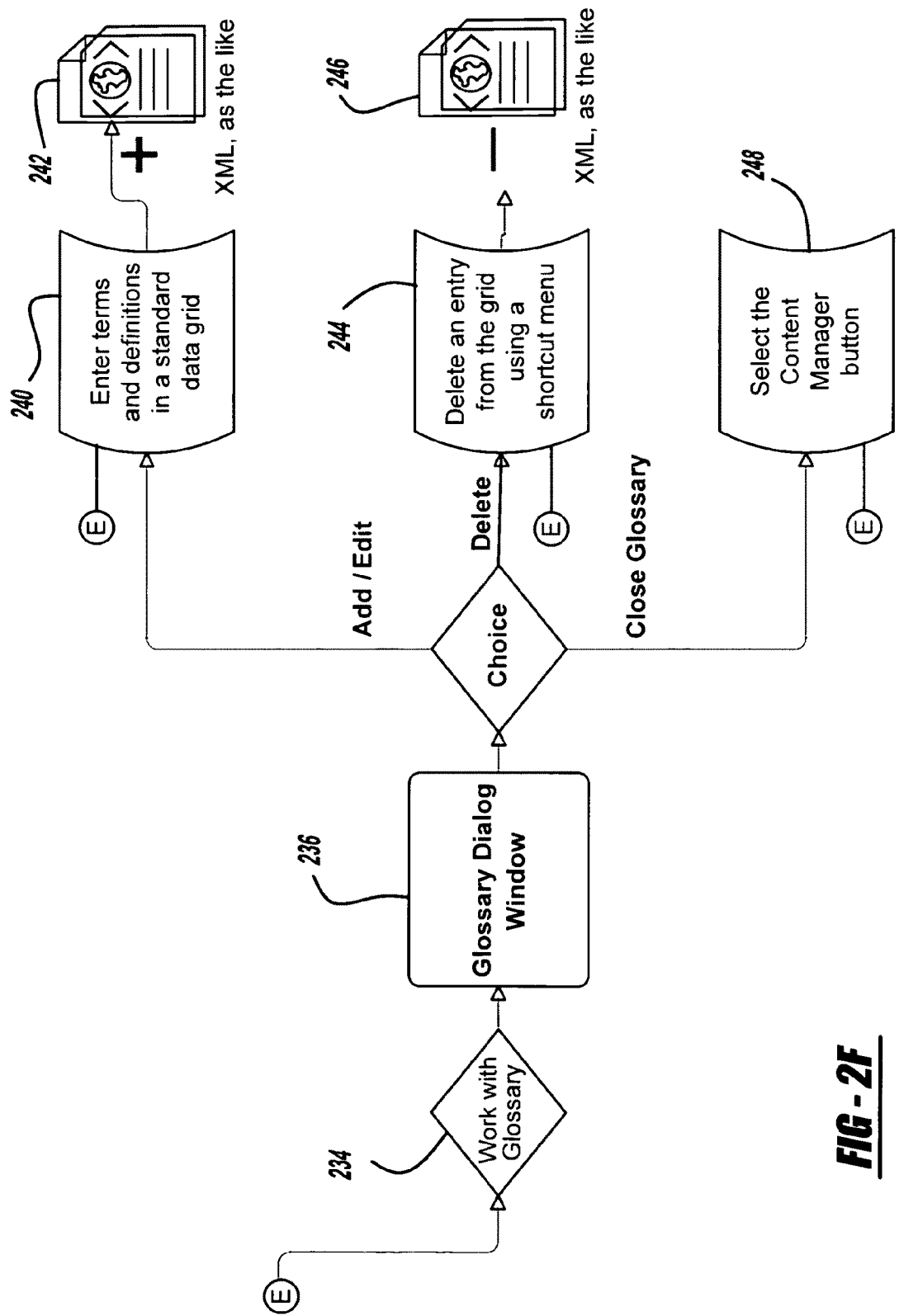
Figure 26:
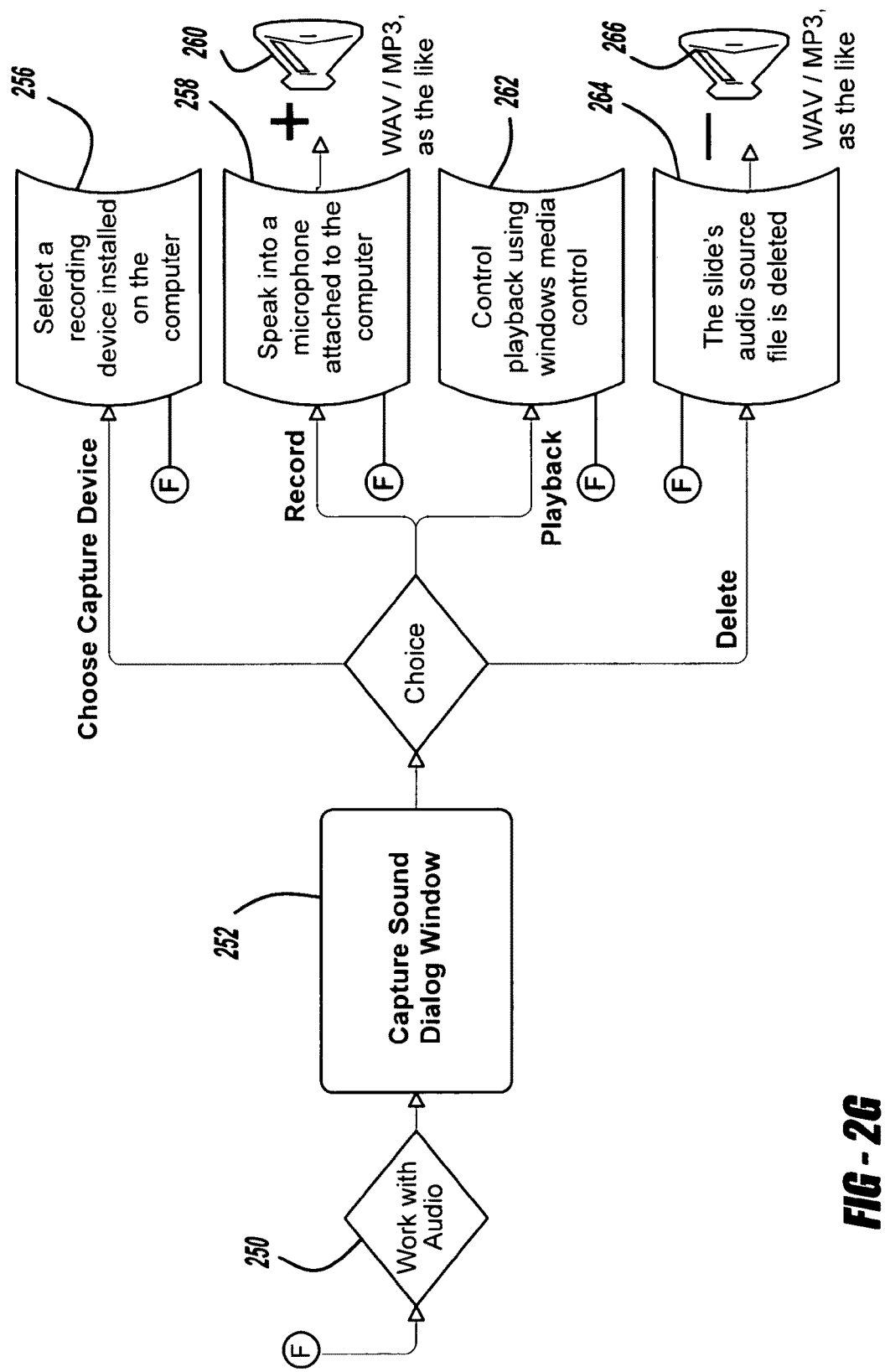
FIG. 26 is a view of a screen capture illustrating a glossary editor window, in accordance with a twenty-seventh embodiment of the present invention.
Figure 2J:
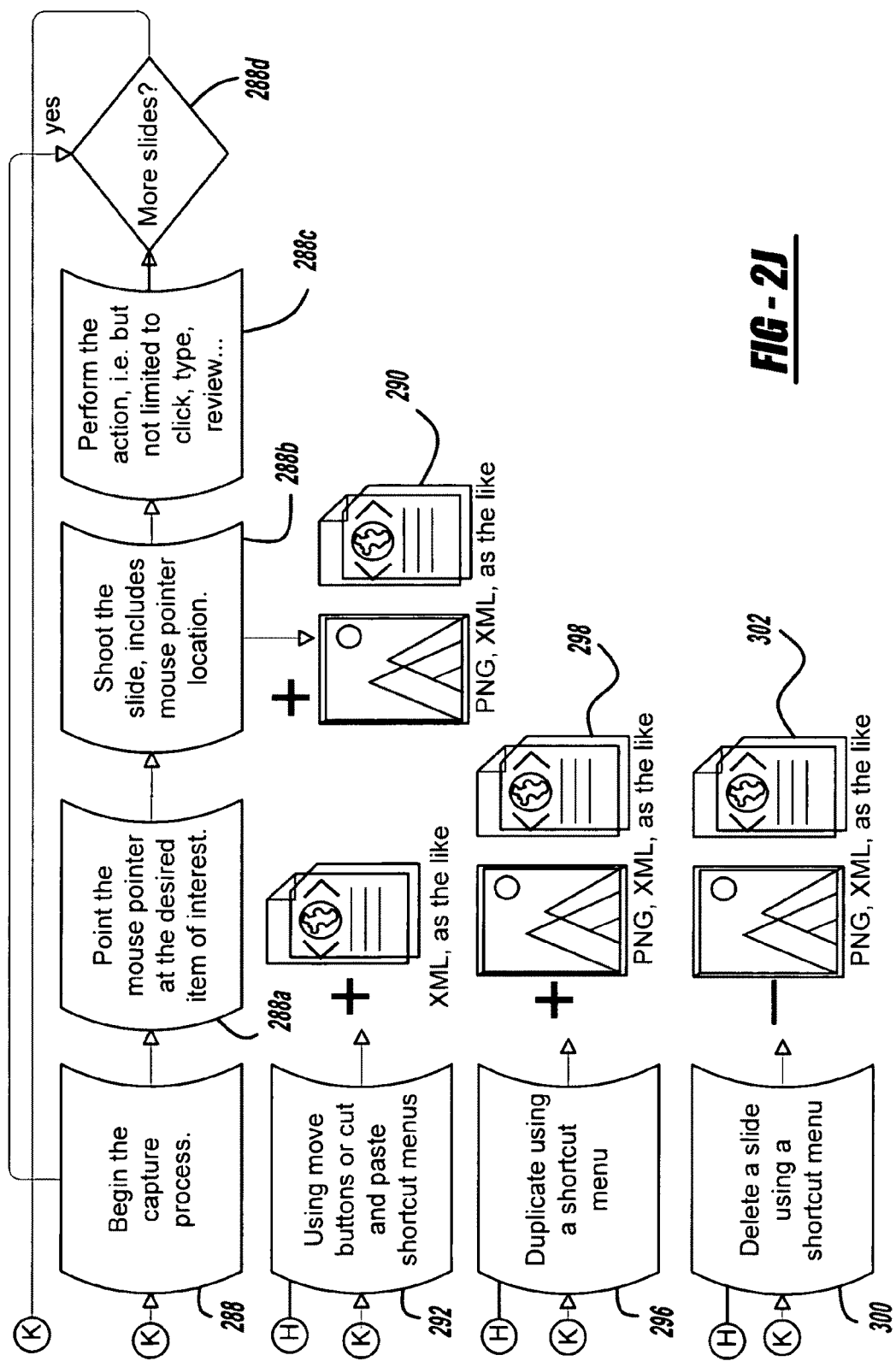
Figure 2K:
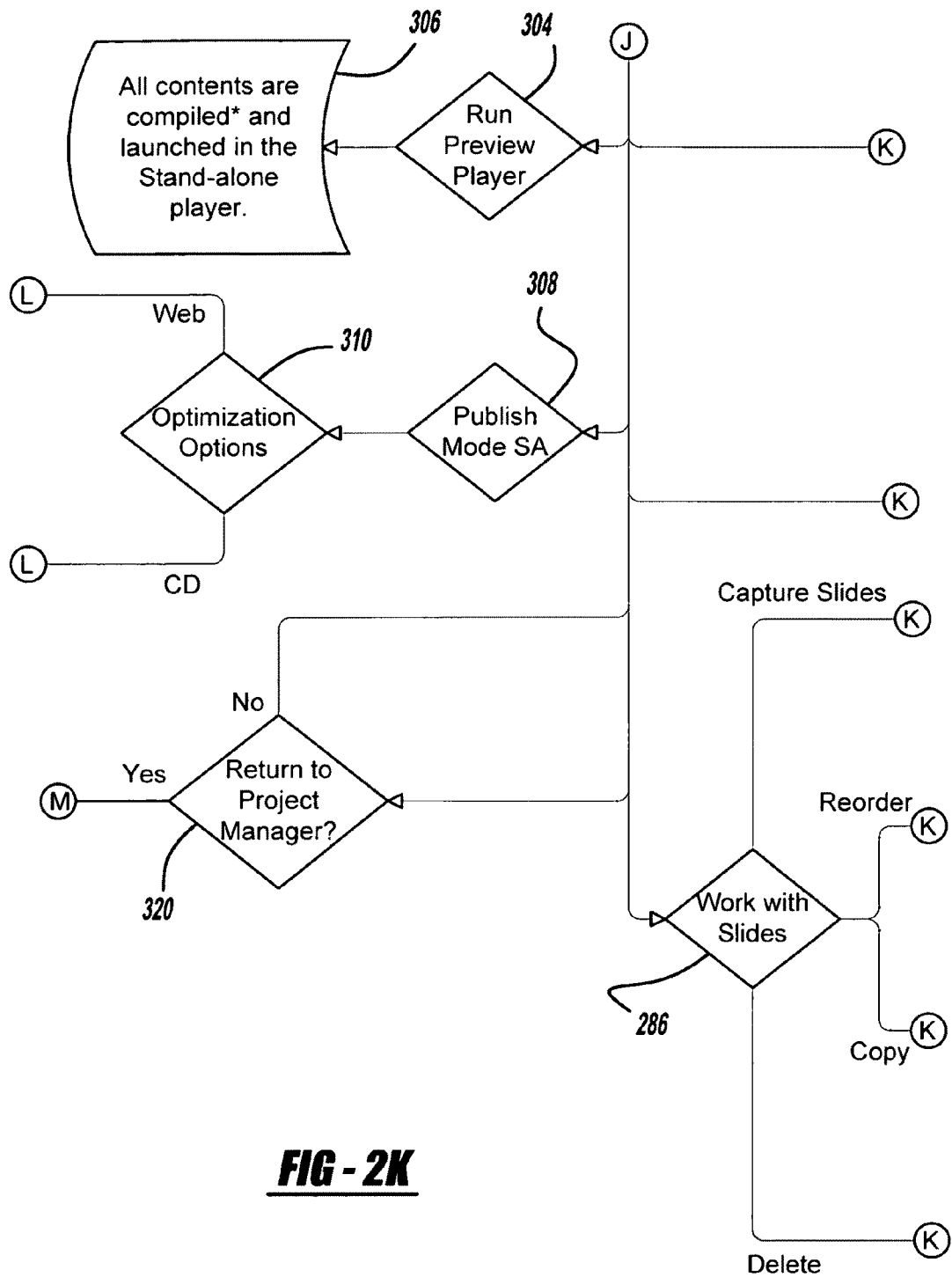
Figure 2L:
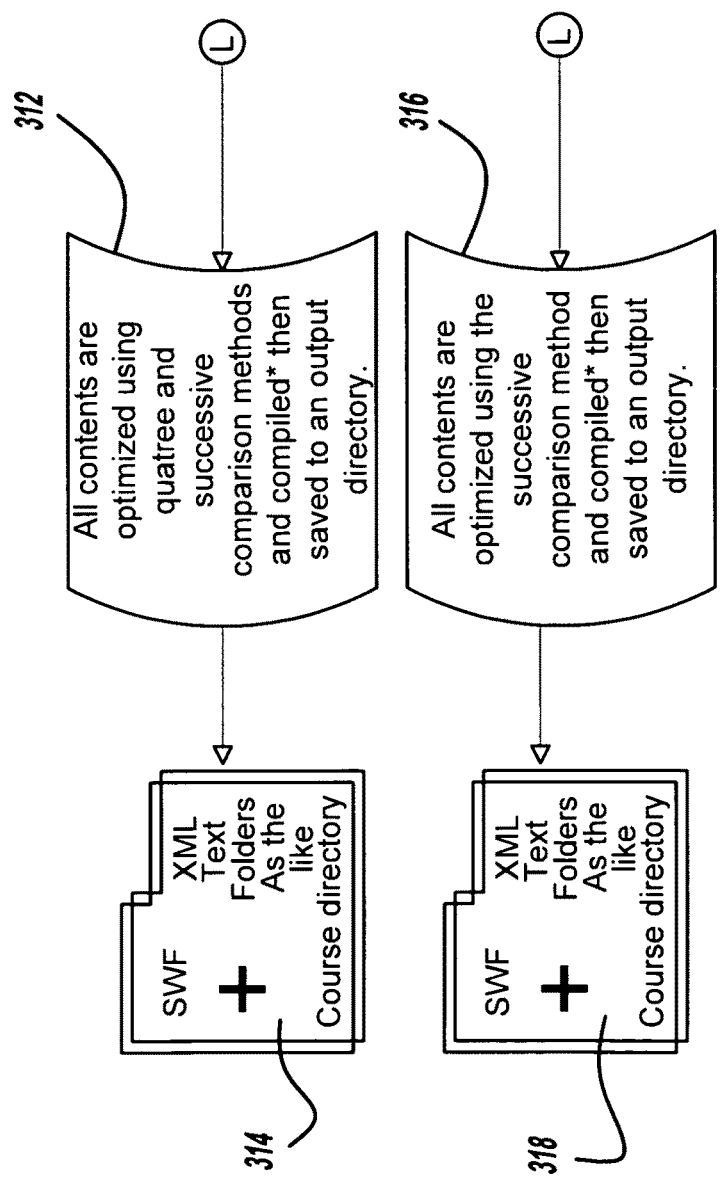
Figure 3A:
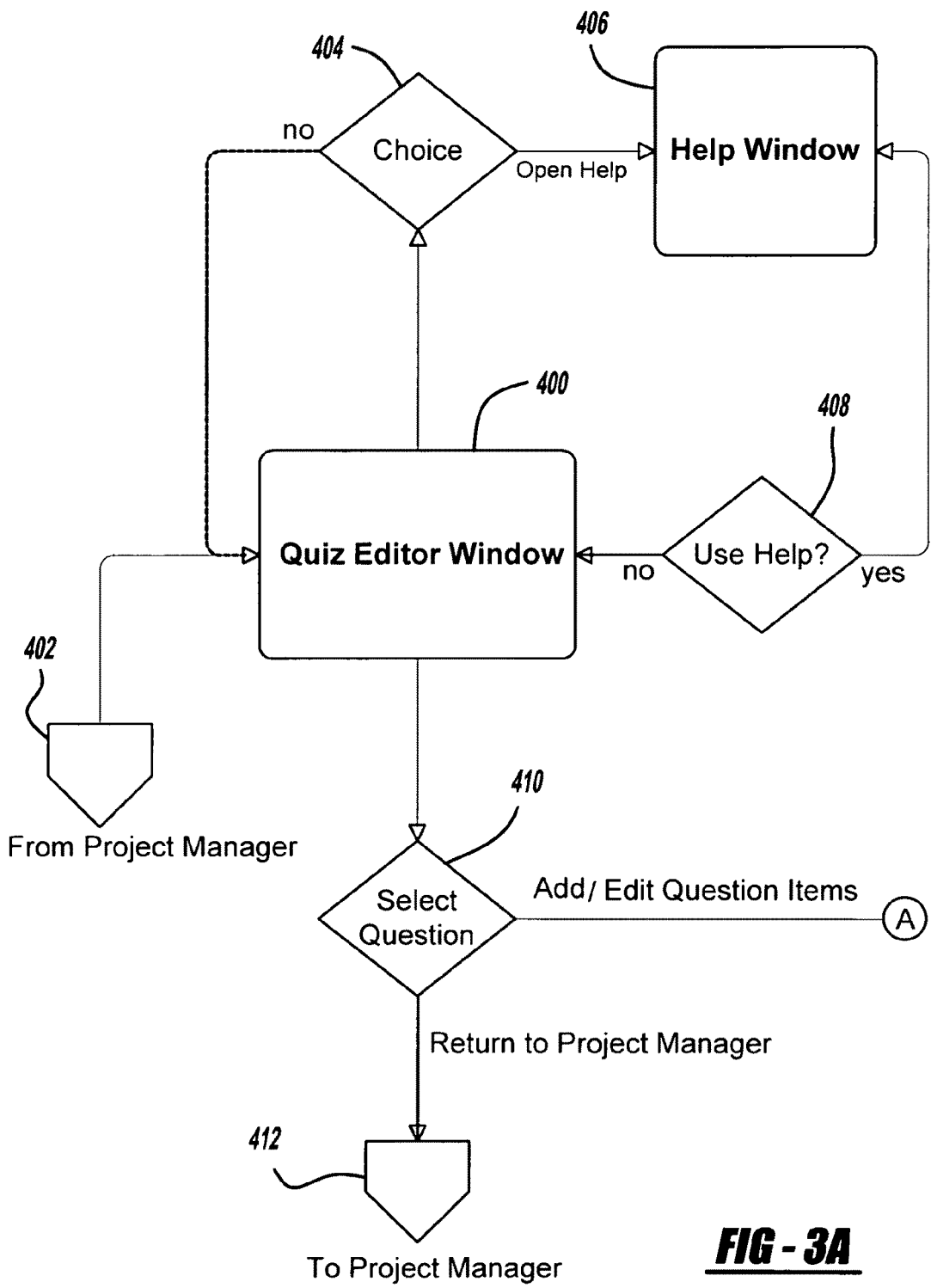
Figure 3B:
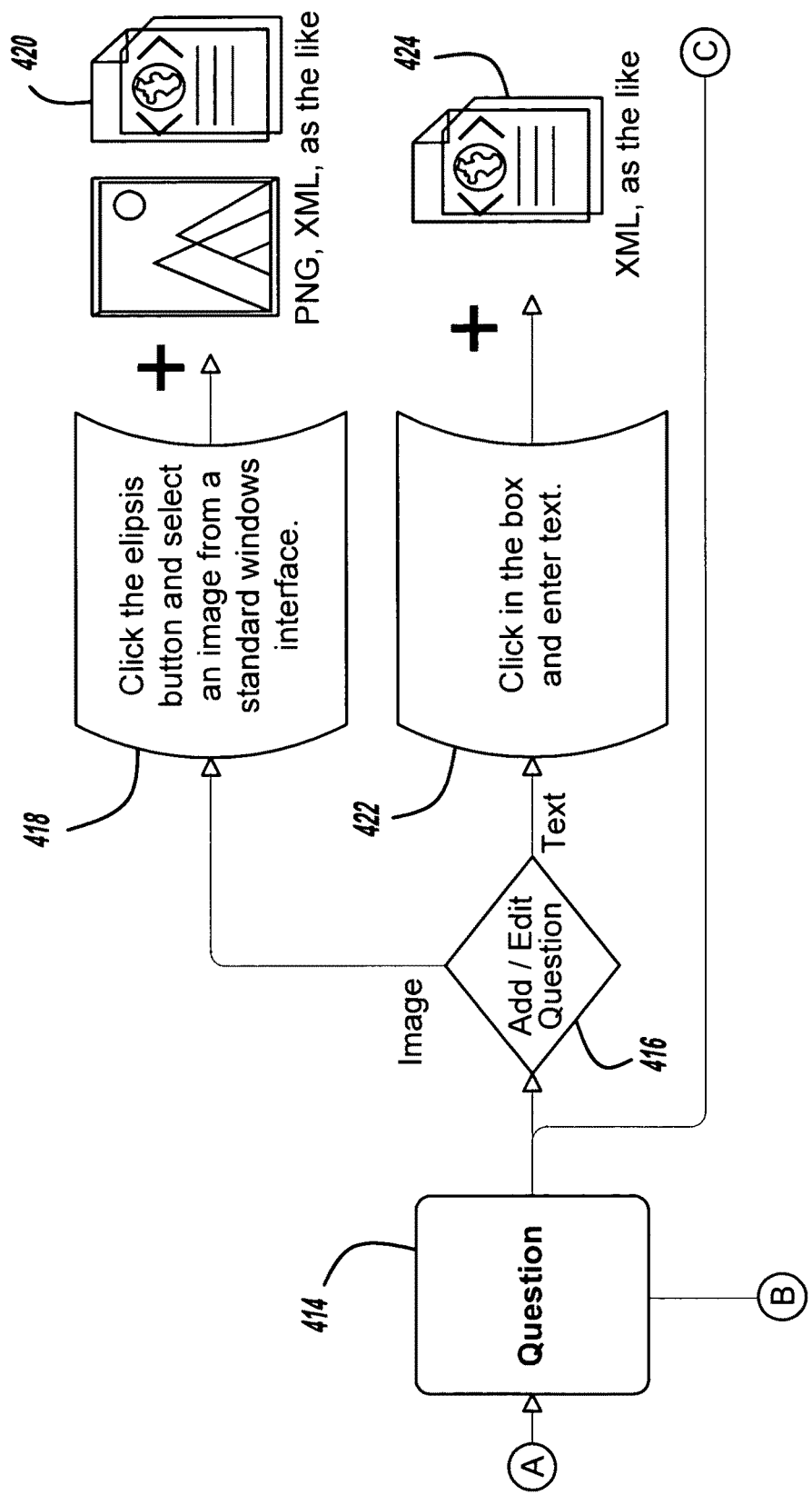
Figure 3C:
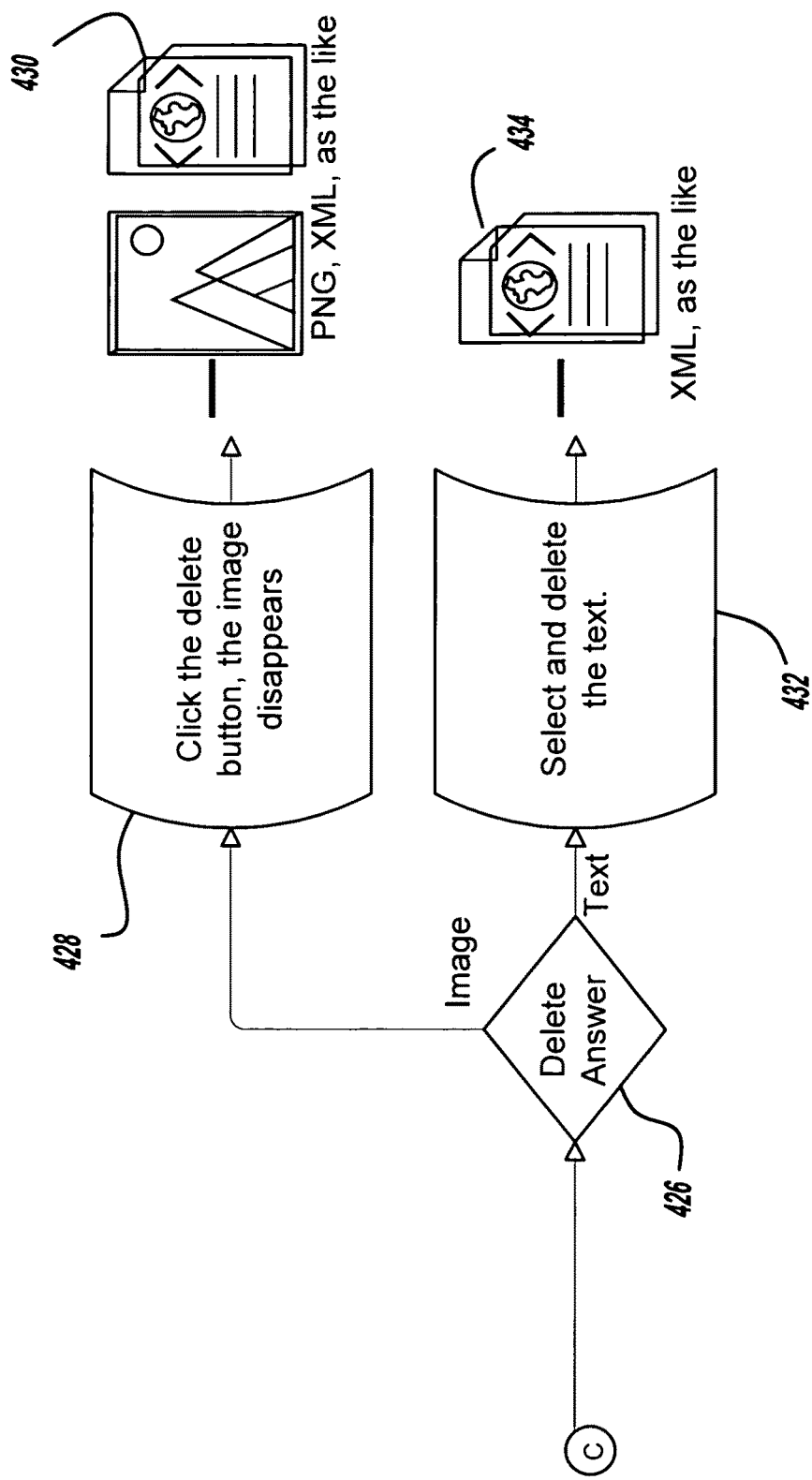
Figure 3D:
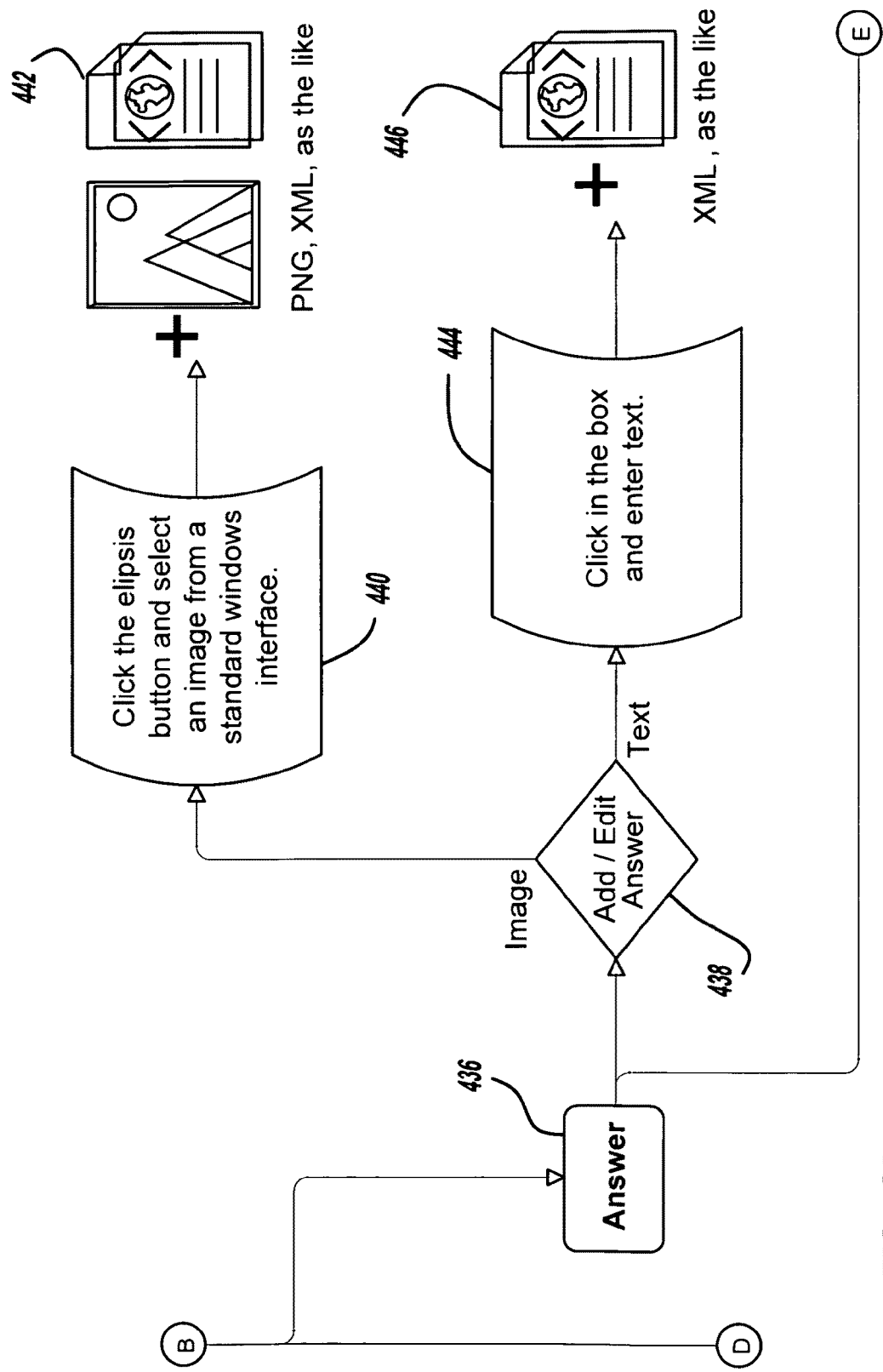
Figure 3E:
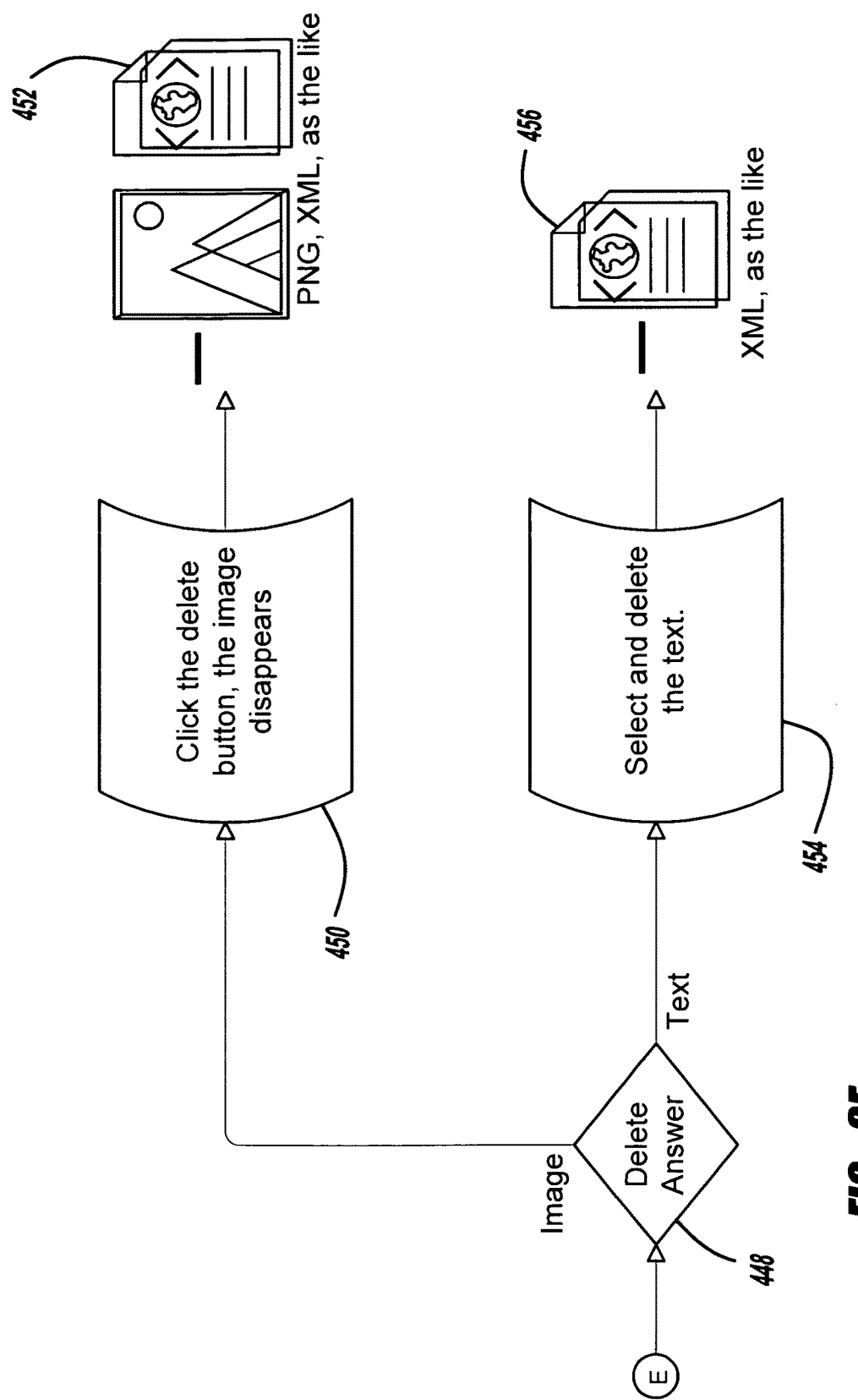
Figure 3G:
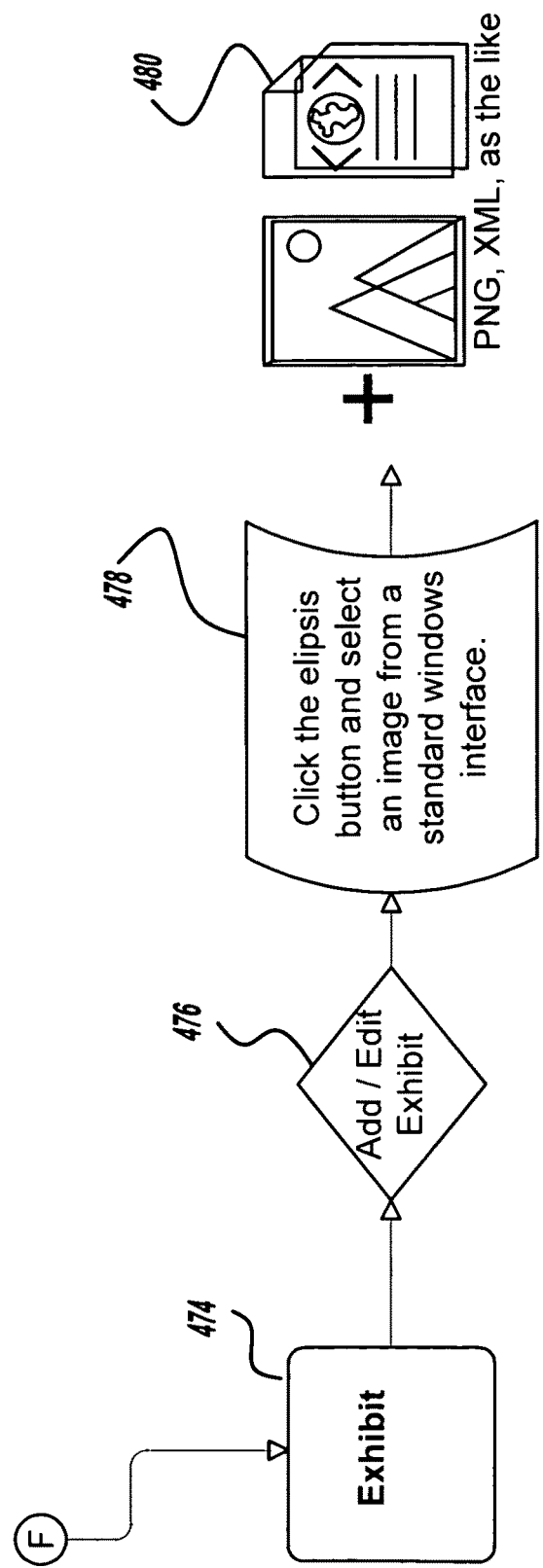

Referring to FIG. 26, there is shown a view of a screen capture illustrating a "glossary editor" window, in accordance with a twenty-seventh embodiment of the present invention. By way of a non-limiting example, the user can add a term and definition to the glossary of the course contents.

Figure 27:
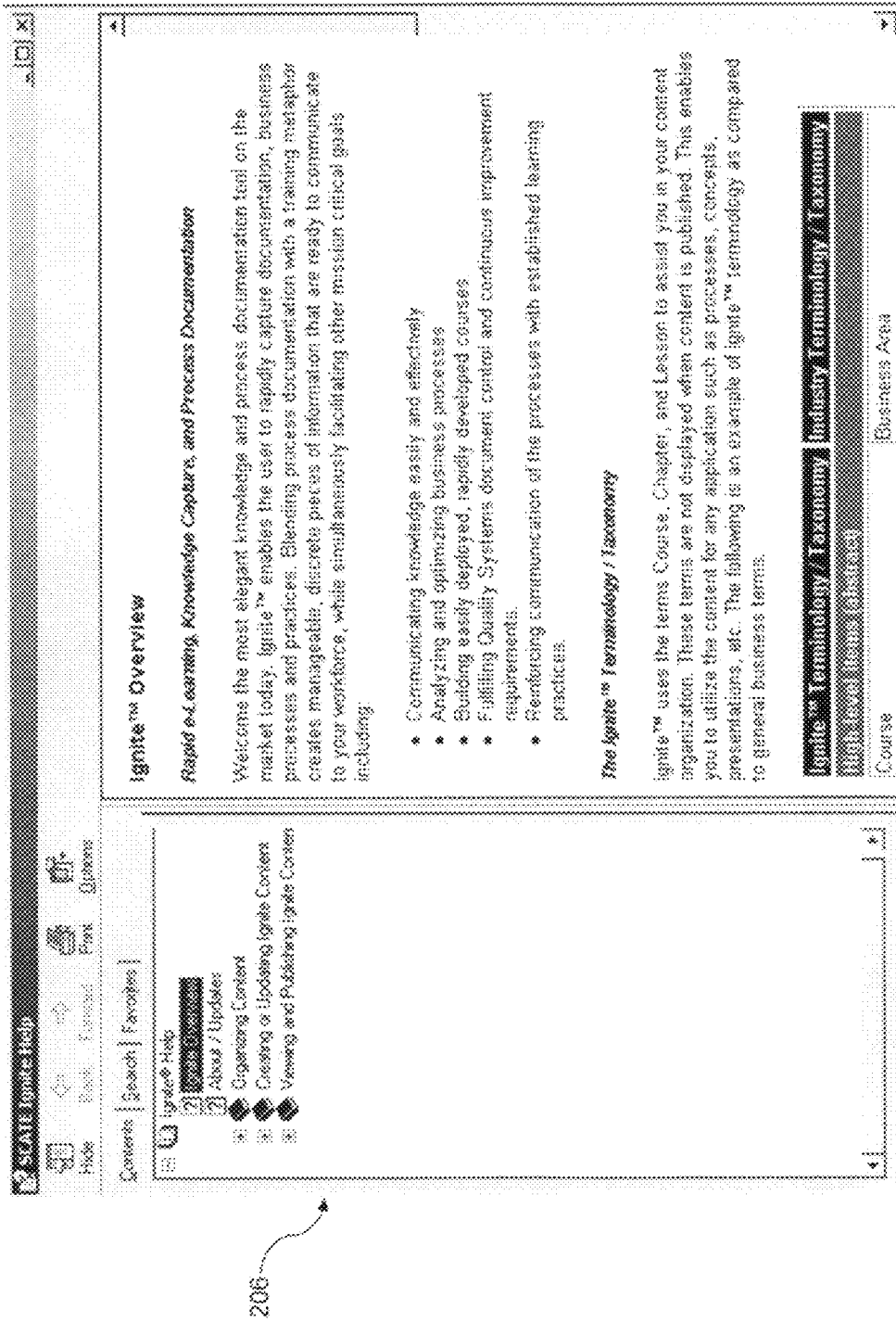
FIG. 27 is a view of a screen capture illustrating a help window, in accordance with a twenty-eighth embodiment of the present invention.

Referring to FIG. 27, there is shown a view of a screen capture illustrating a "help" window, in accordance with a twenty-eighth embodiment of the present invention. By way of a non-limiting example, the user can provide help contents and indexes to enable another user to use the features of the present invention.

Figure 28:
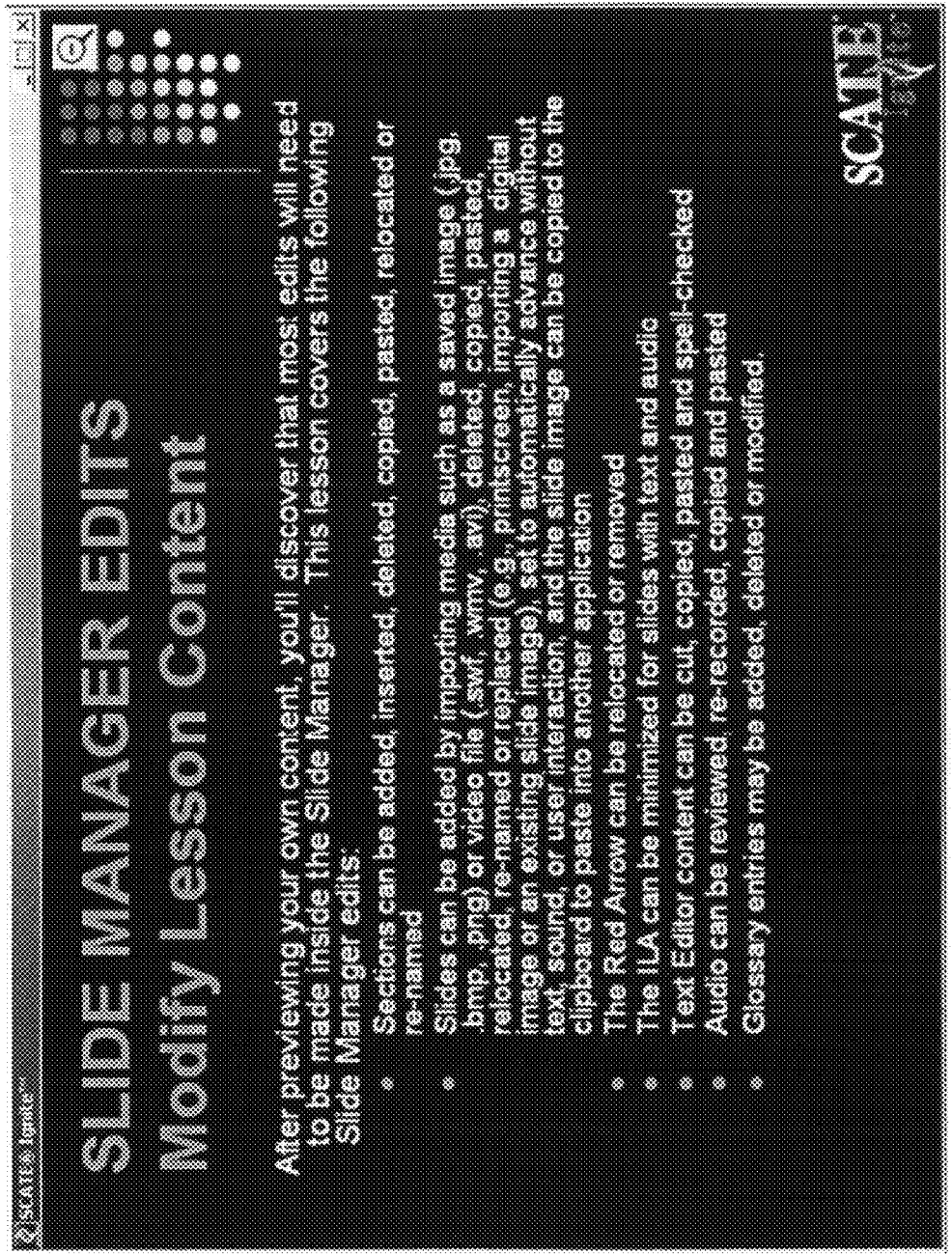
FIG. 28 is a view of a screen capture illustrating a zoom window, in accordance with a twenty-ninth embodiment of the present invention.

Referring to FIG. 28, there is shown a view of a screen capture illustrating a "zoom window" in accordance with a twenty-ninth embodiment of the present invention. By way of a non-limiting example, the user can zoom in and/or out of images on the computer screen.

Figure 29:
FIG. 29 is a view of a screen capture illustrating a quiz editor window for a text-based question, in accordance with a thirtieth embodiment of the present invention.
Figure 30:
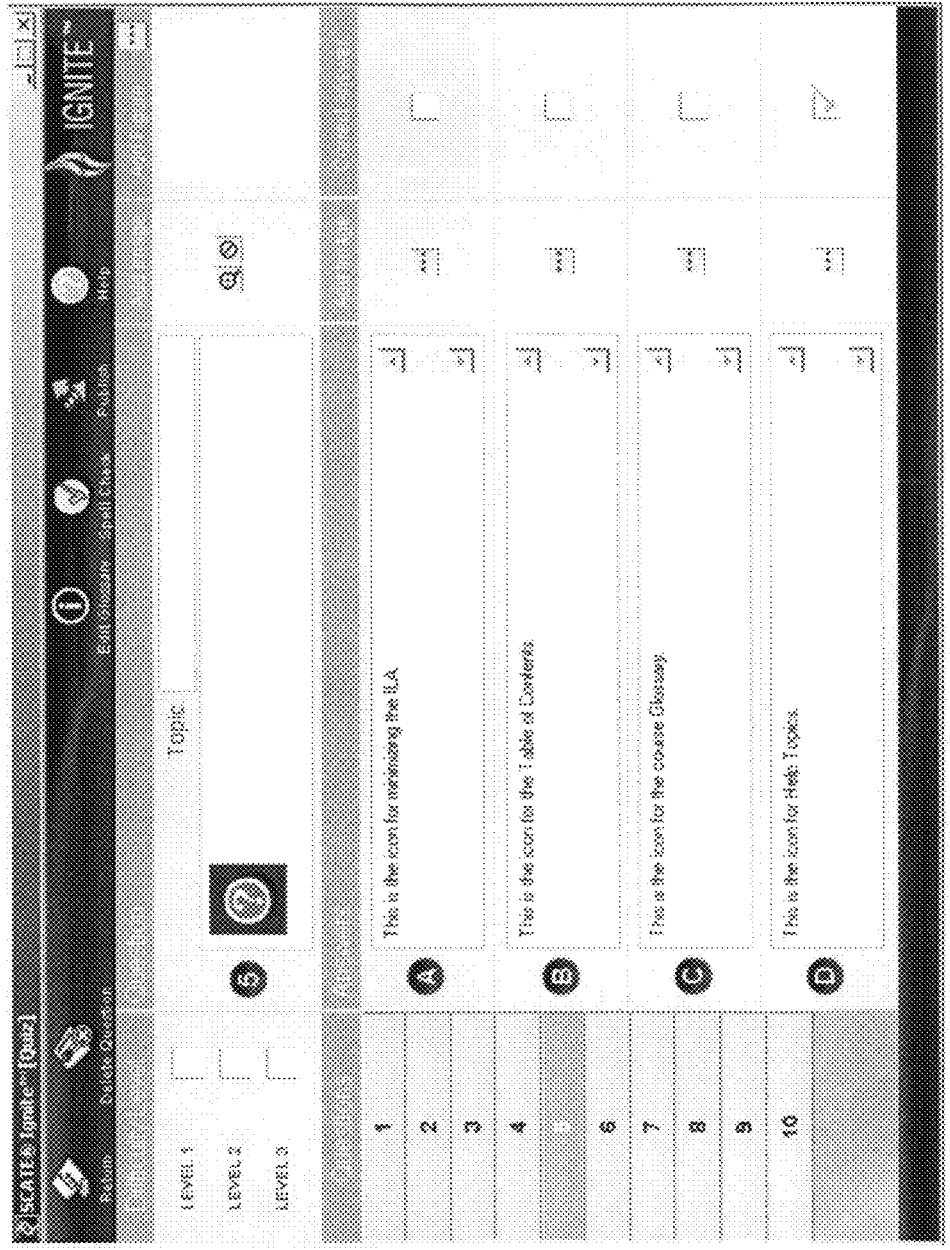
FIG. 30 is a view of a screen capture illustrating a quiz editor window for a graphics-based question, in accordance with a thirty-first embodiment of the present invention.

Referring to FIGS. 29-30, there are generally shown several screen captures that include the main screens that a user would encounter as he/she creates and/or modifies a course in conjunction with the course development program of the present invention. FIGS. 29-30 illustrate some of the concepts described with reference to FIG. 3.

Referring to FIG. 29, there is shown a view of a screen capture illustrating a "quiz editor" window for a text-based question, in accordance with a thirtieth embodiment of the present invention. By way of a non-limiting example, the user can create a text-based quiz question and answers thereto by clicking in the appropriate fields.

Referring to FIG. 30, there is shown a view of a screen capture illustrating a "quiz editor" window for a graphics-based question, in accordance with a thirty-first embodiment of the present invention. By way of a non-limiting example, the user can create a graphics-based quiz question and answers thereto by clicking in the appropriate fields.

Figure 31B:
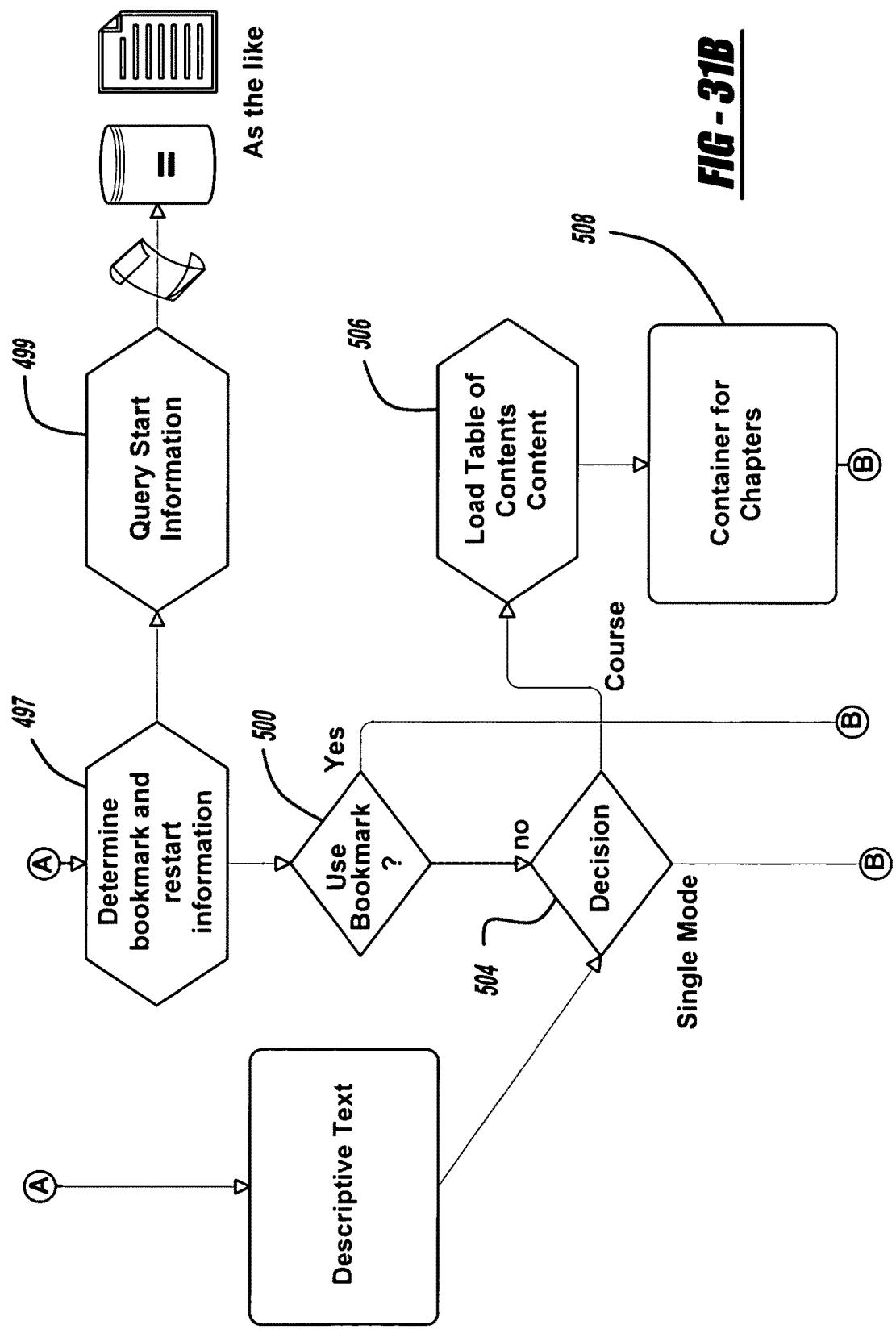
FIGS. 31a-31o are schematic illustrations of a flowchart illustrating the primary processing steps of the player, in accordance with the present invention.
Figure 31C:
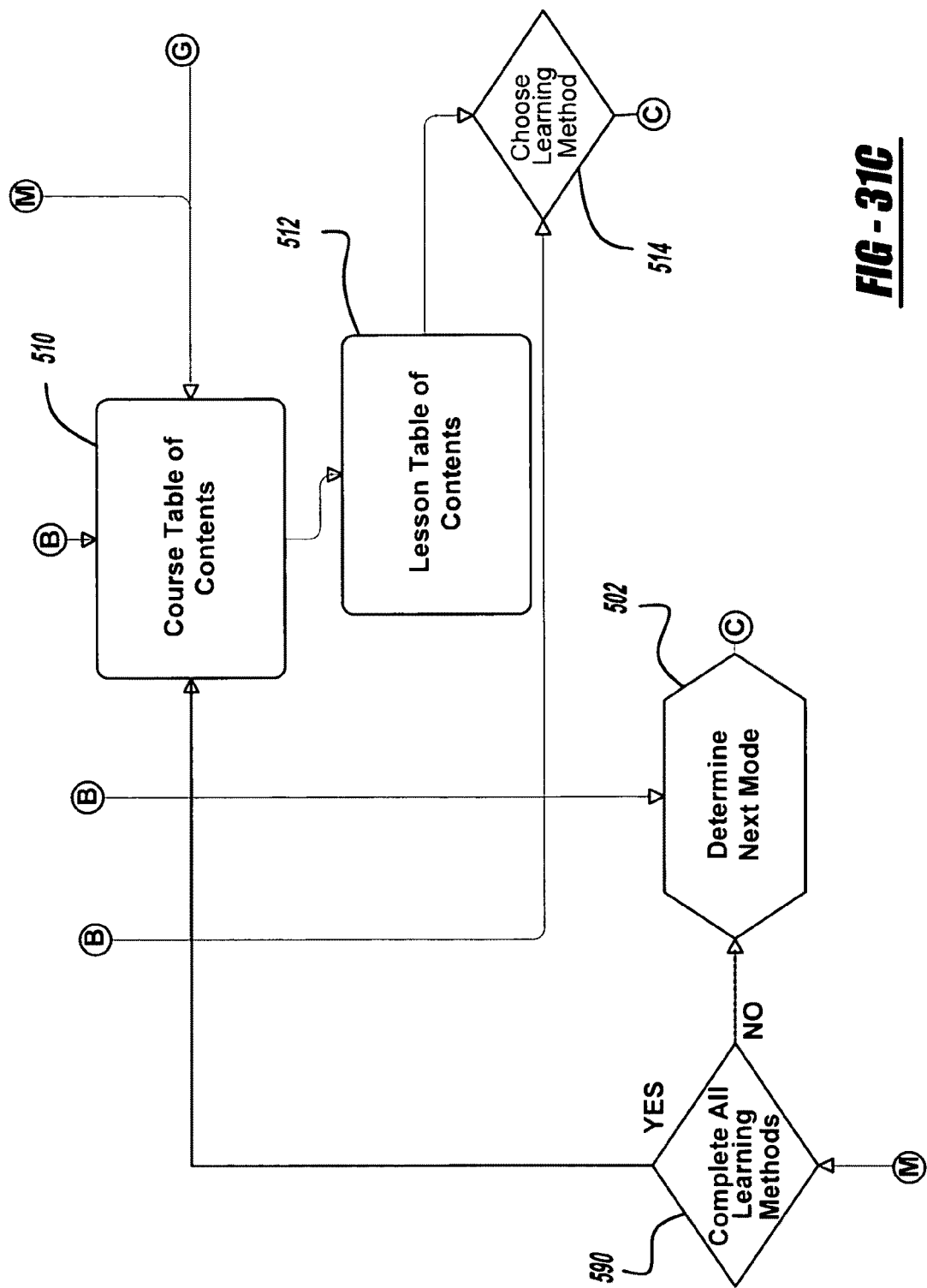
Figure 31D:
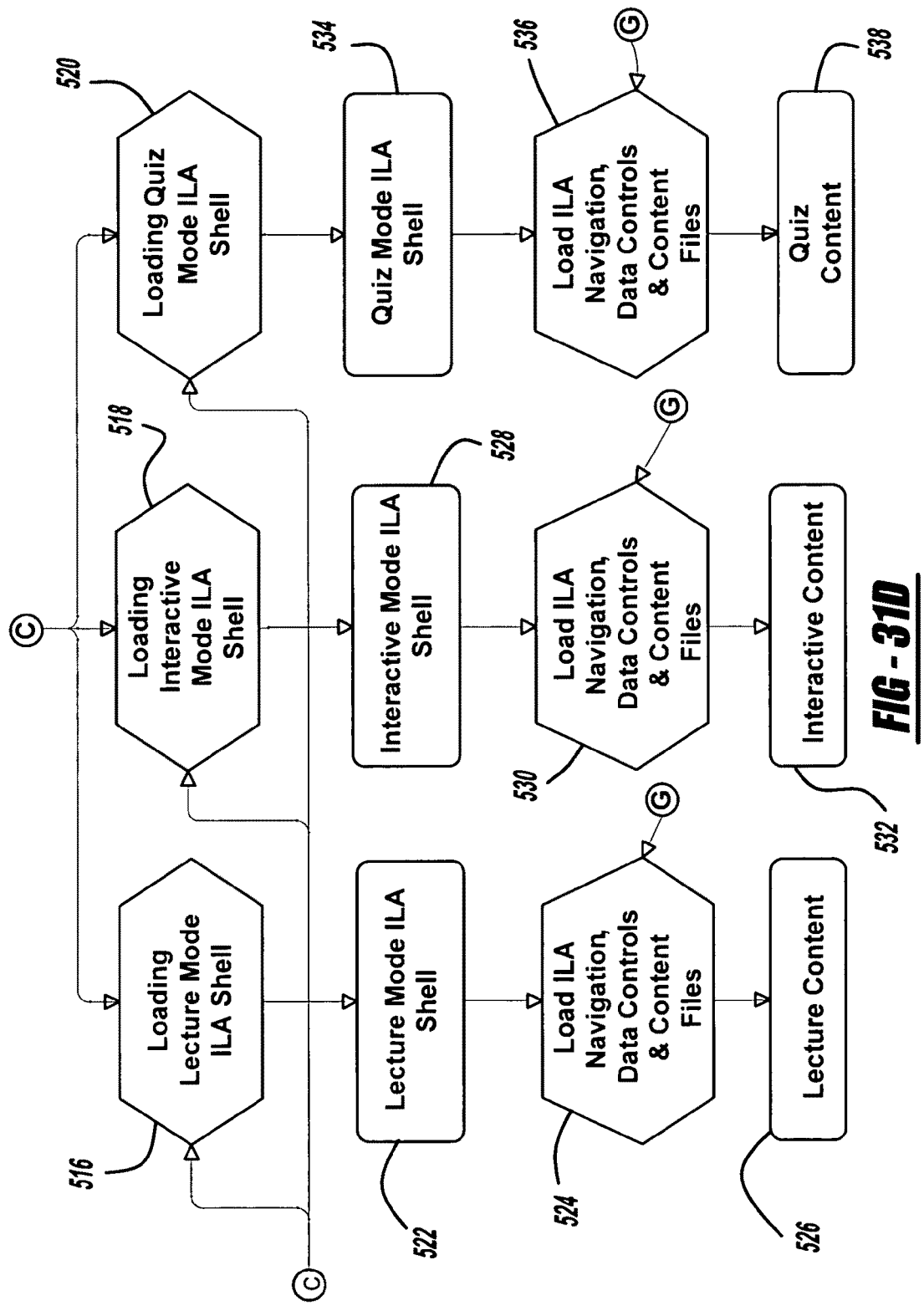
Figure 31E:
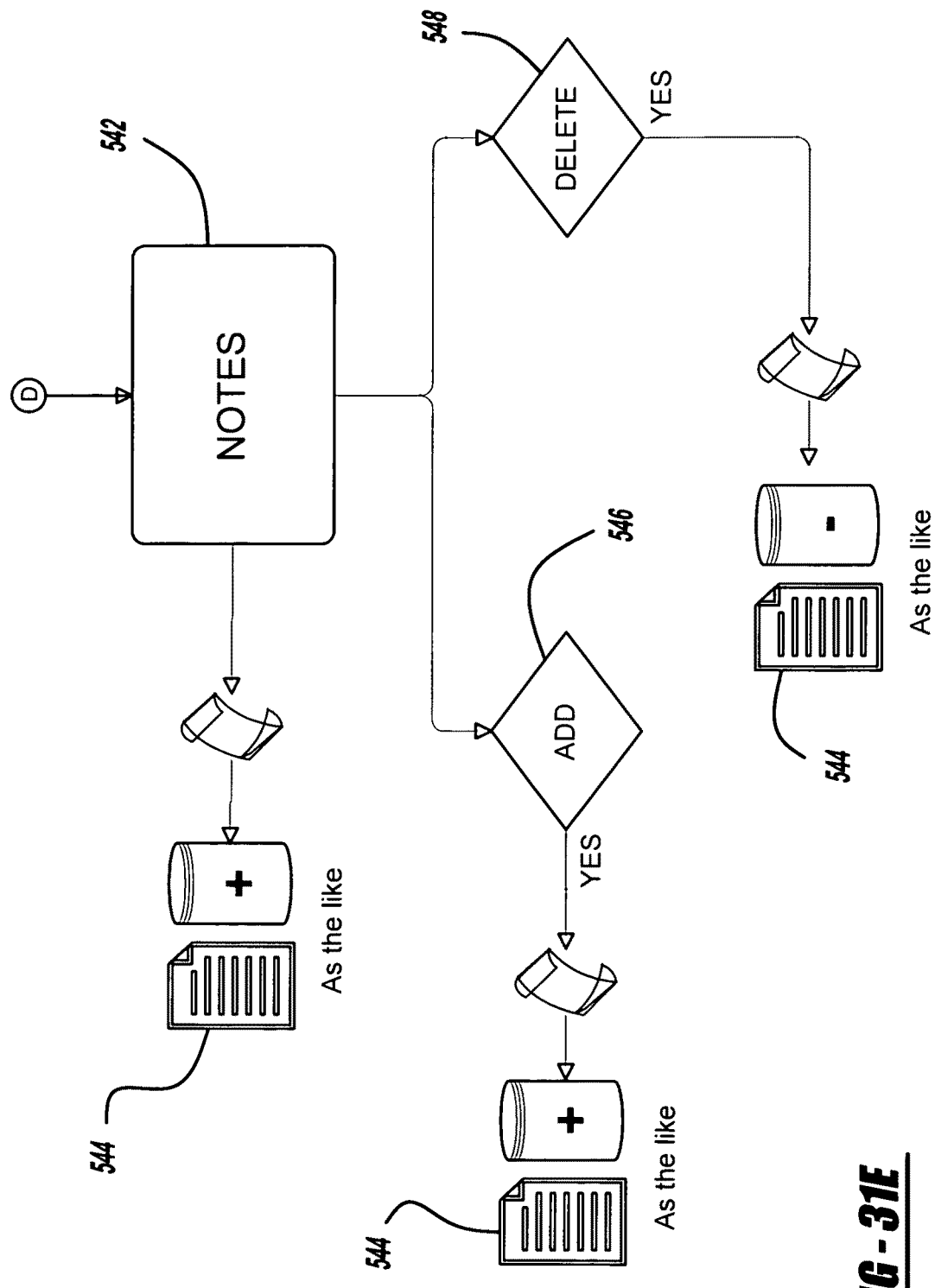
Figure 31G:
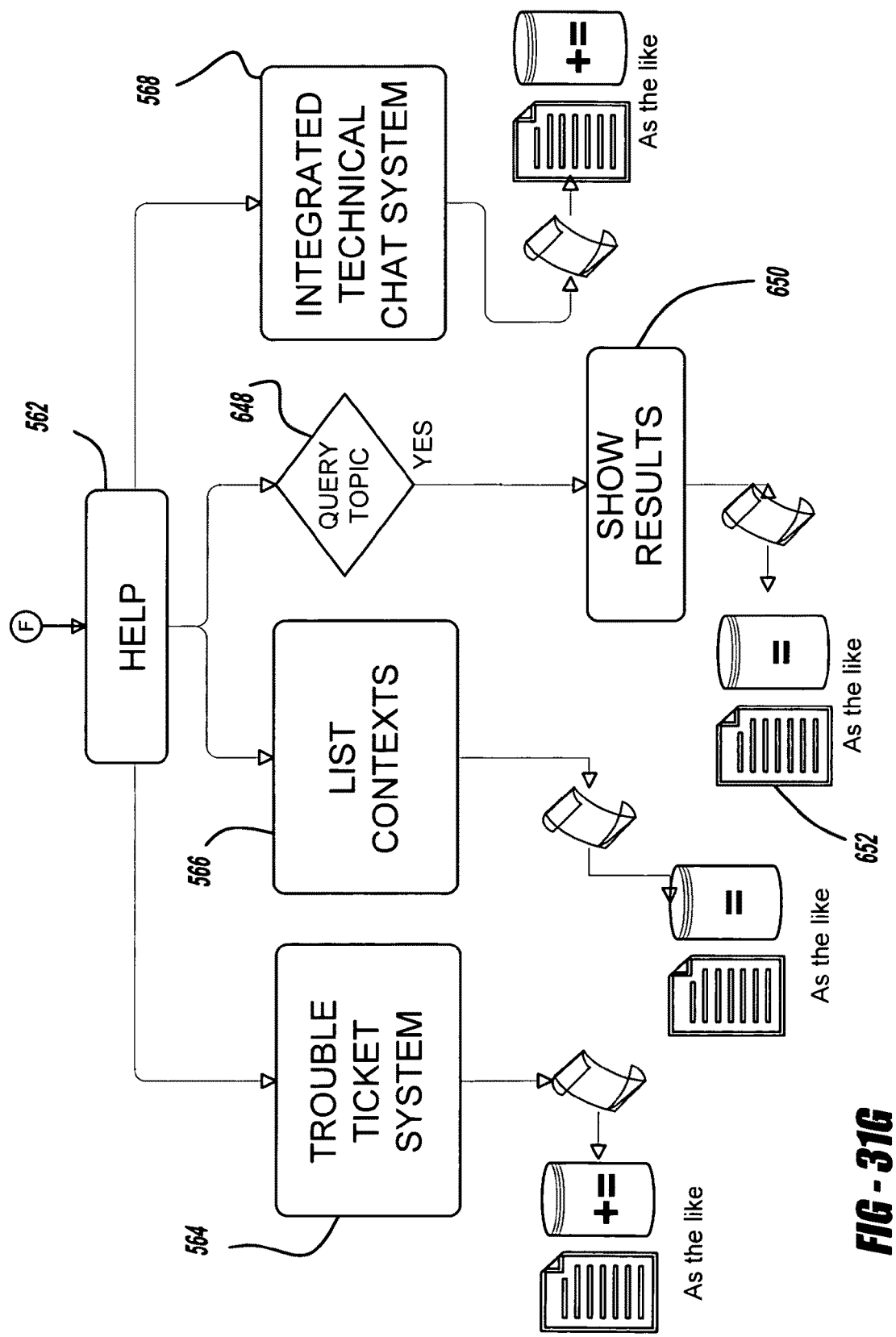
Figure 31J:
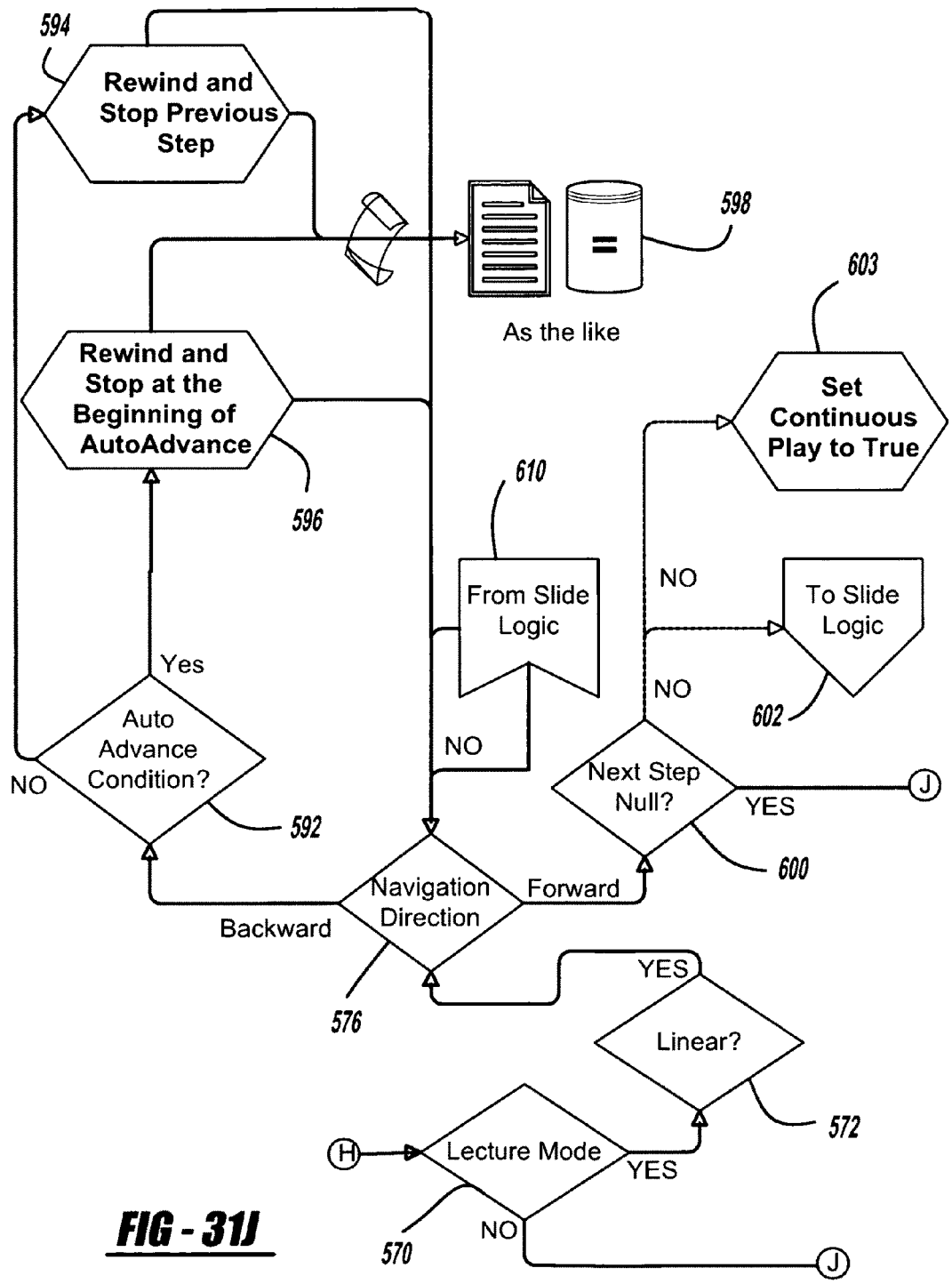
Figure 31K:
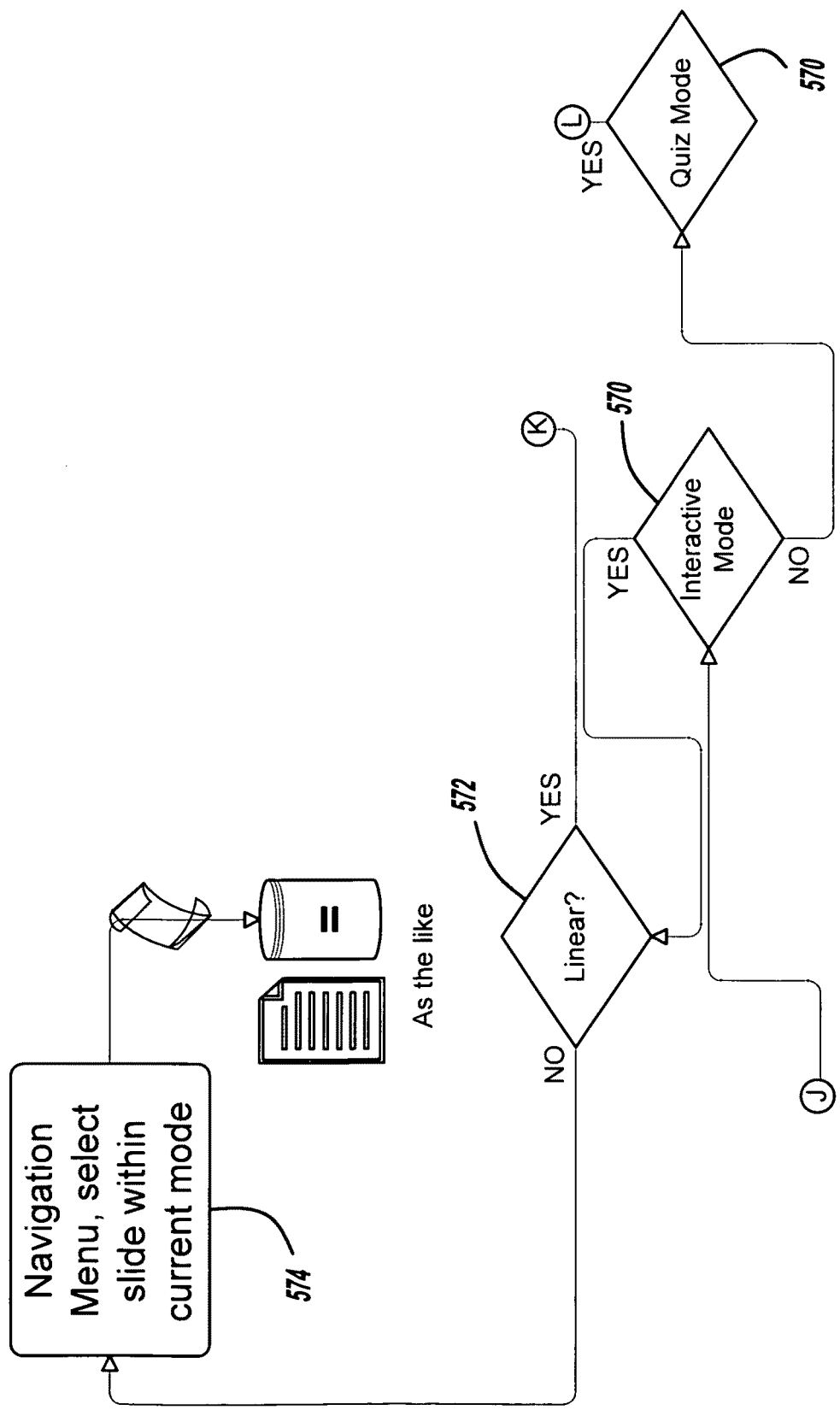
Figure 31M:
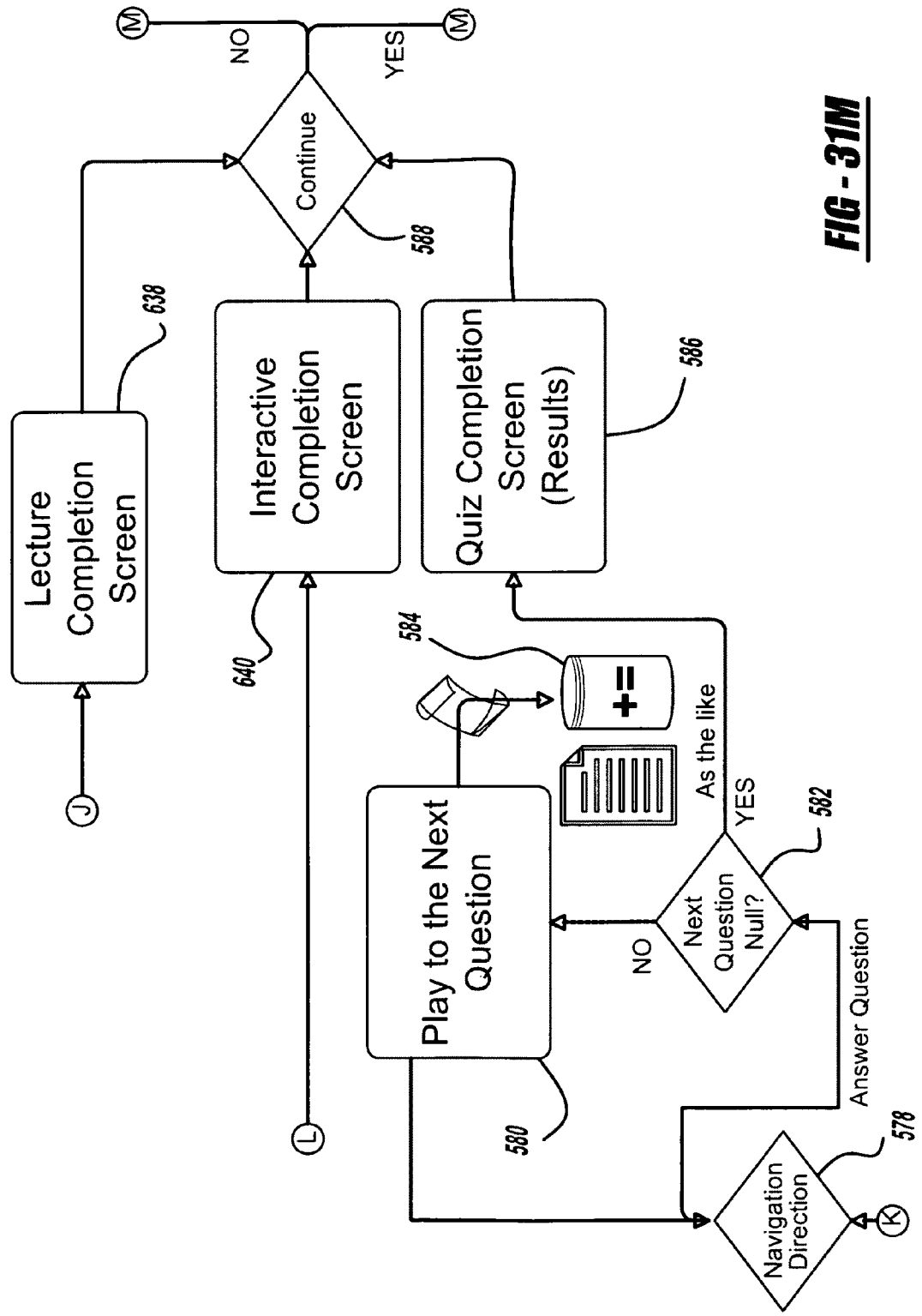
Figure 310:
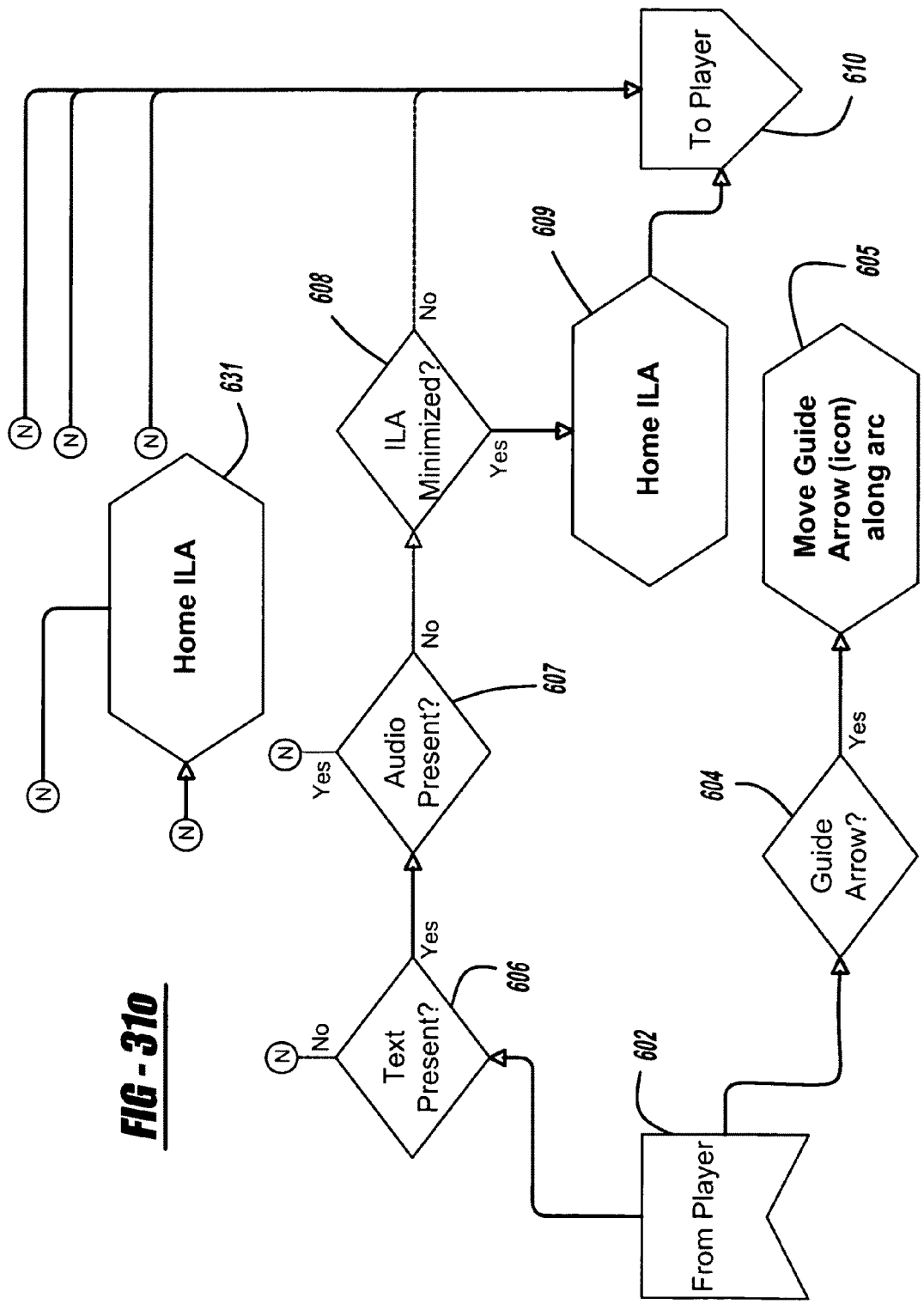

Referring now to FIGS. 31a-31o there is shown a flow chart of the player portion of the course development program. The player protocol can be entered via an index 482 which is primarily web based or via an executable 484 which is primarily local to the PC. If the player is entered via an index 482, a step 486 takes place wherein the system settings conformance is determined, then at a logic gate 488 a decision is made whether or not the system settings are in conformance. If the system settings do not conform then a menu 490 is displayed wherein the user is presented with choices, such as going forward with the present settings or exiting the program. If a decision is made at the menu 490 to go forward with the present settings or if at the logic gate 488 it is determined that the system settings are in conformance then the system will proceed to the next step wherein a tracking model 492 is determined. Once a tracking model 492 has been determined a logic gate 494 is reached wherein a determination is made as to whether or not a course is being launched for the first time. The logic gate 494 is where both entry points into the player 482 and 484 meet.

If the player is entered via an executable step 484 then a logic gate 496 is reached wherein it is determined whether the screen size is correct. If the screen size is correct then the logic gate 494 is reached. If it is determined at logic gate 496 the screen size is not correct then it is determined at step 498 whether or not the screen will be resized. This resizing of the screen step 498 can either take place automatically or the screen size choices can be presented to the user.

After the player has reached logic gate 494 it must be determined whether or not this is a first launch of the particular course being played. If at logic gate 494 it is determined that it is not a first launch then at step 497 the player will detect a bookmark of where the course was last left off and the information will restart. This determination is made based upon query start information 499 inputted from the content manager. After a bookmark has been determined a logic gate 500 is presented wherein a determination is made whether or not to go forward with using the bookmark and pick up with where the course left off or if the course should be replayed from the beginning.

If at logic gate 500 it is decided to use the previous bookmark then at step 502 it must be determined which mode the course we be played in. This can be based upon user inputted information or data that was saved or can be obtained from the query start information 499. If at logic gate 500 a decision is made not to use the bookmarks then at logic gate 504 then a decision will be made at logic gate 504 to load the table of contents 506 with its container of chapters 508, the course table of chapters 510 and the lesson table of contents 512. Then at logic gate 514 a learning mode must be determined.

The present invention provides one or more modes of learning and can contain virtually an infinite number of modes of learning. However, as illustrated in FIG. 31 a user can determine whether to load a lecture mode 516 interactive mode 518 or quiz mode 520. It should also be noted that if a decision is made a logic gate 500 to use the bookmarks then each of the learning modes 516, 518, 520 can be reached automatically or by user choice when a mode is determined at step 502. If a decision is made to load the lecture mode 516 then the player will proceed at step 522 to load the lecture mode interactive learning agent (ILA) shell, which will provide ILA navigation data controls and content files at step 524 with the lecture content at step 526. If a decision is made to load interactive mode 518 then the player will proceed at step 528 to load the interactive mode ILA shell, which will provide ILA navigation data controls and content files 530 with interactive content 532. If a decision is made to load quiz mode 520 then the player will proceed at a step 534 to load the quiz mode ILA shell, which will provide ILA navigation data controls and content files 536 with the quiz content 538.

When the interactive learning agent navigation, data controls and content files are loaded at steps 524, 530 and 536 this information is inputted from an ILA step 540 which contains several processes which will now be discussed. The ILA step 540 can be queried to allow a notes menu 542 wherein the user can store notes that are inputted from a source 544. The note step 542 also has a logic gate 546 where a decision can be made to add notes to the notes data 544 and a logic gate 548 where a decision can be made to delete notes from the notes data 544. The ILA step 540 can also be used to query a user profile step 550 wherein profile data 552 can be accessed. Additionally, profile data can be added such as timer data 554 or user score data 556 which contains a logic gate 558 that determines whether profile data 552 should be added when a class has been completed. The profile step 550 can also query profile data 552 from the last time 560 that the profile data 552 was accessed.

The ILA step 540 can also be used to query a help step 562 that provides a menu wherein a trouble ticket system 564 lists context 566 and an integrated technical chat system 568 can be accessed. The help step 562 can also be used to reach a logic gate 648 wherein the user is given an option to query a topic. If at logic gate 648 a decision is made to query a topic the driver will show results 650.

The interactive step navigation and data control protocol 540 can also be used to access a series of logic gates 570 wherein it is determined whether the player is operating in lecture mode, interactive mode or quiz mode. If a decision has been made to launch the lecture mode or the interactive mode a logic gate 572 is reached wherein the user will determine whether or not the player will operate in a linear fashion. In other words it will be determined whether the content will be played sequentially as it was created or whether the content will be played out of order. If it is decided that the content will not be played in a linear mode then a navigation menu 574 will be displayed and the user will select the type of navigation for the course. If it is determined at logic gate 572 that the course will be played in a linear mode then the next step for all three modes of learning is to move to a logic gate 576,577, 578 wherein the navigation direction is determined. For the lecture and interactive learning modes the logic gate 576 is essentially the same in that it allows for a determination of whether to move forward or backward. For the quiz mode of learning the logic gate 578 is slightly different because the navigation direction is dependent upon the playing and answering of questions. When logic gate 578 is reached, if there are questions to be displayed then the program will play the next question 580, then the user will answer the question which will lead to a logic gate 582 wherein it is determined whether there is another question. If there is another question then the driver will play the next question 580. The questions that are played are queried from database files 584. If at logic gate 582 there is not any more questions then a quiz completion screen 586 will be displayed. The quiz completion screen 586 will display the results of the quiz, then at logic gate 588 the user will have the option whether to continue with the program or not. If the user chooses to continue with the program then a logic gate 590 will be reached where the driver will determine whether all learning methods have been completed. If it is determined that not all learning methods have been completed then the next mode will be determined 502. If at logic gate 590 it has been determined that all learning modes have been completed then the course table of contents 510 will be displayed. If at logic gate 588 a decision is made not to continue then the driver will display the course table of contents 510.

If the ILA step 540 is operating in lecture mode then at the logic gate 576 it must be determined whether the navigation direction is to move forward or backward with respect to the course content. This decision can be made automatically or by user inputted data. If at logic gate 576 a decision is made to move through the course content in a backward direction then at logic gate 592 a decision is made whether the driver will operate in an auto advanced mode. If the driver will not operate in an auto advanced mode then the driver will rewind and stop at the previous step 594. If at logic gate 592 it is determined that the driver will operate in an auto advanced mode then the driver will rewind and automatically begin playing content, while stopping at the point where the decision was made to operate in auto advance mode. In both steps 594, 596 course information is queried 598 which will display the appropriate information on the screen. Also the next step after steps 594, 596 is to return to the logic gate 576 wherein the navigation direction is once again chosen.

If the ILA step 540 is operating in interactive mode then at the logic gate 577 the player must determine the navigation direction. The navigation direction options are to move forward or backward through the course data. This decision can be made automatically or by user inputted data if at logic gate 577 a decision is made to move through the course content in a backward direction then at logic gate 616 a decision is made whether the driver will operate in an auto advanced mode. If the driver will not operate in an auto advanced mode then the driver will rewind and stop at the previous step 618. If at logic gate 616 it is determined that the driver will operate in an auto advanced mode then the driver will rewind and automatically begin playing content, while stopping at the point where the decision was made to operate in auto advance mode 620. In both steps 618 and 620 course information is queried 622 which will display the appropriate information on the screen. Also the next step after steps 618, 620 is to return to logic gate 577 where the navigation is once again chosen.

At both logic gate 576 and logic gate 577 there is the option to move in the forward direction. If a decision is made to move in the forward direction then at a next step logic gate 600, if referring to logic gate 576 and logic gate 624, if referring to logic gate 577 a decision is made whether or not the next step is null. With respect to logic gate 600 if the next step is null then the player will move to a lecture completion screen 638 which will indicate that the lecture content has been completed. If at logic gate 577 it is determined that the next step is null then the program will move to a interactive completion screen 640 where it is indicated that the interactive content has been completed.

If at logic gate 600 and logic gate 624 the next step is not null then the player will progress to a slide logic 602 step. In addition, a determination is made at step 603 whether or not the player is progressing in continuous play mode. When the player progresses to slide logic step 602 a logic gate 604 is reached wherein it is determined whether or not a guide arrow is present in the content. If there is a guide arrow present then at step 605 the player will move the guide arrow icon between two or more points. This occurs when there have been one or more guide arrow icons inserted into the source subject matter during the creation of the content. If one or more guide arrows has been inserted then the program will automatically move the guide arrow as it progresses through the slides between one or more points. If the guide arrow is only located at a single point then the guide arrow will move in a circular fashion to call attention to the point on the screen where the guide arrow is located.

The slide logic step 602 also progresses the player to a logic gate 606 where a determination is made whether or not text is present in the content to be played. If text is present at logic gate 607 a determination is made whether or not there is also audio present. If there is no audio present then at logic gate 608 the player will determine whether or not the interactive agent menu will be minimized since no audio is present. If the interactive learning agent is to be minimized then at step 609 the learning agent is minimized and the content will be played and then at a step 610 the slide logic will return to the player once the content has been played.

If at logic gate 606 it is determined that there is no text present then at logic gate 611 a determination is made whether or not audio is present in the content. If there is no audio present then at logic gate 612 a determination is made whether or not the interactive learning agent is minimized. If the interactive learning agent is not minimized then at step 613 the player will minimize the interactive learning agent and at step 614 the player will play the next slide. If at logic gate 612 a determination is made that the interactive learning agent has been minimized then the player will progress to step 614 and play the next slide automatically. At step 614 the player will query course content or source subject matter 615.

If at logic gate 611 a determination is made that there is audio present then at a logic gate 630 a determination is made whether or not the interactive learning agent has a minimize flag set that a user has set to automatically minimize the ILA. Also at logic gate 607 a if a determination is made that audio is present then at logic gate 625 a determination is made whether or not interactive learning agent has been minimized.

If the interactive learning agent has a minimize flag set selected then at step 631 the interactive learning agent is presented to the user. If at logic gate 626 the interactive learning agent has not been minimized then at step 627 the interactive learning agent is minimized. If at logic gate 626 a determination has been made that the interactive learning agent will be minimized then at logic gate 628 a decision must be made whether or not continuous play will be enabled. If continuous play will not be enabled then the slide logic will return to the player at step 610. If at logic gate 628 it is determined that continuous play is enabled then at a step 629 the slide logic will play the next slide at the end of the audio by queering course content 615.

Another feature of the interactive learning step navigation and data controls 540 is that a glossary 642 can be accessed as a way of providing help to the user concerning navigation or other learning information.

Figure 33A:
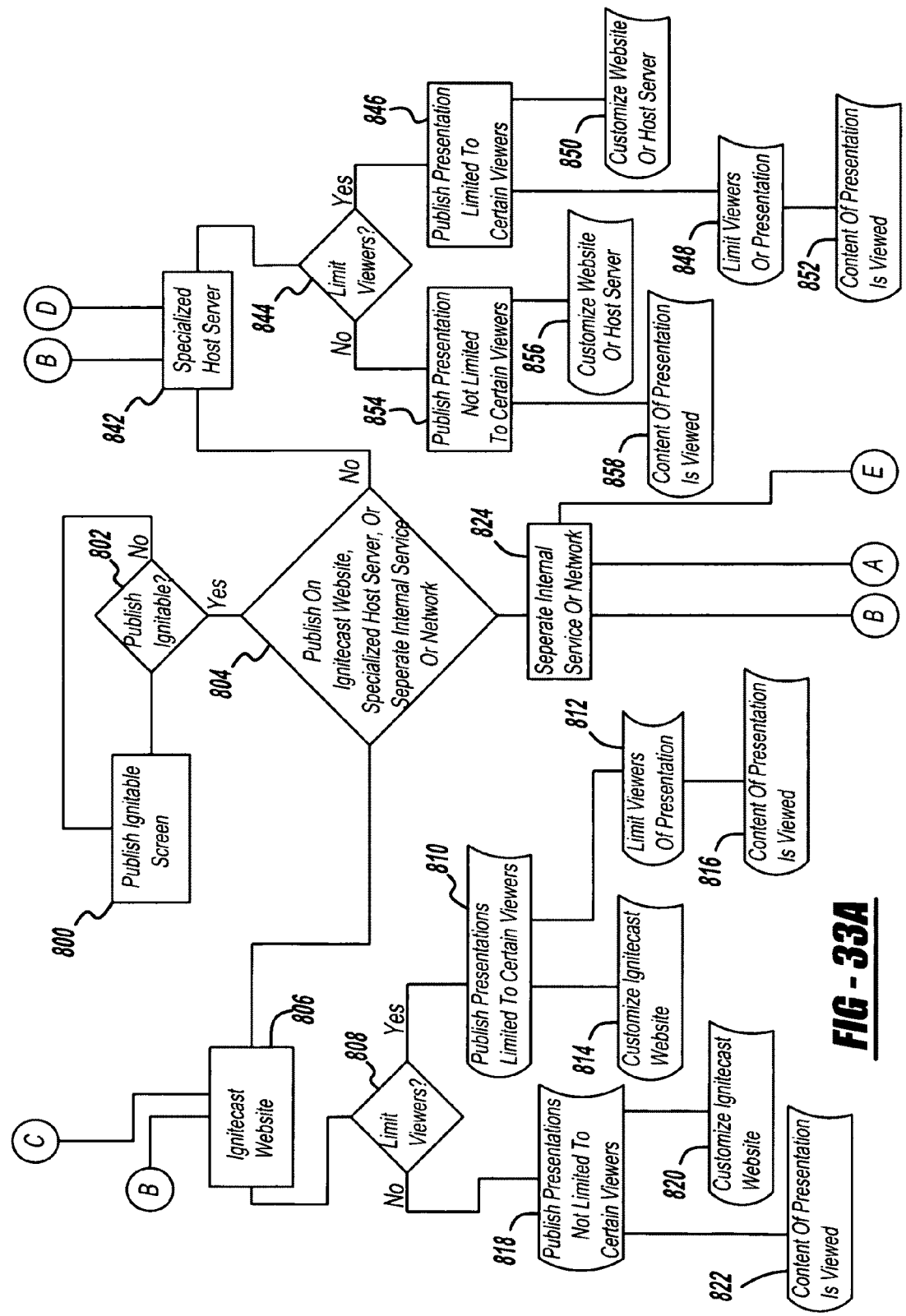
FIG. 33A is a schematic illustration of part of a flow chart illustrating the steps in publishing content used in a course development system, according to the present invention.
Figure 33B:
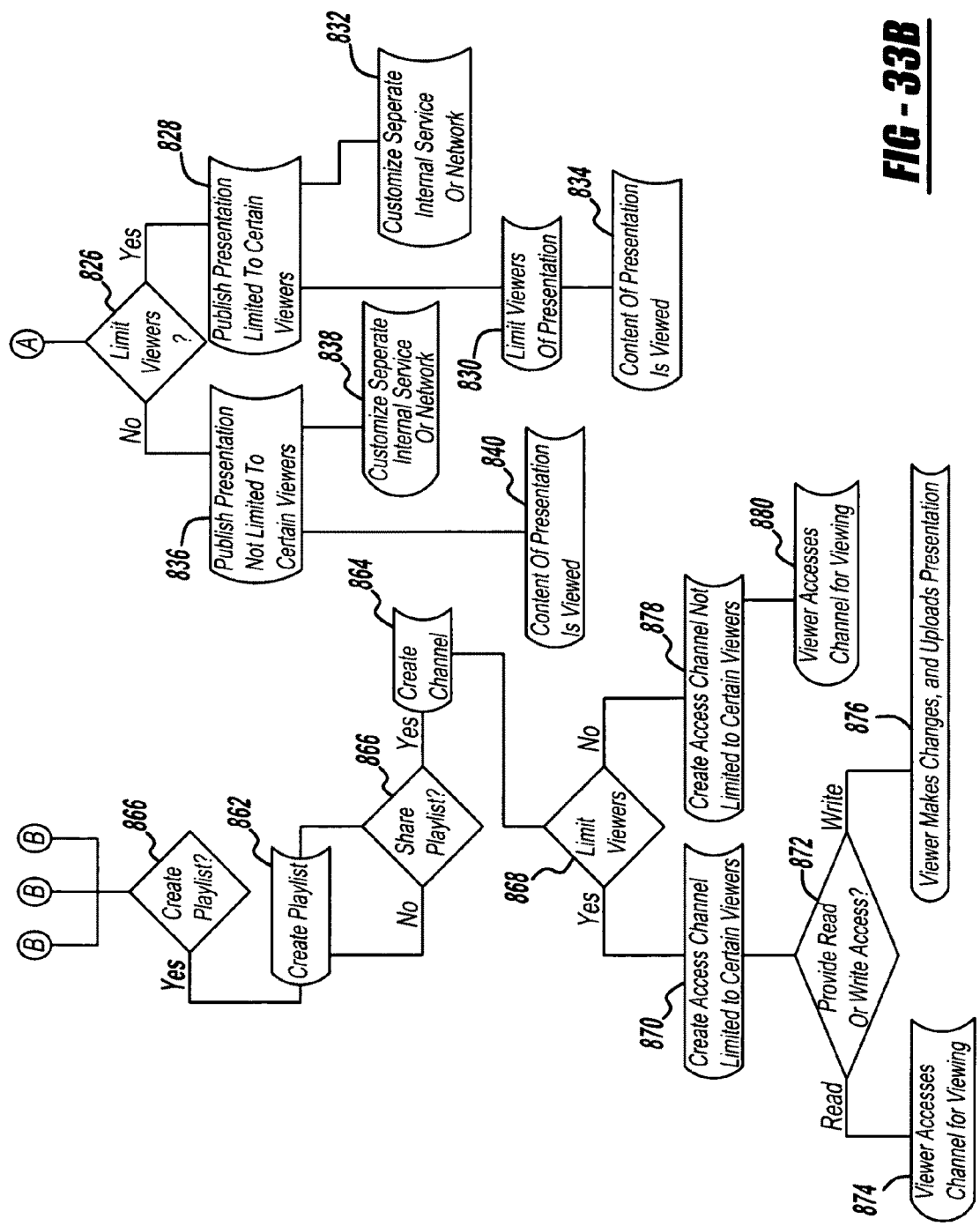
FIG. 33B is a schematic illustration of another part of a flow chart illustrating the steps in publishing content used in a course development system, according to the present invention.
Figure 33C:
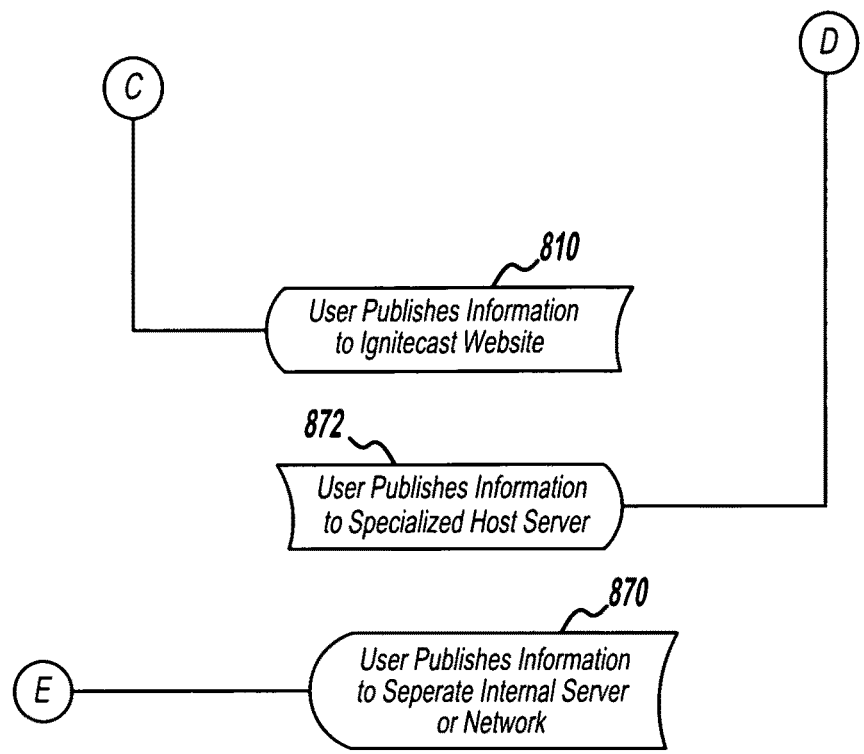
FIG. 33C is a schematic illustration of another part of a flow chart illustrating the steps in publishing content used in a course development system, according to the present invention.

Another feature of the present invention is shown in FIGS. 33a-33c. This schematic shows the steps involved in publishing content on a hosted network. When the user is at the "Publish Ignitable" screen 800, the user will decide whether to publish the presentation, or "ignitable," shown at logic gate 802. If the user decides not to publish the presentation, the user will remain at the "Publish Ignitable" screen 800. Once the user decides to publish the presentation, another decision is made at logic gate 804 to decide how the presentation will be published, or shared. In one embodiment, there are four modes of sharing. The content of the presentation can be shared on the World Wide Web through the www.ignitecast.com website, a specialized hosted server, or published through a completely separate internal service or network. For each type of sharing, the sharing can be further limiting or non-limiting by specifying a number of viewers to have access to the content of the presentation.

If the user decides the presentation is to be published on the www.ignitecast.com website 806, the user will then decide if the content will be limited to certain viewers, or not limited to certain viewers, shown at logic gate 808. If the user decides to limit the number of viewers, the next step is to publish the content of the presentation, shown at 810, and limit the content to be viewed by certain viewers desired by the user. This is accomplished by limiting the amount of users who can view the content, shown at 812, for example, by issuing a username and password to those who are allowed access to view the content. The website is also customized by the user, if desired, shown at 814.

Once the content has been limited to certain viewers, each user is allowed to view the content of the presentation, shown at step 816.

If the user decides that the presentation published on the www.ignitecast.com website 806, is not to be limited in the number of viewers, the next step is to publish the content of the presentation, shown at 818, without limiting the content to be viewed. The website is then customized, if desired, at step 820. Also, after the content is published at step 818, the user will then view the presentation, shown at step 822.

If desired, the user also has the ability to publish information to the www.ignitecast.com website 806, shown at step 868. If the user subscribes to certain services, the user could also publish to email, other websites, and the like.

If the decision at logic gate 804 is to publish the content of the presentation on the completely separate internal service or network, shown at 824, the user will then decide if the content is to be limited to certain viewers, shown at logic gate 826. If the user decides to limit the number of viewers, the next step is to publish the content of the presentation, shown at 828, and limit the content to be viewed by certain viewers desired by the user. This is accomplished by limiting the amount of users who can view the content, shown at 830, and is accomplished by issuing a username and password to those who are allowed access to view the content in a similar manner as described above. The website is also customized by the user, if desired, shown at 832.

Once the content has been limited to certain viewers, each user will view the content of the presentation, shown at step 834.

If the user decides that the presentation published on the completely separate internal service or network 824 is not to be limited in the number of viewers, the next step is to publish the content of the presentation, shown at 836, without limiting the content to be viewed. Again, the network is then customized, if desired, at step 838. After the content is published at step 836, at step 840 the user will then view the presentation.

If desired, the user also has the ability to publish information to the completely separate internal service or network 824, shown at step 870. If the user subscribes to certain services, the user could also publish to email, other websites, and the like.

If the decision at logic gate 804 is to publish the content of the presentation on a specialized hosted server, shown at 842, the user will then decide if the content is to be limited to certain viewers, shown at logic gate 844. If the user decides to limit the number of viewers, the next step is to publish the content of the presentation, shown at 846, and limit the content to be viewed by certain viewers desired by the user. This is accomplished by limiting the amount of users who can view the content, shown at 848, which can be done as previously mentioned, by issuing a username and password to those who are allowed access to view the content. The website on the host server is customized by the user, if desired, shown at 850.

Once the content has been limited to certain viewers, each user will then view the content of the presentation, shown at step 852.

If the user decides that the presentation published on the specialized hosted server 842 is not to be limited in the number of viewers, the next step is to publish the content of the presentation, shown at 854, without limiting the content to be viewed. The website on the host server is then customized, if desired by the user, at step 856. Also, after the content is published at step 854, at step 858 the user will then view the content of the presentation.

If desired, the user also has the ability to publish information to the specialized host server 842, shown at step 872. If the user subscribes to certain services, the user could also publish to email, other websites, and the like.

Another type of sharing is also accomplished by creating what are referred to as "playlists." Whether the user decides to share the content of the presentation through the www.ignitecast.com website 806, the specialized hosted server 842, or through the completely separate internal service or network 824, the user can create playlists which are a compilation of presentations, or "ignitables." The decision whether to make a playlist 862 is shown at logic gate 860. The playlist 862 is based on various criteria of the user. By way of explanation but not limitation, the presentations in the playlist have a common subject matter, are several presentations which are part of one large presentation used in a training program, or they are based on any other type of criteria chosen by the user.

Once the user decides to share the playlist at logic gate 860, the playlist 862 is then referred to as a "channel," 864. Once the channel 864 is created, the user can decide whether to limit the number of viewers who can access the channel 864. Additionally, the user can also decide what type of access each viewer will have. Some viewers can have "write access,"

in which the viewer having this type of access would be allowed to make changes to the presentation, and upload those changes on to the www.ignitecast.com website 806, the specialized hosted server 842, or the completely separate internal service or network 824, depending on which one is being used.

Because the channels 864 have a level of sharing provided by the user, and each of the individual presentations have their own level of sharing, respectively, a presentation will actually have two levels of sharing for a viewer to be able to access the presentation in a channel 864. In order for a viewer to have access to edit a presentation, the access must be provided by the user to both the channel and the presentation. The information a viewer is allowed to see is based on the most secure access allowed by the user. For example, if a viewer is allowed to have access to a particular channel 864, but not a particular presentation which is part of the channel 864, when the user searches for the channel 864, the list of presentations that the viewer has access to will show up, but any presentations the viewer does not have access to will not be seen by the viewer.

The decision to share the playlist 862 in the form of a channel 864 is shown as logic gate 866. The user then decides whether to limit the number of viewers at logic gate 868. If the user decides to limit the viewers, the user then will perform the step of limiting the viewers at 870. The user then has the option to determine what type of access each viewer will have; the access can be read only, or the viewer can have write access as well, this step is shown as logic gate 872. If the viewers are granted read only access, viewers allowed to view the presentation will access and view the presentation, shown at step 874. At step 876, the viewers allowed to have read and write access will then perform the steps of reading the presentation, making changes if desired, and uploading the changes onto the www.ignitecast.com website 806, the specialized hosted server 842, or the completely separate internal service or network 824 (whichever is being used).

If the user decides not to limit the content, the user then will grant access to anyone who desired to use the channel 864; this is shown at step 878. Any viewer will then view the presentations in the channel 864, shown as step 880.

The invention claimed is:

1. A method for posting and sharing content used in a knowledge capture program, comprising the steps of:
   providing a data storage system, wherein said knowledge capture program is operably associated with said data storage system;
   providing content, wherein said content is stored in said data storage system;
   accessing said content from said data storage system;
   providing a display system, wherein said display system is operably associated with said data storage system;
   selecting and displaying said content on said display system;
   capturing said content from said display system, wherein said step of capturing said content is accomplished using a point, shoot and action system, wherein the point, shoot and action system includes a point step and a shoot step, wherein the point step includes positioning a graphical user interface pointer element at a specified location of said displayed content, wherein the shoot step includes capturing both the displayed content and the graphical user interface pointer element at the specified location of said displayed content to form the captured content, wherein the captured content includes the graphical user interface pointer element positioned at the specified location of said displayed content, wherein the captured content is saved in a source content container of said data storage;
   deciding whether to publish said content; and
   deciding whether said content is going to be published on a private network or on the internet through the use of a host browser.

2. The method of claim 1, further comprising the step of publishing said content using said private network such that said content can only be viewed by certain users.

3. The method of claim 2, further comprising the step of customizing said private network.

4. The method of claim 1, further comprising the step of publishing said content using said host browser such that said content is not limited to specific viewers.

5. The method of claim 4, further comprising the step of customizing said host browser.

6. The method of claim 1, further comprising the step of publishing said content, using a host browser such that said content is limited to specific viewers.

7. The method of claim 6, further comprising the step of customizing said host browser.

8. The method of claim 1, further comprising the step of viewing said content.

9. The method of claim 1, further comprising the step of publishing information on said private network or said host browser.

10. A method for posting and sharing content used in a knowledge capture program, comprising the steps of:
    providing a data storage system, wherein said knowledge capture program is operably associated with said data storage system;
    providing content, wherein said content is stored in said data storage system;
    accessing said content from said data storage system;
    providing a display system, wherein said display system is operably associated with said data storage system;
    selecting and displaying said content on said display system;
    capturing said content from said display system, wherein said step of capturing said content is accomplished using a point, shoot and action system, wherein the point, shoot and action system includes a point step and a shoot step, wherein the point step includes positioning a graphical user interface pointer element at a specified location of said displayed content, wherein the shoot step includes capturing both the displayed content and the graphical user interface pointer element at the specified location of said displayed content to form the captured content, wherein the captured content includes the graphical user interface pointer element positioned at the specified location of said displayed content, wherein the captured content is saved in a source content container of said data storage;
    deciding whether to publish said content using a private network;
    deciding whether to publish said content on the internet through a host browser; and
    viewing said content when said content is published on a host browser.

11. The method for posting and sharing content used in a knowledge capture program of claim 10, further comprising the step of limiting said content published on said private network to certain viewers.

12. The method for posting and sharing content used in a knowledge capture program of claim 10, further comprising the step of limiting said content published on the internet through said host browser to certain viewers.

13. The method for posting and sharing content used in a knowledge capture program of claim 10, further comprising the step of allowing said content published on the internet through said host browser to be viewed by all viewers.

14. The method for posting and sharing content used in a knowledge capture program of claim 10, further comprising the step of customizing said private network used to publish said content.

15. The method for posting and sharing content used in a knowledge capture program of claim 10, further comprising the step of customizing said host browser used to publish said content.

16. The method for posting and sharing content used in a knowledge capture program of claim 10, further comprising the step of publishing information on said host browser or said private network.

17. A method for posting and sharing content used in a knowledge capture program, comprising the steps of:
- providing a data storage system, wherein said knowledge capture program is operably associated with said data storage system;
- providing content, wherein said content is stored in said data storage system;
- accessing said content from said data storage system;
- providing a display system, wherein said display system is operably associated with said data storage system;
- selecting and displaying said content on said display system;
- capturing said content from said display system, wherein said step of capturing said content is accomplished using a point, shoot and action system, wherein the point, shoot and action system includes a point step and a shoot step, wherein the point step includes positioning a graphical user interface pointer element at a specified location of said displayed content, wherein the shoot step includes capturing both the displayed content and the graphical user interface pointer element at the specified location of said displayed content to form the captured content, wherein the captured content includes the graphical user interface pointer element positioned at the specified location of said displayed content, wherein the captured content is saved in a source content container of said data storage;
- deciding whether to publish said content using a private network;
- deciding whether to publish said content on the internet through a host browser;
- deciding whether to limit said content published on the internet through a host browser to certain viewers; and
- viewing said content when said content created is published on a host browser.

18. The method for posting and sharing content used in a knowledge capture program of claim 17, further comprising the step of limiting said content published on said private network to certain viewers when said content is published using a private network.

19. The method for posting and sharing content used in a knowledge capture program of claim 17, further comprising the step of limiting said content published on the internet through said host browser to certain viewers when said content is published on said host browser.

20. The method for posting and sharing content used in a knowledge capture program of claim 17, further comprising the step of allowing said content published on the internet through said host browser to be viewed by any viewers when said content is published on said host browser.

21. The method for posting and sharing content used in a knowledge capture program of claim 17, further comprising the step of customizing said private network when said content is to be viewed on said private network.

22. The method for posting and sharing content used in a knowledge capture program of claim 17, further comprising the step of customizing said host browser when said content is to be viewed on said host browser.

23. The method for posting and sharing content used in a knowledge capture program of claim 17, further comprising the step of publishing information on said host browser or said private network.

\* \* \* \* \*